United States Patent [19]
Nakano et al.

[11] Patent Number: 5,986,767
[45] Date of Patent: Nov. 16, 1999

[54] COLORIMETRIC SYSTEM HAVING FUNCTION OF SELECTING OPTIMUM FILTER FROM A PLURALITY OF OPTICAL BANDPASS FILTERS

[75] Inventors: Keiichi Nakano, Fussa; Hiromi Hamano, Tokorozawa, both of Japan

[73] Assignee: Olympus Optical Co., Ltd., Tokyo, Japan

[21] Appl. No.: 08/833,654

[22] Filed: Apr. 8, 1997

[30] Foreign Application Priority Data

Apr. 11, 1996 [JP] Japan ..... 8-089201
Mar. 10, 1997 [JP] Japan ..... 9-055185

[51] Int. Cl.$^6$ ..... G01N 21/85
[52] U.S. Cl. ..... 356/419; 356/416; 356/418
[58] Field of Search ..... 364/526; 356/402, 356/419, 416, 418

[56] References Cited

U.S. PATENT DOCUMENTS 5,221,959  6/1993  Ohyama et al. ..... 356/326
5,717,605  2/1998  Komiya et al. ..... 356/402
5,751,429  5/1998  Wada et al. ..... 356/418

Primary Examiner—Robert H. Kim
Assistant Examiner—Zandra V. Smith
Attorney, Agent, or Firm—Frishauf, Holtz, Goodman, Langer & Chick, P.C.

[57] ABSTRACT

A calorimetric apparatus includes an image pickup unit, an optical unit, a plurality of optical bandpass filters, a switching unit, an arithmetic processing unit, and an optimum filter selection unit. The image pickup unit picks up the image of light from a target object. The optical unit allows the light from the target object to form an image on the image pickup unit. The plurality of optical bandpass filters are arranged between the target object and the image pickup unit and have pass bands different from each other. The switching unit switches the plurality of optical bandpass filters. The arithmetic processing unit performs arithmetic processing for colorimetry on the basis of the spectrum data of the target object whose image is picked up. The optimum filter selection unit selects, from the plurality of optical bandpass filters, a filter suitable for colorimetry by the arithmetic processing unit.

27 Claims, 36 Drawing Sheets

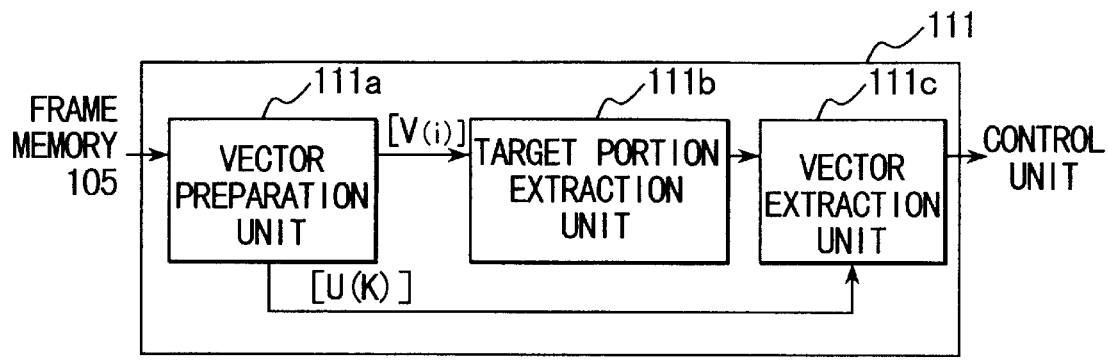
F I G. 2A
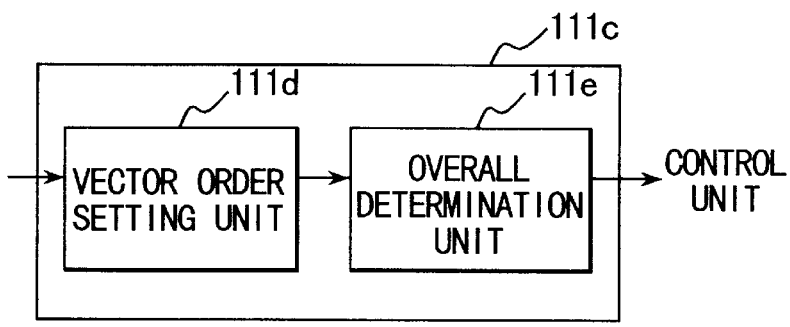
F I G. 2B
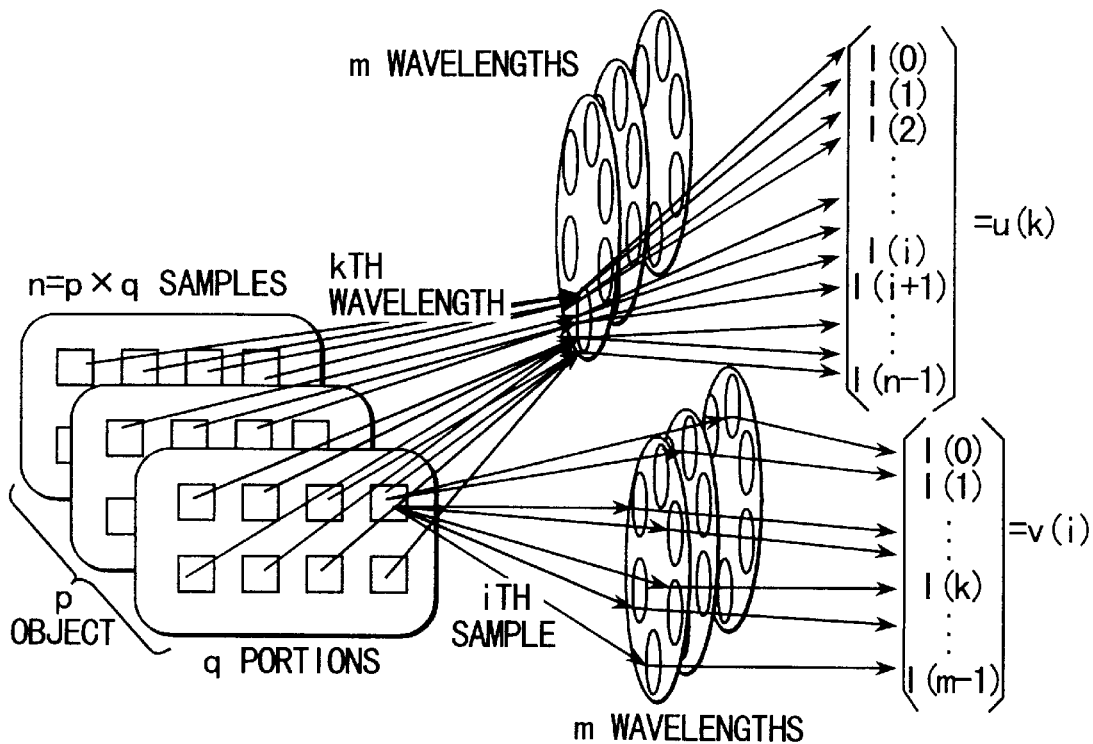
F I G. 3

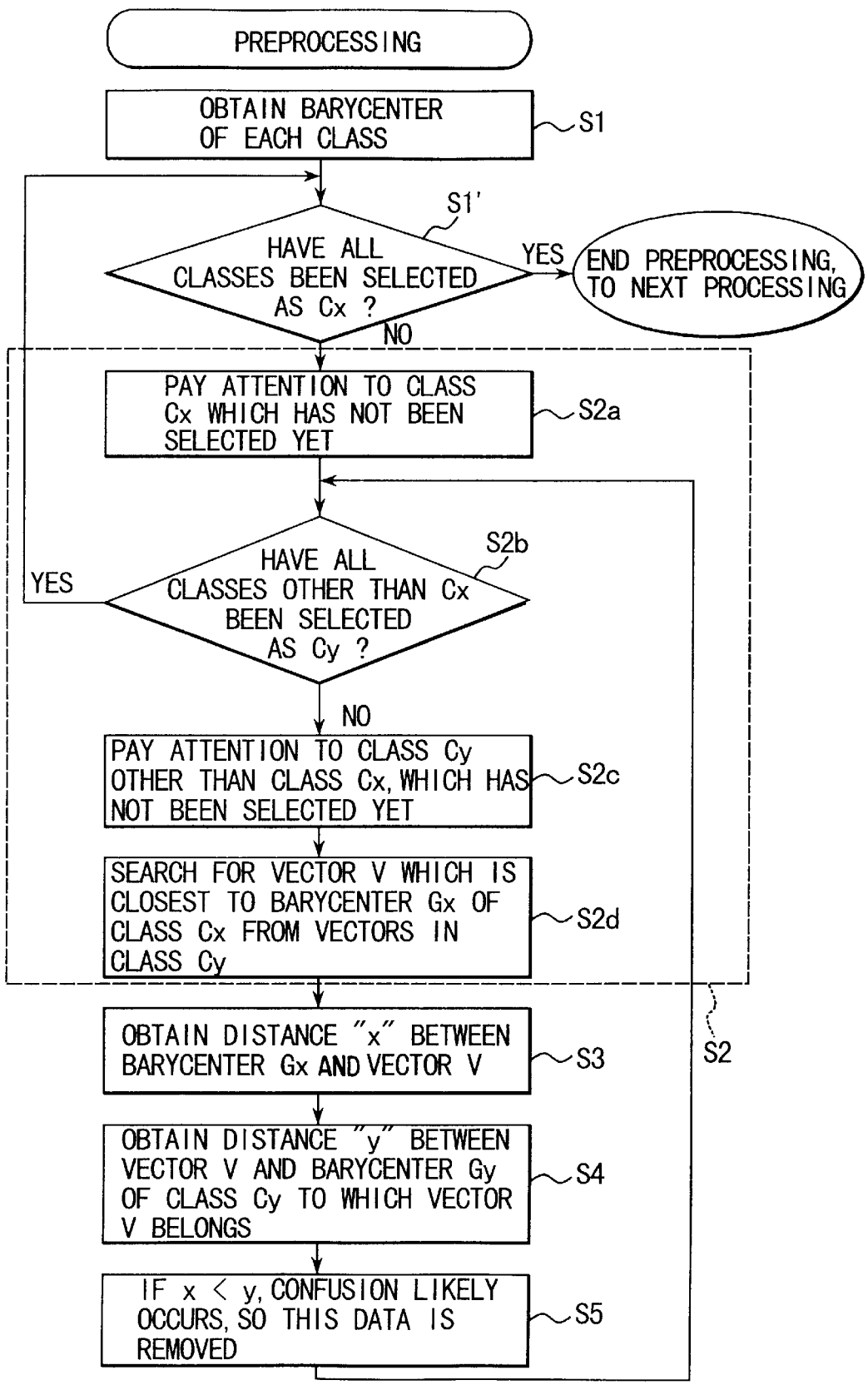
F I G. 5

$a^2 = b^2 + c^2 - 2bc \cos x$ $\text{ratio} = \dfrac{b \cos x}{c} = \dfrac{b^2 + c^2 - a^2}{2c^2}$

| ORDER/SCORE | METHOD1 | METHOD2a | METHOD2b | METHOD3a | METHOD3b | METHOD4 | |
|---|---|---|---|---|---|---|---|
| | COEFFICIENT1 | COEFFICIENT2 | COEFFICIENT3 | COEFFICIENT4 | COEFFICIENT5 | COEFFICIENT6 | |
| 1 | 2 | 3, 4 | 9 | 20, 8 | 8 | 2 | ⋮ |
| 2 | 5 | 5, 6 | 8 | 5, 3 | 3 | 3 | ⋮ |
| 3 | 10 | 2, 9 | 1 | 6, 3 | 5 | 12 | ⋮ |
| 4 | 18 | 7, 9 | 5 | 7, 5 | 4 | 7 | ⋮ |
| 5 | 7 | 12, 8 | 12 | 11, 4 | 6 | 11 | ⋮ |
| 6 | 9 | 10, 1 | 11 | 9, 10 | 10 | 5 | ⋮ |
| 7 | 12 | 20, 8 | 14 | 2, 8 | 22 | 20 | ⋮ |
| 8 | 20 | 1, 9 | 3 | 21, 22 | 21 | 13 | ⋮ |
| ⋮ | ⋮ | ⋮ | ⋮ | ⋮ | ⋮ | ⋮ | |

F I G. 9

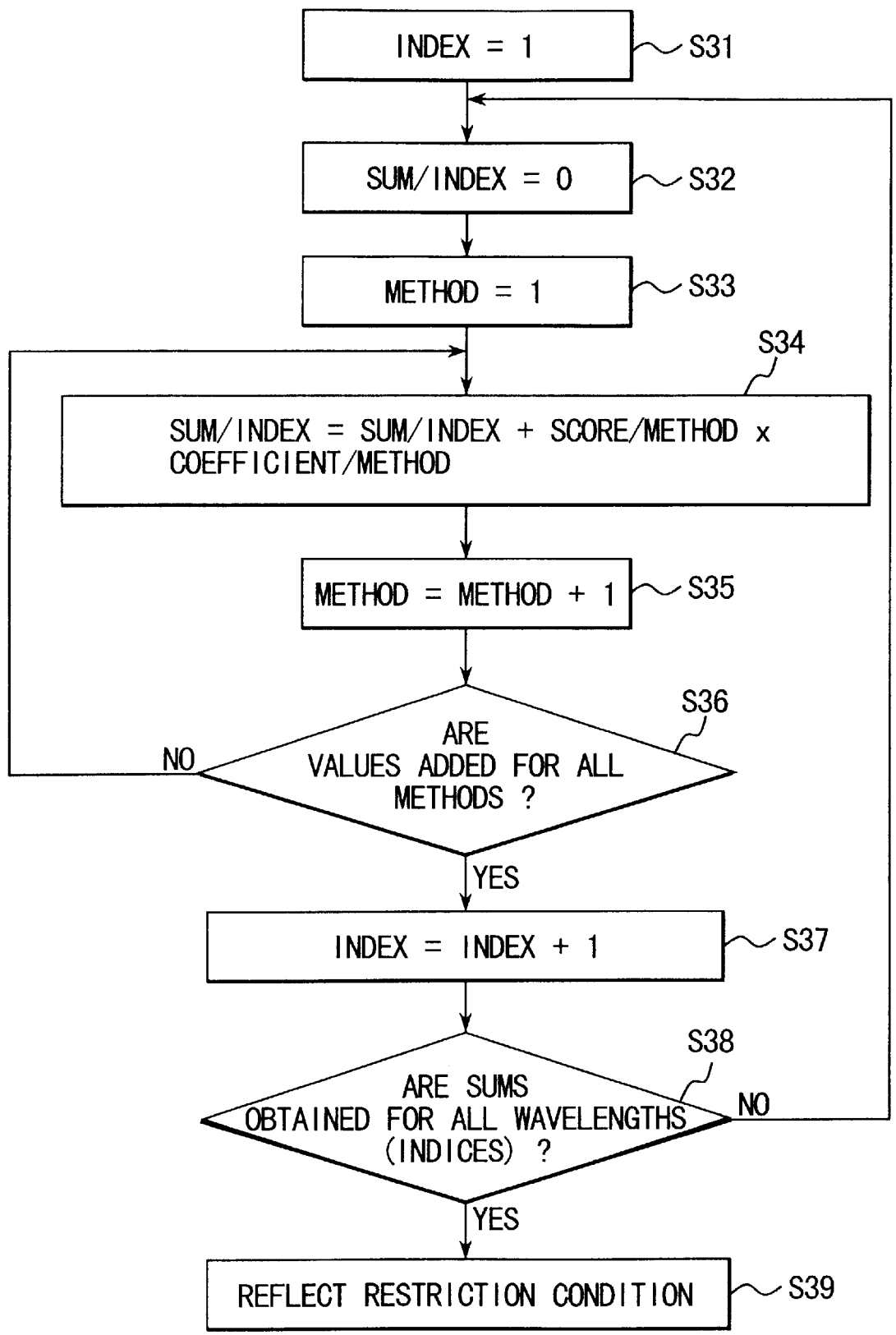
F I G. 10

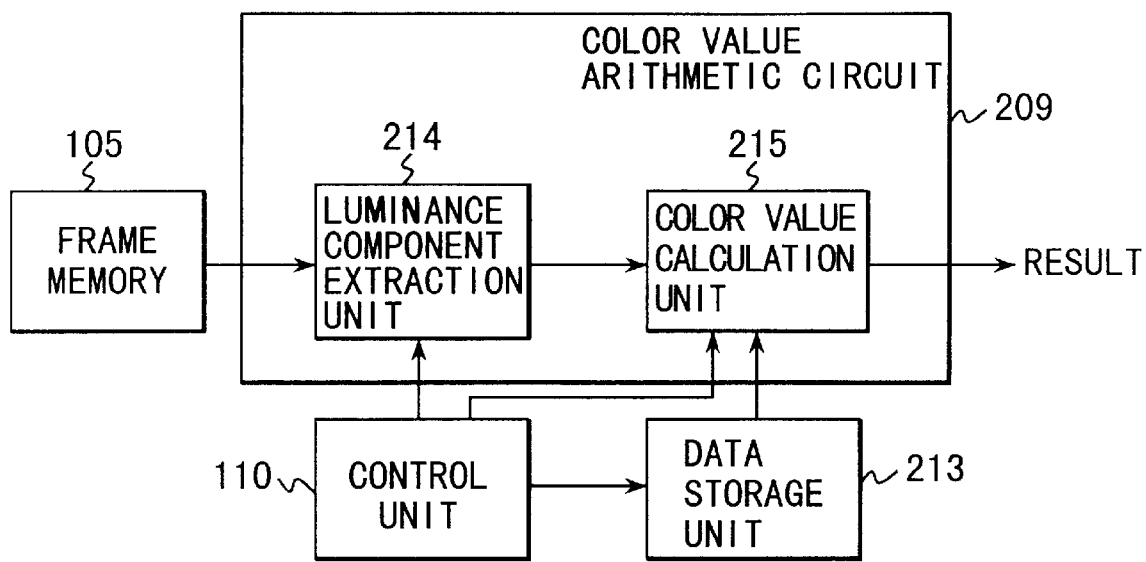
F I G. 1 3 A
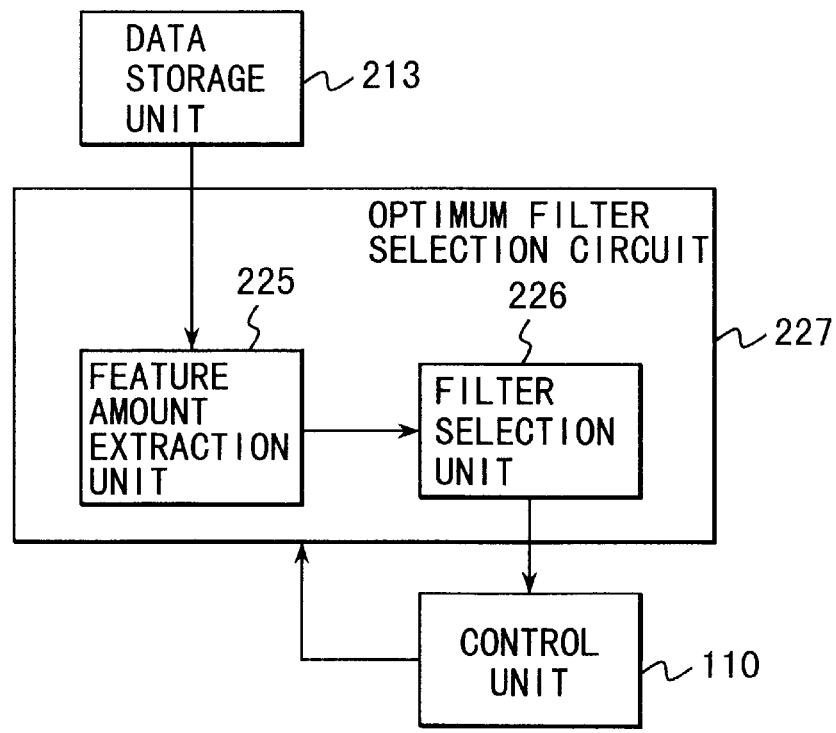
F I G. 1 3 B

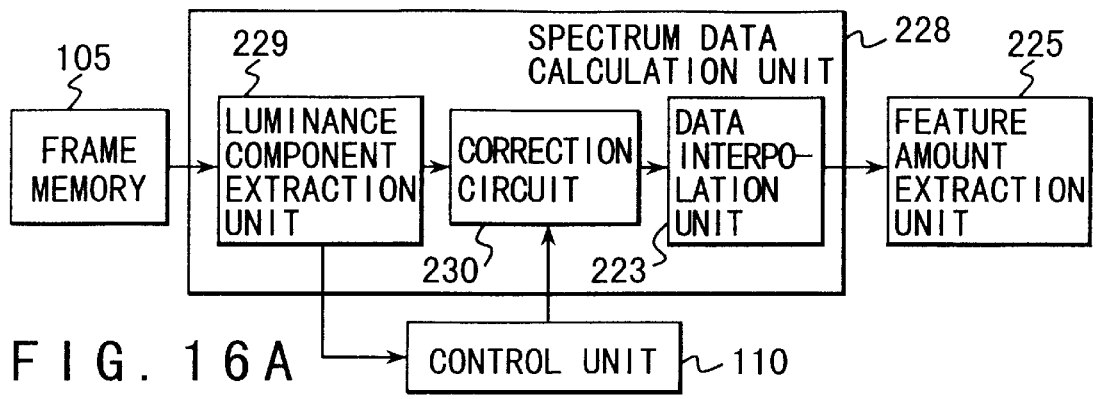
F I G. 16 A
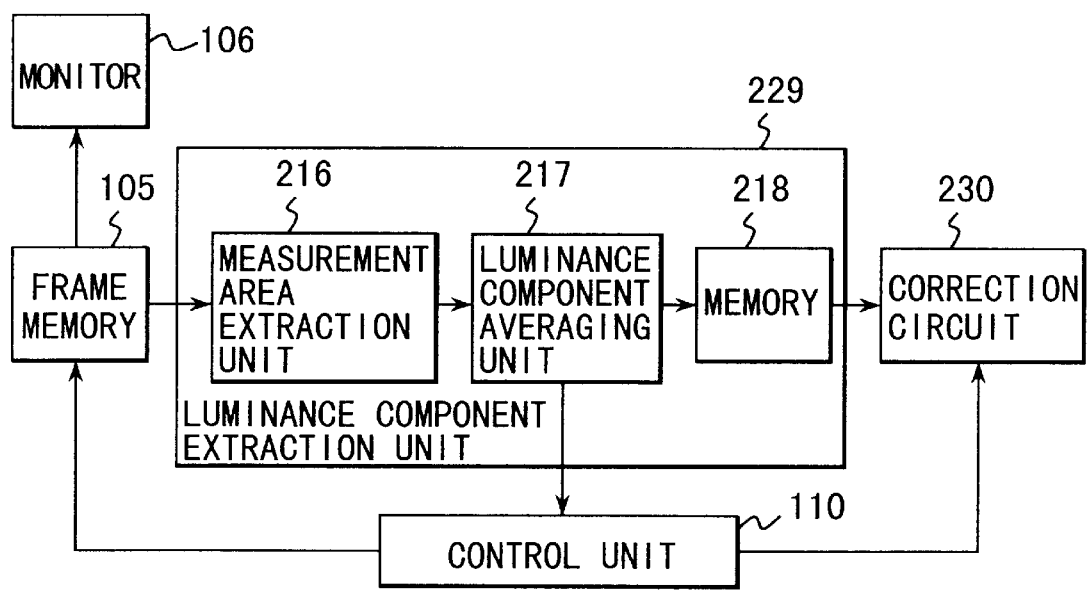
F I G. 16 B
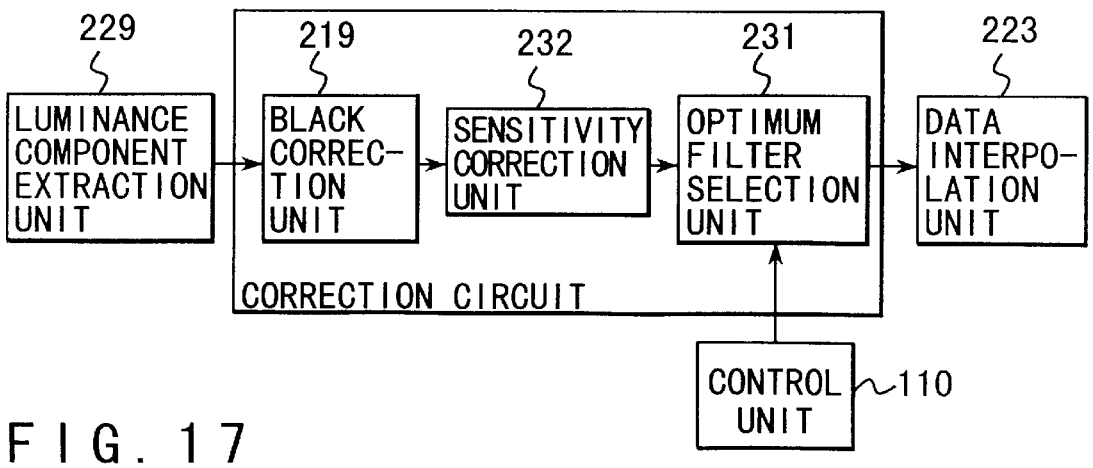
F I G. 17

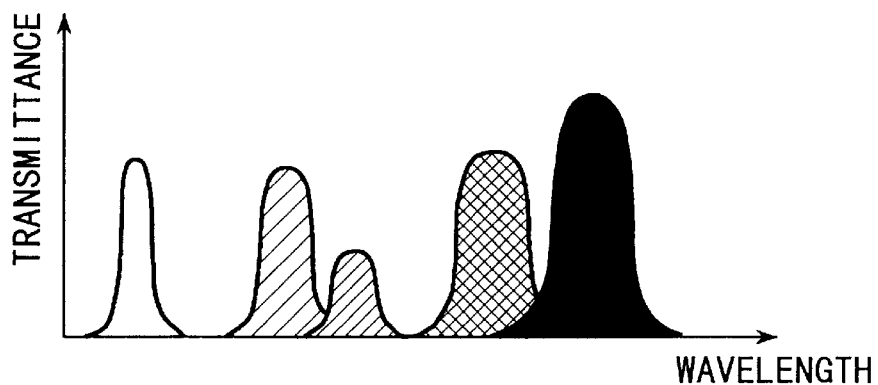
F I G. 2 2 A
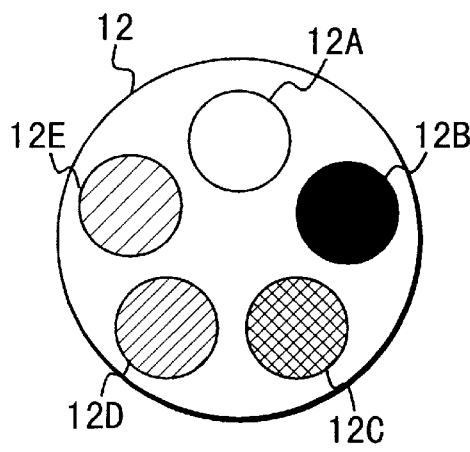 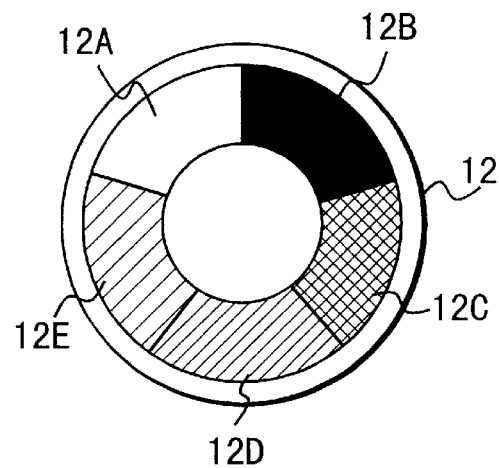
F I G. 2 2 B          F I G. 2 2 C
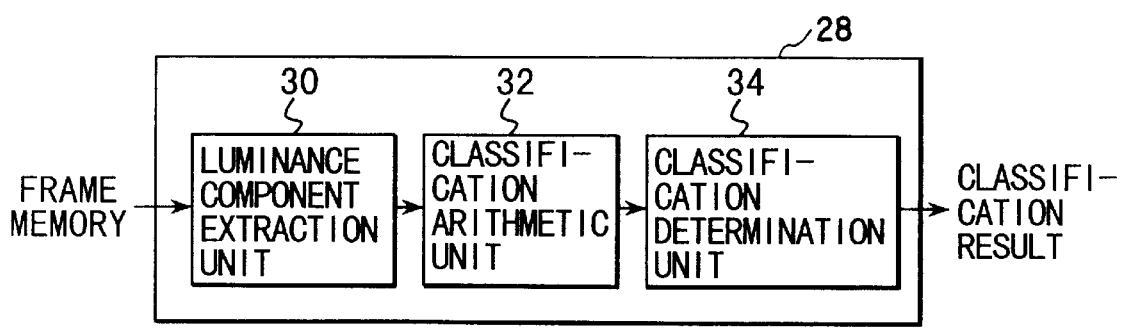
F I G. 2 3

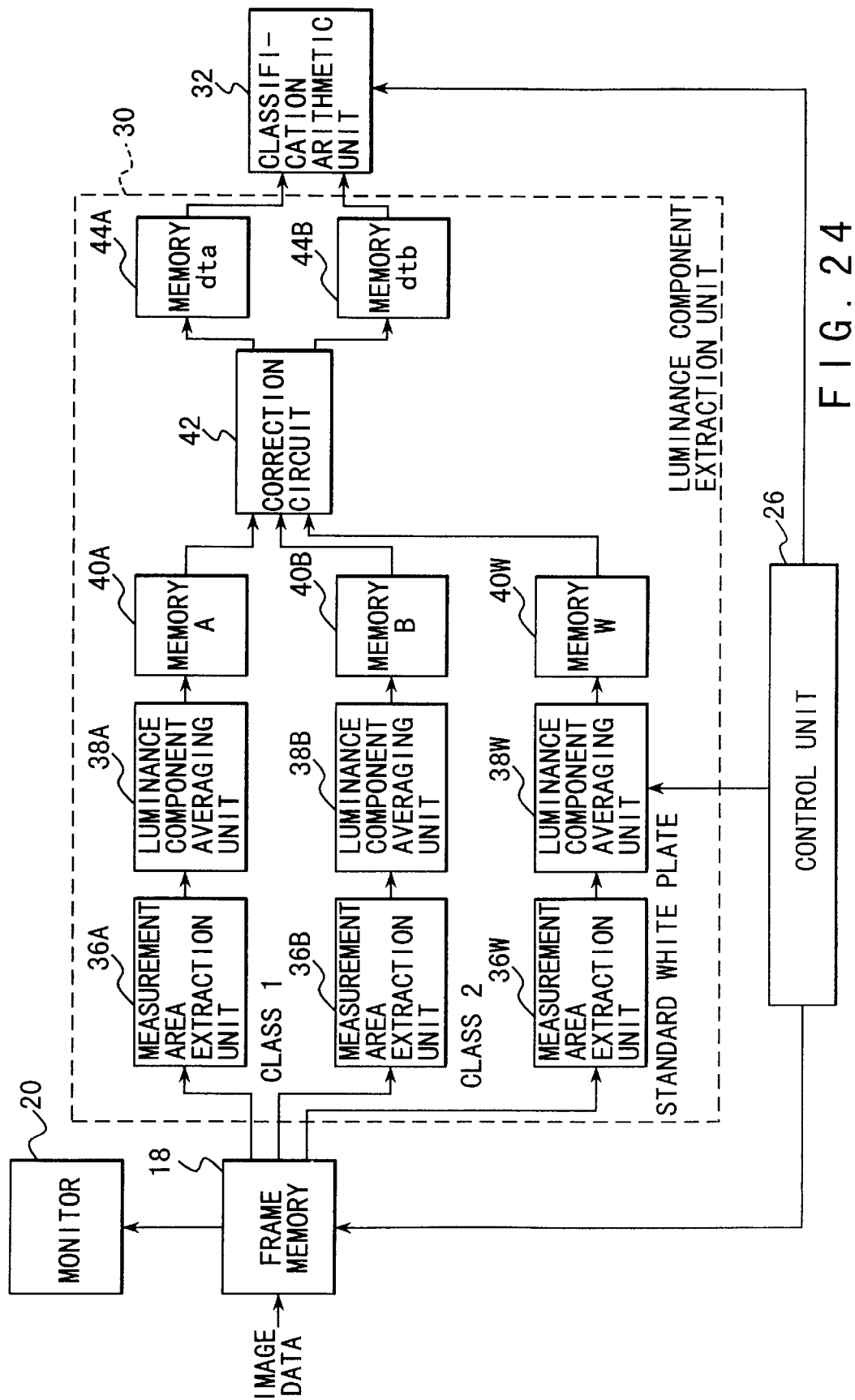
F I G. 24

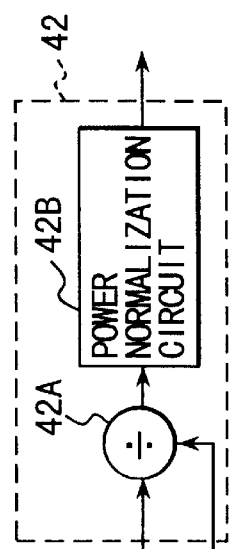
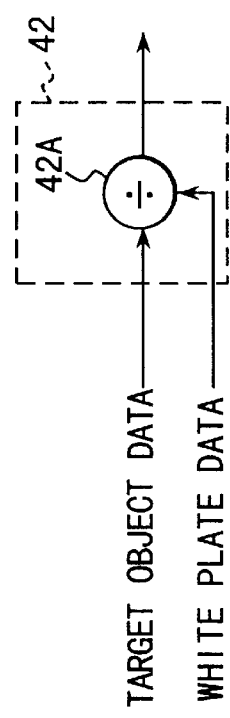
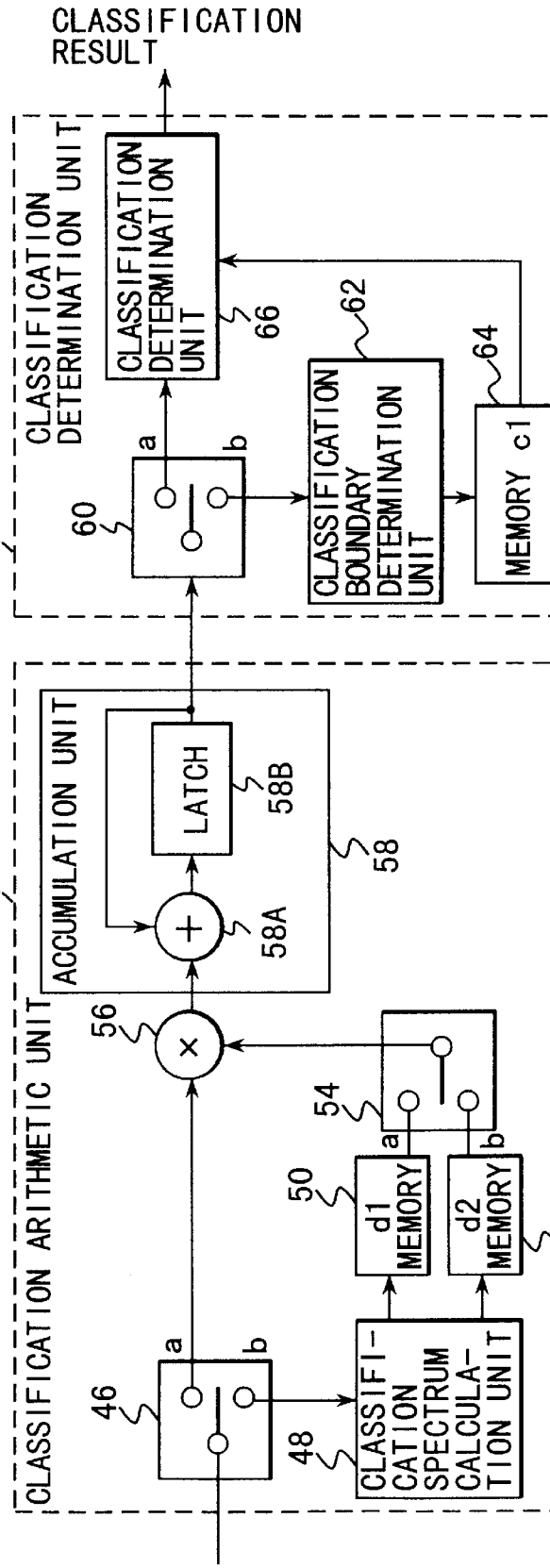
FIG. 25A
FIG. 25B
FIG. 25C

COLORIMETRIC SYSTEM HAVING FUNCTION OF SELECTING OPTIMUM FILTER FROM A PLURALITY OF OPTICAL BANDPASS FILTERS

BACKGROUND OF THE INVENTION

The present invention relates to a calorimetric apparatus and method of classifying, determining, or identifying a target object by using colors.

Conventionally, a color classification apparatus for classifying colors of target objects is used in management of painting colors and the degree of dyeing, colorimetry of products at production sites in various industries, or colorimetry of specimens in medical and scientific fields.

As a color classification apparatus of this type, an inexpensive apparatus having a simple arrangement and resistance to mechanical vibrations is desired.

Particularly, although color classification in, e.g., a factory can be performed while limiting the light source, an apparatus capable of satisfactorily classifying colors even when the light source is not limited, i.e., even when the spectrum changes, is desired.

U.S. Ser. No. 08/321,667, which has issued as U.S. Pat. No. 5,717,605 and which is referred to herein as the "prior application", discloses an invention which relates to an inexpensive color classification apparatus having a simple arrangement and resistance to mechanical vibrations and capable of satisfactorily classifying colors even when the light source is not limited, i.e., even when the spectrum changes.

The color classification apparatus disclosed in this prior application is characterized by comprising an image pickup means for picking up the reflection spectrum of a target object, a plurality of bandpass filters arranged between the target object and the image pickup means and having different bands, and a classification means for calculating a classification spectrum for classification using a statistical method from the reflection spectrum of the target object whose image is picked up by the image pickup means and classifying the target object by using the classification spectrum.

According to the color classification apparatus of this prior application, the plurality of bandpass filters having different bands are prepared and arranged between the target object and the image pickup means.

The classification means calculates the classification spectrum for classification using the statistical method from the reflection spectrum of the target object whose image is picked up by the image pickup means and classifies the target object by using this classification spectrum.

The principle of the color classification apparatus of the prior application will be described first.

The color classification apparatus of the prior application uses a filter as shown in FIGS. 22B or 22C which combines a plurality of bandpass filters for transmitting specific wavelengths as shown in FIG. 22A, thereby realizing an inexpensive color classification apparatus having a simple arrangement.

To perform color classification even under different light sources, the color classification apparatus of the prior application measures the reflection spectrum of an appropriate reference plate under the same conditions as those in picking up the image of the target object and corrects the reflection spectrum of the target object with the reflection spectrum of the reference plate, thereby removing the influence of the light source (illumination light).

More specifically, when the wavelength is represented by $\lambda$; the reflection spectrum of the target object, $f(\lambda)$; the reflection spectrum of the reference plate, $s(\lambda)$; the reflection spectrum of the illumination light, $L(\lambda)$; and the sensitivity spectrum of the photographing system (e.g., the transmittance spectrum of the photographing lens and the sensitivity spectrum of the photographing device), $M(\lambda)$, a photographic spectrum $gi(\lambda)$ of the target object and a photographic spectrum $gs(\lambda)$ of the reference plate are represented by equations below, respectively:

$$gi(\lambda) = f(\lambda) \times L(\lambda) \times M(\lambda)$$

$$gs(\lambda) = s(\lambda) \times L(\lambda) \times M(\lambda)$$

A spectrum $gi'(\lambda)$ of the target object can be represented by equation (1):

$$gi'(\lambda) = gi(\lambda)/gs(\lambda) = f(\lambda)/s(\lambda) \qquad (1)$$

With this method, the color classification apparatus of the prior application can remove the influence of the reflection spectrum $L(\lambda)$ of the illumination light. Using $gi'(\lambda)$, target objects can be classified under different light sources.

When the luminance of illumination light changes, the power of the signal $gi'(\lambda)$ after removal of the influence of the reflection spectrum $L(\lambda)$ of the illumination light may be normalized.

The color classification apparatus of the prior application which classifies target objects of two classes will be described below.

FIG. 21 is a view showing the arrangement of the color classification apparatus. The color classification apparatus of the prior application comprises an optical system 10 containing a stop and a lens, a rotary color filter 12 constituted by a plurality of bandpass filters 12A to 12E as shown in FIG. 22A, a CCD 14 for picking up the images of a target object O and a reference plate R, an A/D converter 16, a frame memory 18, a monitor 20 for displaying a portion which is being photographed, a CCD driver 22, a driving motor 24 for the rotary color filter 12, a control unit 26 for controlling the CCD driver 22, the driving motor 24, and the like and also sending a command to a classification arithmetic circuit 28, and the classification arithmetic circuit 28 for performing classification.

As shown in FIG. 22B, the rotary color filter 12 is constituted by the bandpass filters 12A to 12E of several types. Each filter has characteristics for transmitting an arbitrary bandwidth as shown in FIG. 22A.

For descriptive and illustrative convenience, an example wherein the rotary color filter 12 is constituted by five bandpass filters will be explained.

As for the arrangement of the optical system 10 and the rotary color filter 12, the rotary color filter 12 may be placed before the optical system 10.

As shown in FIG. 23, the classification arithmetic circuit 28 comprises a luminance component extraction unit 30 for extracting the luminance component of the target object O, a classification arithmetic unit 32 for performing calculation (e.g., FS transform) for classification, and a classification determination unit 34 for performing learning for classification determination and performing classification determination.

As shown in FIG. 24, the luminance component extraction unit 30 has three measurement area extraction units 36A, 36B, and 36W for extracting the measurement areas of the target object O and the reference plate R from the photographed images, three luminance component averaging units 38A, 38B, and 38W for calculating the averages of the measured luminance components, a luminance component memory "A" 40A in which the luminance component of photographed data of class 1 or unknown class is written, a luminance component memory "B" 40B in which the luminance component of photographed data of class 2 is written, a luminance component memory "W" 40W in which the luminance component of photographed data of the reference plate R is written, a correction circuit 42 for correcting the influence of the light source, a luminance spectrum memory "dta" 44A in which the corrected data of class 1 or unknown class is written, and a luminance spectrum memory "dtb" 44B in which the corrected data of class 2 is written.

Luminance components corresponding to the number of bandpass filters (five in this example) constituting the rotary color filter 12 can be written in the luminance component memories 40A, 40B, and 40W.

The correction circuit 42 is constituted by a divider 42A, as shown in FIG. 25A, or the divider 42A and a power normalization circuit 42B, as shown in FIG. 25B.

The arrangement shown in FIG. 25B will be described below.

Luminance components (each luminance component consists of data corresponding to the number of filters) corresponding to a sample count N of data to be photographed can be written in the luminance spectrum memories 44A and 44B.

As shown in FIG. 25C, the classification arithmetic unit 32 comprises a change-over switch "A" 46, a classification spectrum calculation unit 48 for calculating the classification spectrum, a classification spectrum d1 memory 50 in which a classification spectrum d1 is written, a classification spectrum d2 memory 52 in which a classification spectrum d2 is written, a change-over switch "B" 54, a multiplier 56, and an accumulation unit 58 constituted by an adder 58A and a latch circuit 58B to perform accumulation.

As shown in FIG. 25C, the classification determination unit 34 comprises a change-over switch "C" 60, a classification boundary determination unit 62 for determining the classification boundary, a classification boundary memory "c1" 64 in which the determined classification boundary is written, and a classification determination unit 66 for performing classification determination.

Processing of classifying target objects of two classes by using the color classification apparatus having the above arrangement will be described next.

In this processing, a learning mode is executed first to obtain the classification boundary, and a classification mode is executed next to perform color classification for data of unknown class.

The learning mode will be described first.

In the learning mode, a classification spectrum for classifying the target objects O of two classes as shown in FIG. 26 is obtained.

The control unit 26 adjusts the direction and focal length of the optical system 10 to simultaneously pick up the images of the target objects of two classes.

Focus adjustment is performed by a focus adjustment mechanism (not shown). At the same time, photometry is performed by a photometer (not shown), and the stop of the optical system 10 and the exposure time of the CCD 14 are set.

The position of the rotary color filter 12 is controlled such that the photographing operation is performed through the first bandpass filter (e.g., 12A) of the rotary color filter 12.

When a photographing command is sent to the CCD driver 22, the first image is picked up.

The image data picked up by the CCD 14 is A/D-converted by the A/D converter 16, transferred to the frame memory 18, and stored in the frame memory 18.

The image data stored in the frame memory 18 is loaded in the classification arithmetic circuit 28.

The classification arithmetic circuit 28 transfers the image data to the luminance component extraction unit 30.

In the luminance component extraction unit 30, the measurement area extraction units 36A and 36B extract classification target areas for classes 1 and 2, respectively, from the loaded image data and extract luminance components in units of pixels of the classification target areas.

The luminance component averaging units 38A and 38B detect the average values of luminances in the respective areas. The detected average values are written in the luminance component memories 40A and 40B.

These values will be referred to as data da1 and db1.

Next, the rotary color filter 12 is rotated to pick up the second image through the second filter (e.g., 12B), and in a similar fashion, average values are written in the luminance component memories 40A and 40B.

These values will be referred to as data da2 and db2.

The same operation is repeated to the fifth filter (e.g., 12E) so that data da3, da4, and da5 are written in the luminance component memory "A" 40A, and data db3, db4, and db5 are written in the luminance component memory "B" 40B.

That is, in the series of operations, data dai (i=1 to 5) are written in the luminance component memory "A" 40A, and data dbi (i=1 to 5) are written in the luminance component memory "B" 40B.

Next, the reference plate R is set near the target objects, and the image of the reference plate R is photographed through the five filters, as described above, and data dwi (i=1 to 5) are written in the luminance component memory "W" 40W.

The correction circuit 42 reads out data, for class 1, from the luminance component memory "A" 40A and the luminance component memory "W" 40W, and for class 2, from the luminance component memory "B" 40B and the luminance component memory "W" 40W and corrects the data.

This correction is performed by dividing the data from the luminance component memory "A" 40A by the data from the luminance component memory "W" 40W in units of filter components by the divider 42A in accordance with equations (2a) below:

$$da^m i' = da^m i / dwi \text{(for } i=1 \text{ to } 5, m=1 \text{ to } N)$$

$$db^m i' = db^m i / dwi \text{(for } i=1 \text{ to } 5, m=1 \text{ to } N) \tag{2a}$$

Where i is the filter number, and m is the sample number.

With this calculation, the influence of different light sources (spectral characteristics) can be removed.

The power normalization circuit 42B calculates equations (2b) below using power values $Ca^m$ and $Cb^m$ such that the power values of the data divided by the correction circuit 42 are equalized:

$$da^m i'' = da^m i' / Cam \text{(for } i=1 \text{ to } 5, m=1 \text{ to } N)$$

$$db^m i'' = db^m i' / Cbm \text{(for } i=1 \text{ to } 5, m=1 \text{ to } N)$$

where the power values $Ca^m$ and $Cb^m$ are given by equations (2c):

$$Ca^m = \sum_{i=1}^{5} da^m i', \qquad (2c)$$

$$Cb^m = \sum_{i=1}^{5} db^m i'$$

or equations (2d):

$$Ca^m = \sum_{i=1}^{5} (da^m i')^2, \qquad (2d)$$

$$Cb^m = \sum_{i=1}^{5} (db^m i')^2$$

With this power normalization, the influence of a change in luminance of the light source can be removed.

Resultant $da'''i''$ and $db'''i''$ are written in the luminance spectrum memory "dta" 44A and the luminance spectrum memory "dtb" 44B, respectively, as luminance spectra.

The above correction is repeated a number of times corresponding to the sample count N of the target objects, and luminance spectra are written in the luminance spectrum memory "dta" 44A and the luminance spectrum memory "dtb" 44B.

For the sample, the target object itself may be exchanged, or different areas of the same target object may be used.

With this processing, luminance spectrum data corresponding to the sample count N of the target objects are written in the luminance spectrum memory "dta" 44A and the luminance spectrum memory "dtb" 44B.

If the target objects of two classes cannot be simultaneously photographed, the photographing and correction operations are performed for the target object and reference plate in units of classes, and the luminance spectra are written in the luminance spectrum memory "dta" 44A and the luminance spectrum memory "dtb" 44B.

This operation is performed a number of times corresponding to the sample count N.

In the classification arithmetic unit 32, the change-over switch "A" 46 is switched to the terminal b side.

The luminance spectrum data associated with classes 1 and 2 are read out from the luminance spectrum memory "dta" 44A and the luminance spectrum memory "dtb" 44B, respectively. The classification spectrum calculation unit 48 obtains a classification spectrum d1i (i=1 to 5) and a classification spectrum d2i (i=1 to 5) perpendicular to the classification spectrum d1i by using FS transform.

The classification spectrum d1i and classification spectrum d2i obtained in the above manner are written in the classification spectrum d1 memory 50 and the classification spectrum d2 memory 52, respectively.

The change-over switch "A" 46 is switched to a terminal a side, and simultaneously, the change-over switch "C" 60 of the classification determination unit 34 is switched to the terminal b side.

The change-over switch "B" 54 is switched to the terminal a side. The luminance spectrum data $da'''i''$ and the classification spectrum data d1i are read out from the luminance spectrum memory "dta" 44A and the classification spectrum d1 memory 50, respectively. The inner product is calculated by the multiplier 56 and the accumulation unit 58:

$$ta^m 1 = \sum_{i=1}^{5} (da^m i'' \times d1i) \qquad (3)$$

The calculation result is transferred to the classification boundary determination unit 62 of the classification determination unit 34.

The luminance spectrum data $db'''i''$ and the classification spectrum data d1l are read out from the luminance spectrum memory "dtb" 44B and the classification spectrum d1 memory 50, respectively. The inner product is calculated as described above:

$$tb^m 1 = \sum_{i=1}^{5} (db^m i'' \times d1i) \qquad (4)$$

The calculation result is transferred to the classification boundary determination unit 62.

The change-over switch "B" 54 is switched to the terminal b side. The luminance spectrum data $da'''i''$ and the classification spectrum d2i are read out from the luminance spectrum memory "dta" 44A and the classification spectrum d2 memory 52, respectively. The inner product is calculated:

$$ta^m 2 = \sum_{i=1}^{5} (da^m i'' \times d2i) \qquad (5)$$

The calculation result is transferred to the classification boundary determination unit 62.

The luminance spectrum data $db'''i''$ and the classification spectrum d2i are read out from the luminance spectrum memory "dtb" 44B and the classification spectrum d2 memory 52, respectively. The inner product is calculated:

$$tb^m 2 = \sum_{i=1}^{5} (db^m i'' \times d2i) \qquad (6)$$

The calculation result is transferred to the classification boundary determination unit 62.

The above processing is performed a number of times corresponding to the sample count for each class.

Using the obtained inner product values, the classification boundary is determined by the classification boundary determination unit 62, as shown in FIG. 25, and written in the classification boundary memory "c1" 64.

The learning mode has been described above.

The classification mode will be described next.

In the classification mode, the target objects O of an unknown class to be classified as shown in FIG. 26 are photographed, as in the learning mode, and a luminance spectrum dxi (i=1 to 5) is written in the luminance component memory "A" 40A.

Subsequently, the reference plate. R is photographed under the same photographing conditions, and the luminance spectrum dwi (i=1 to 5) is written in the luminance component memory "W" 40W.

The data are read out from the luminance component memories "A" 40A and "W" 40W and corrected by the correction circuit 42 on the basis of the equation below:

$$dxi''=dxi'/Cx \text{(for i=1 to 5)}$$

In addition, the following equations are calculated such that the power value of the divided data is normalized by the power normalization circuit 42B:

$$Cx = \sum_{i=1}^{5} dxi'$$

A spectrum dxi" is written in the luminance spectrum memory "dta" 44A.

The change-over switch "A" 46 of the classification arithmetic unit 32 is switched to the terminal a side, and the change-over switch "C" 60 of the classification determination unit 34 is switched to the terminal a side.

The change-over switch "B" 54 of the classification arithmetic unit 32 is switched to the terminal a side. The luminance spectrum dxi" and the classification spectrum data d1i are read out from the luminance spectrum memory "dta" 44A and the classification spectrum d1 memory 50, respectively. The inner product is calculated by the multiplier 56 and the accumulation unit 58:

$$tx1 = \sum_{i=1}^{5} (dxi'' \times d1i) \quad (7)$$

A value tx1 is transferred to the classification determination unit 66 of the classification determination unit 34.

The change-over switch "B" 54 is switched to the terminal b side. The luminance spectrum data dxi" and the classification spectrum data d2i are read out from the luminance spectrum memory "dta" 44A and the classification spectrum d2 memory 52, respectively. The inner product is calculated:

$$tx2 = \sum_{i=1}^{5} (dxi'' \times d2i) \quad (8)$$

A value tx2 is transferred to the classification determination unit 66.

The classification determination unit 66 reads out the classification boundary from the classification boundary memory "c1" 64, determines, on the basis of the readout data, on which side of the classification boundary the transferred inner product values tx1 and tx2 exist, and outputs the classification result.

The operation described above is the classification mode.

As described above, in the color classification apparatus of the prior application, the difference in the spectral characteristic between light sources is corrected by the divider 42A, and the difference between luminances is corrected by the power normalization circuit 42B. For this reason, satisfactory classification can be performed even under different light sources.

In addition, since the power normalization circuit 42B is used, as shown in FIG. 25B, satisfactory classification can be performed even in case of a change in luminance of the light source.

If not the spectrum but only the luminance of the light source changes, the divider 42A can be omitted, and the power normalization circuit 42B suffices.

This apparatus has a simple arrangement using the rotary color filter 12 and is therefore inexpensive and resistible to mechanical vibrations.

The apparatus readily copes with different classification purposes because it has the learning and classification modes.

Alternatively, as shown in FIG. 29, the classification arithmetic unit 32 may have a plurality of sets of pairs of the classification spectrum d1 and d2 memories 50 and 52 for storing the already learned classification spectra d1i and d2i and change-over switches "B" 54 for selecting one of the pairs of classification spectrum d1 and d2 memories 50 and 52. With this arrangement, when different learned classification spectra are stored in the classification spectrum d1 and d2 memories 50 and 52 of each pair, and a change-over switch "C'" 68 is used to select the pair of the classification spectrum d1 and d2 memories 50 and 52, the apparatus can instantaneously cope with different classification purposes.

In this example, the rotary color filter 12 has a structure in which the circular filters 12A to 12E are arranged on one circle, as shown in FIG. 22B. To stop the rotary color filter 12 at each filter, the position of the rotary color filter 12 is controlled in units of filters. When the filters 12A to 12E are formed into circular arcs and arranged on one circle to constitute the rotary color filter 12, position control for stopping the rotary color filter 12 at each filter need not be performed, so that the rotary color filter 12 can be continuously moved. With this arrangement, color classification processing for target objects can be performed at a higher speed.

In this case, however, the exposure timing of the CCD 14 must be synchronized with the rotation speed of the rotary color filter 12, as a matter of course.

The classification result may be displayed as images of different colors in accordance with classes or informed to the photographer with sounds.

In the color classification apparatus of the prior application the color components of the target objects are classified on the basis of multispectrum image data which is obtained by picking up the images of the target objects through the rotary filter having the plurality of optical bandpass filters with different pass band characteristics.

In the color classification apparatus of the prior application the plurality of optical bandpass filters to be used are optimized in accordance with the target object. When the target object changes, or an unknown target is used, the plurality of optical bandpass filters must be exchanged, so room is left for an improvement in versatility.

In addition, for the color classification apparatus of this prior application, a specific technique of optimizing the plurality of measurement filters which must be prepared in advance as filters for measuring the color of the target object is neither disclosed nor proposed.

In the prior application an apparatus having a means for exchanging the plurality of optical bandpass filters in accordance with the light source is disclosed, although no filter exchanging means for various target objects is described.

The present inventors have also filed in another application, U.S. Ser. No. 08/701,123, which is referred to as the "second prior application", a highly versatile color classification apparatus which is applicable to various target objects and comprises an image pickup means for picking up the image of light from a target object, an optical means for allowing the light from the target object to form an image on the image pickup means, a plurality of optical bandpass filters arranged between the target object and the image pickup means and having different pass bands, a switching means for switching the plurality of optical bandpass filters, and an arithmetic processing means for performing classification or determination using a statistical method on the basis of the spectral characteristics of the photographed target object, wherein the plurality of optical bandpass filters include a plurality of measurement filters for measuring the colors of the target object, and an inspection filter for determining, from the plurality of measurement filters, a filter to be applied to the target object, and the switching means switches/selects the effective measurement filter on the basis of the result detected using the inspection filter.

However, the second prior application, like the above described first prior application, does not disclose or propose a specific technique of optimizing the plurality of measurement filters which must be prepared in advance as filters for measuring the color of the target object.

That is, when the plurality of measurement filters themselves which must be prepared in advance are optimized, effective color classification can be immediately performed without switching/selecting the effective measurement filter on the basis of the result detected using the inspection filter. This, however, is not achieved by the color classification apparatus of the second prior application.

BRIEF SUMMARY OF THE INVENTION

The present invention has been made in consideration of the above situation, and has as its object to provide a calorimetric apparatus and method which enable to immediately perform effective colorimetry including color classification by optimizing a plurality of measurement filters themselves which must be prepared in advance, thereby allowing colorimetry including more precise and proper color classification.

According to the first aspect of the present invention, there is provided a calorimetric apparatus comprising image pickup means for picking up an image of light from a target object, optical means for allowing the light from the target object to form an image on the image pickup means, a plurality of optical bandpass filters arranged between the target object and the image pickup means and having different pass bands, switching means for switching the plurality of optical bandpass filters, and optimum filter selection means for selecting, from the plurality of optical bandpass filters, a filter suitable for colorimetry of the target object.

According to the second aspect of the present invention, there is provided a calorimetric method of performing colorimetry of target object whose image is picked up by passing light from the target object through an optical system while switching a plurality of optical bandpass filters having pass bands different from each other, comprising the optimum filter selection step of selecting, from the plurality of optical bandpass filters, a filter suitable for colorimetry of the target object.

According to the arrangement of the first aspect, the following function/effect can be obtained.

(Function) A set of a few of filters optimum for colorimetry is selected from the plurality of optical bandpass filters which have different pass bands to pick up the image of the light from the target object.

(Effect) Since data of limited filters which are actually effective for colorimetry can be used, precise colorimetry can be performed without being affected by unnecessary noise.

In addition, since colorimetry can be realized with a small number of filters, a compact apparatus can be manufactured at a low cost.

Furthermore, since colorimetry can be realized with a smaller number of times of photographing processing and data processing, the processing result can be obtained at a high speed.

According to the arrangement of the second aspect of the present invention, the following function/effect can be obtained.

(Function) Colorimetry (color classification or color determination) is performed using the statistical method on the basis of the spectral characteristics of the target object whose image is picked up using the optimum filter.

(Effect) Since colorimetry (color classification or color determination) is performed by the statistical method using data of effective filters, precise colorimetry (color classification or color determination) can be performed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 2A and 2B are block diagrams showing the arrangements of an optimum filter selection circuit and a vector extraction unit in the first embodiment;

FIG. 3 is a view showing first and second vectors in the first embodiment;

FIG. 5 is a flow chart showing the processing contents of preprocessing in the first embodiment;

FIG. 9 is a table showing a detailed example of overall determination in the first embodiment;

FIG. 10 is a flow chart showing a detailed example of overall determination in the first embodiment;

FIGS. 13A and 13B are block diagrams showing the arrangements of a color value arithmetic circuit and an optimum filter selection circuit in the second embodiment;

FIGS. 16A and 16B are block diagrams showing the arrangement of a spectrum data calculation unit and another arrangement of the luminance component extraction unit in the second embodiment;

FIG. 17 is a block diagram showing the arrangement of a correction circuit in the second embodiment;

FIG. 22A is a graph showing the characteristics of a plurality of bandpass filters used for a rotary color filter used in the calorimetric apparatus according to the prior application for the present invention;

FIGS. 22B and 22C are views showing the structures of the rotary color filter;

FIG. 23 is a block diagram of a classification arithmetic circuit shown in FIG. 21;

FIG. 24 is a block diagram of a luminance component extraction unit shown in FIG. 23;

FIGS. 25A and 25B are block diagrams showing the arrangements of a correction circuit shown in FIG. 24;

FIG. 25C is a block diagram showing the arrangements of a classification arithmetic unit and a classification determination unit shown in FIG. 23;

DETAILED DESCRIPTION OF THE INVENTION

Figure 1:
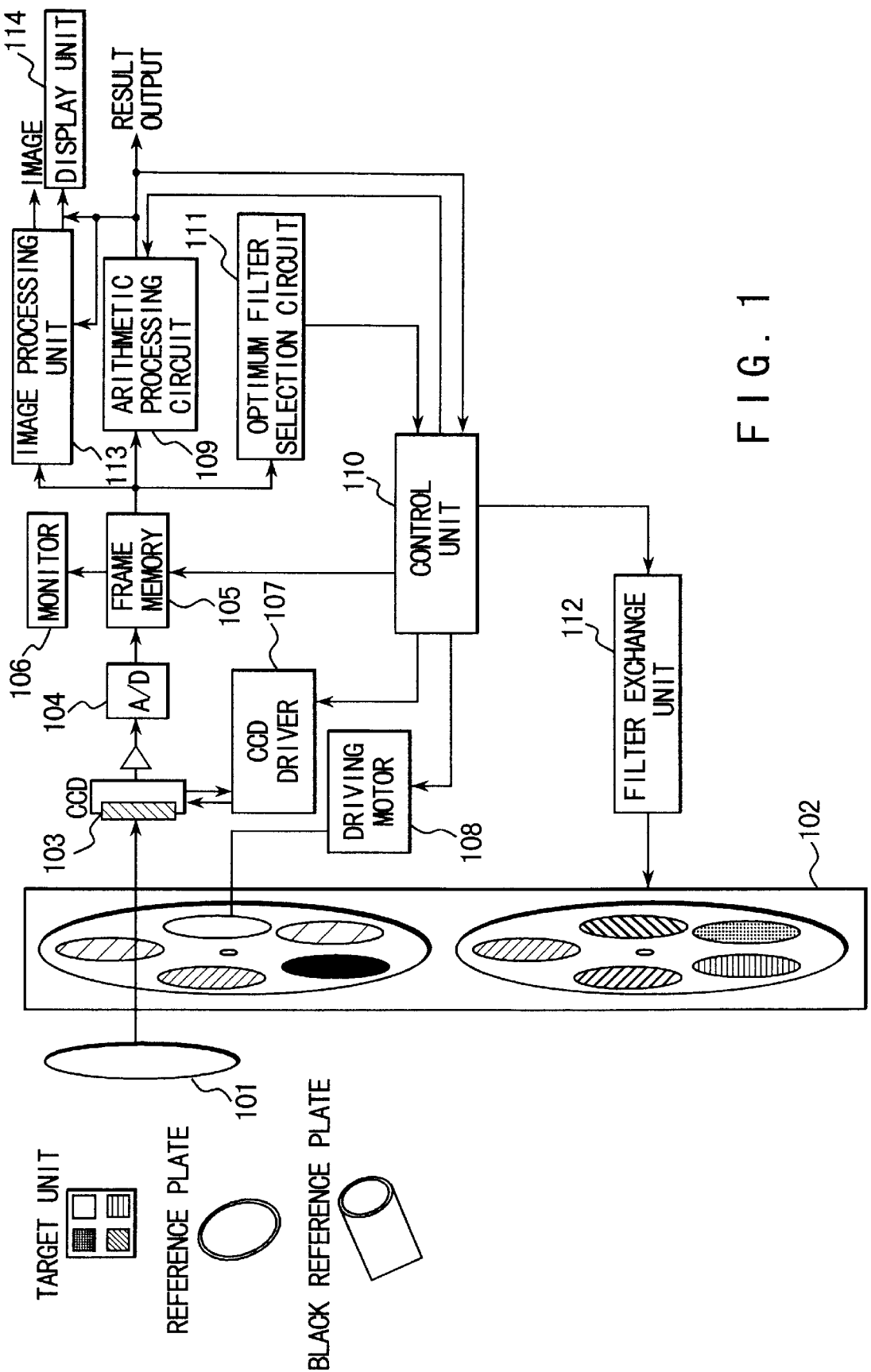
FIG. 1 is a view showing the arrangement of a colorimetric apparatus according to the first embodiment of the present invention.

Reference will now be made in detail to the presently preferred embodiments of the invention as illustrated in the accompanying drawings, in which like reference characters designate like or corresponding parts throughout the several drawings.

Embodiments of a calorimetric apparatus and method according to the present invention will be described below with reference to the accompanying drawing.

First Embodiment

The first embodiment is applied to a colorimetric apparatus comprising, basically like the color classification apparatus disclosed in the above-described prior application, i.e., U.S. Ser. No. 08/321,667, an image pickup means for picking up the reflection spectrum of a target object, a plurality of bandpass filters arranged between the target object and the image pickup means and having different bands, and a classification means for calculating a classification spectrum for classification using a statistical method from the reflection spectrum of the target object whose image is picked up by the image pickup means and classifying the target object by using the classification spectrum.

As shown in FIG. 1, the first embodiment comprises, like the color classification apparatus described in the prior application, i.e., U.S. Ser. No. 08/321,667, an optical system 101 including a stop and a lens, a rotary color filter 102 constituted by a plurality of bandpass filters 12A to 12E as shown in FIG. 22, a CCD 103 for picking up the images of an target object and a reference plate, an A/D converter 104, a frame memory 105, a monitor 106 for displaying a portion which is being photographed, a CCD driver 107, a driving motor 108 for the rotary color filter 102, and an arithmetic processing circuit 109 for performing the same classification calculation as that of the classification arithmetic circuit 28 of the color classification apparatus according to the second prior application, i.e., U.S. Ser. No. 08/701,123.

The colorimetric apparatus also comprises a control unit 110 for controlling the CCD driver 107 and the rotary color filter driving motor 108 and sending a command to the arithmetic processing circuit 109, and, like the color classification apparatus according to the second prior application disclosed in U.S. Ser. No. 08/701,123, an image processing unit 113 and a display unit 114.

An arrangement unique to the first embodiment is that the calorimetric apparatus has an optimum filter selection circuit 111 and a filter exchange unit 112.

The optimum filter selection circuit 111 selects a filter suitable for classification or determination by the arithmetic processing circuit 109 from the plurality of bandpass filters 12A to 12E, as will be described later.

More specifically, the optimum filter selection circuit 111 comprises a vector preparation unit 111a, target portion extraction unit 111b, and a vector extraction unit 111c, as shown in FIG. 2A. When the image pickup means including the CCD 103 selects one of a plurality of (q) portions of each of a plurality of (p) target objects, as shown in FIG. 3, and picks up the images of the target objects through a plurality of filters at a plurality of (m) wavelengths for each portion, the vector preparation unit 111a prepares first vectors [V(i)] associated with all the wavelengths in units of portions (i:i=1, 2, 3, . . . , p×q) from the images picked up by the image pickup means, and second vectors [U(k)] associated with all the portions in units of wavelengths (k:k=1, 2, 3, . . . , m) from the images picked up by the image pickup means. The target portion extraction unit 111b classifies the first vectors [V(i)] prepared by the vector preparation unit 111a into a plurality of classes, removes target portions associated with vectors unsuitable for the classes, and extracts only target portions suitable for classification. The vector extraction unit 111c selects the second vectors [U(k)] associated with the target portions which are extracted by the target portion extraction unit 111b, deletes vectors associated with wavelengths less contributing to classification from the second vectors [U(k)], and extracts vectors associated with wavelengths more contributing to classification.

The control unit 110 controls the filter exchange unit 112 (switching means) to select only an optical bandpass filter corresponding to the vector extracted by the vector extraction unit 111c for an image pickup operation.

As shown in FIG. 2B, the vector extraction unit 111c comprises a vector order setting unit 111d for setting the order of the vectors by a predetermined plurality of methods (to be described later), and an overall determination unit 111e for determining overall whether vectors associated with wavelengths less contributing are removed in consideration of the order set by the vector order setting unit 111d in units of the plurality of methods and other restriction conditions.

Figure 4:
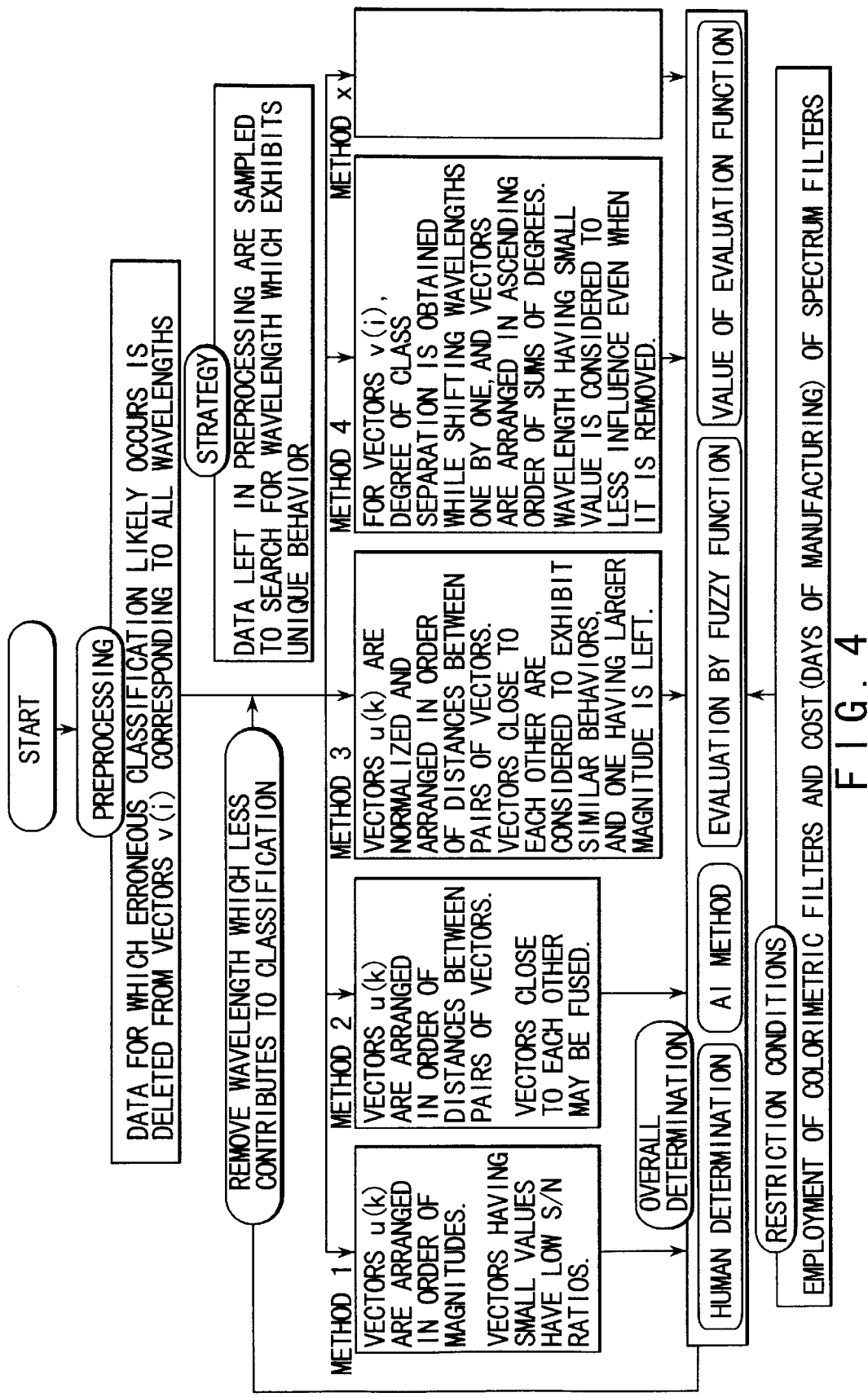
FIG. 4 is a view showing the operation principle of the first embodiment of the present invention.

FIG. 4 shows the concept of the overall determination process by the vector extraction unit 111c.

In preprocessing, processing T is performed to delete vectors corresponding to data for which erroneous classification likely occurs from the first vectors [V(i)] corresponding to all the wavelength data.

As shown in FIG. 5, in this preprocessing, the barycenter of each class is calculated in step S1.

In step S2, on the basis of a barycenter Gx of a class Cx of interest, a vector V closest to the barycenter Gx is searched for from vectors for each class other than the class of interest.

As the simplest method of realizing this search processing, distances from the barycenter Gx may be calculated for all the vectors. However, other methods may be used.

In step S3, a distance "x" between the vector V and the barycenter Gx calculated above is obtained.

In step S4, a distance "y" between the vector V and a barycenter Gy of a class Cy to which the vector V belongs is obtained.

In step S5, the distance "x" between the barycenter Gx and the vector V obtained in the above manner is compared with the distance "y" between the vector V and the barycenter Gy of the class Cy to which the vector V belongs.

If x<y, it is determined that confusion in classification likely occurs for the data, and the data is deleted.

In FIG. 5, in step S1' prior to step S2, it is determined whether all classes are selected as Cx.

If YES in step S1', the preprocessing is ended, and the flow advances to the next processing. If NO in step S1', the flow advances to step S2.

In step S2, attention is paid to a class which has not been selected yet as Cx (step S2a), and it is determined whether all classes other than this class Cx are selected as Cy (step S2b).

If NO in step S2b, attention is paid to a class other than the class Cx, which has not been selected yet as Cy (step S2c), and the vector V closest to the barycenter Gx of the class Cx is searched for from vectors in the class Cy (step S2d).

If YES in step S2b, the flow returns to step S1'.

Methods 1 to x shown in FIG. 4 are executed to sample the data left in preprocessing and leave only data having wavelengths which exhibit unique behaviors.

In method 1, the second vectors [U(k)] are arranged in the order of magnitudes, and vectors having small values, i.e., low S/N ratios are deleted.

In method 2, the second vectors [U(k)] are arranged in the order of distances between arbitrary pairs of vectors in a manner to be described later. When a pair of vectors are close to each other, it is determined that these data may be fused. One vector is left, and the other is deleted.

In method 3, the second vectors [U(k)] are normalized and arranged in the order of distances between arbitrary pairs of vectors. If a pair of vectors are close to each other, it is determined that these data may exhibit similar behaviors. One vector is left, and the other is deleted.

Figure 6:
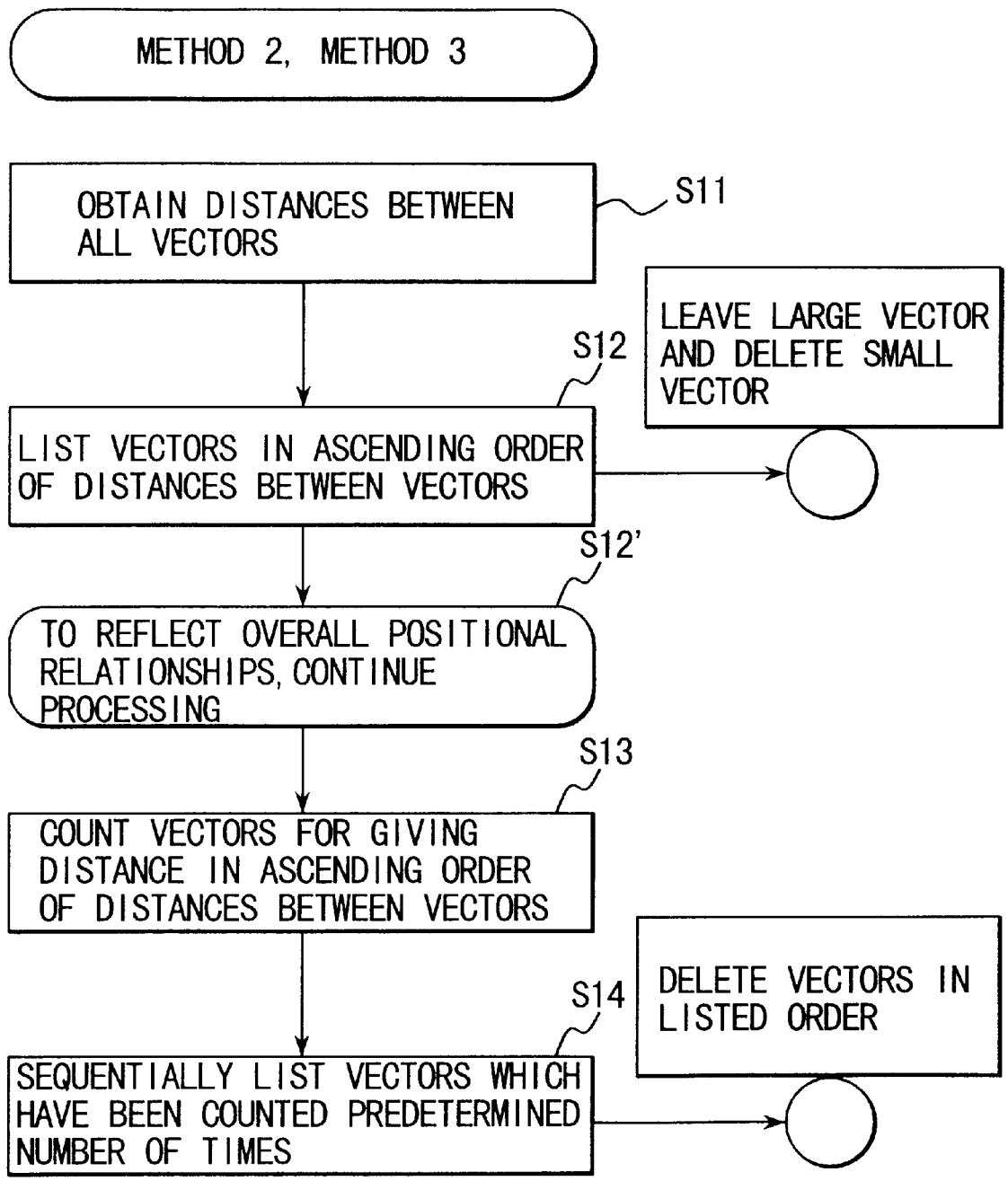
FIG. 6 is a flow chart showing the processing contents of preprocessing and method 3 in the first embodiment.

To arrange the second vectors [U(k)] in the order of distances between arbitrary pairs of vectors in method 2 or 3, distances between all pairs of vectors are obtained in step S11, as shown in FIG. 6.

In step S12, the vectors are listed in ascending order of distances between pairs of vectors.

In this case, processing is performed to leave, of a pair of vectors, a vector having a larger magnitude.

With the above processing, the purpose of deleting vectors corresponding to data having a probability of erroneous classification is achieved, and the preprocessing can be ended.

However, to reflect the positional relationship in the entire vectors independently of the distance between a specific pair of vectors (step S12'), the following processing is performed.

In step S13, vectors for giving a certain distance are counted in ascending order of distances between vectors.

In step S14, vectors which are counted a predetermined number of times are sequentially listed.

By deleting vectors in this order, vectors which are close to other vectors and likely to be replaced are sequentially deleted.

In method 4, the degree of class separation (to be described later) is obtained while removing the wavelength one by one for the first vectors [V(i)], and the vectors are arranged in ascending order of sums. Data of a wavelength for giving a small value is deleted because it is determined that the influence of deletion of this data is minimum.

Figure 7A:
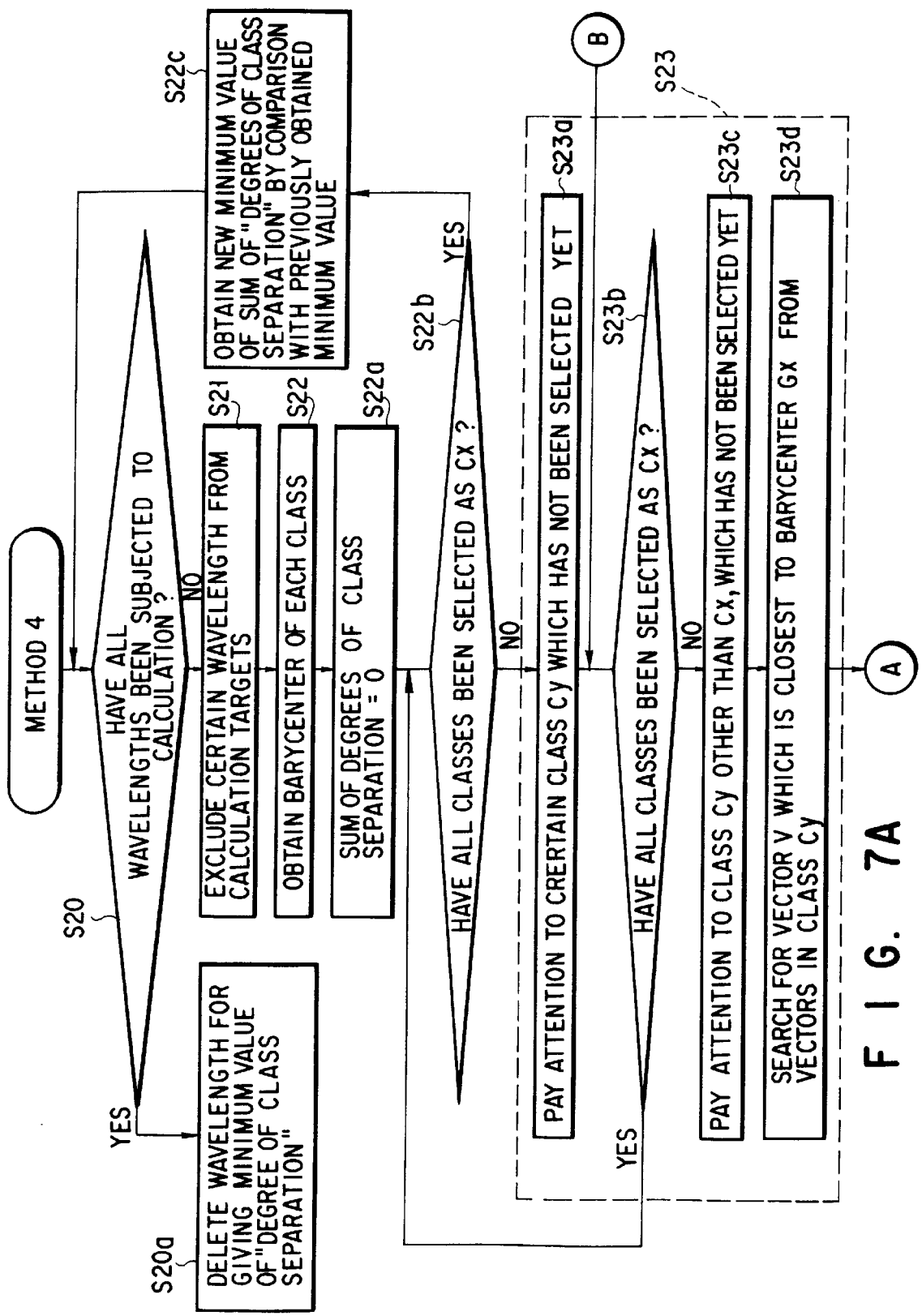
FIGS. 7A and 7B are flow charts showing the processing contents of method 4 in the first embodiment.
Figure 7B:
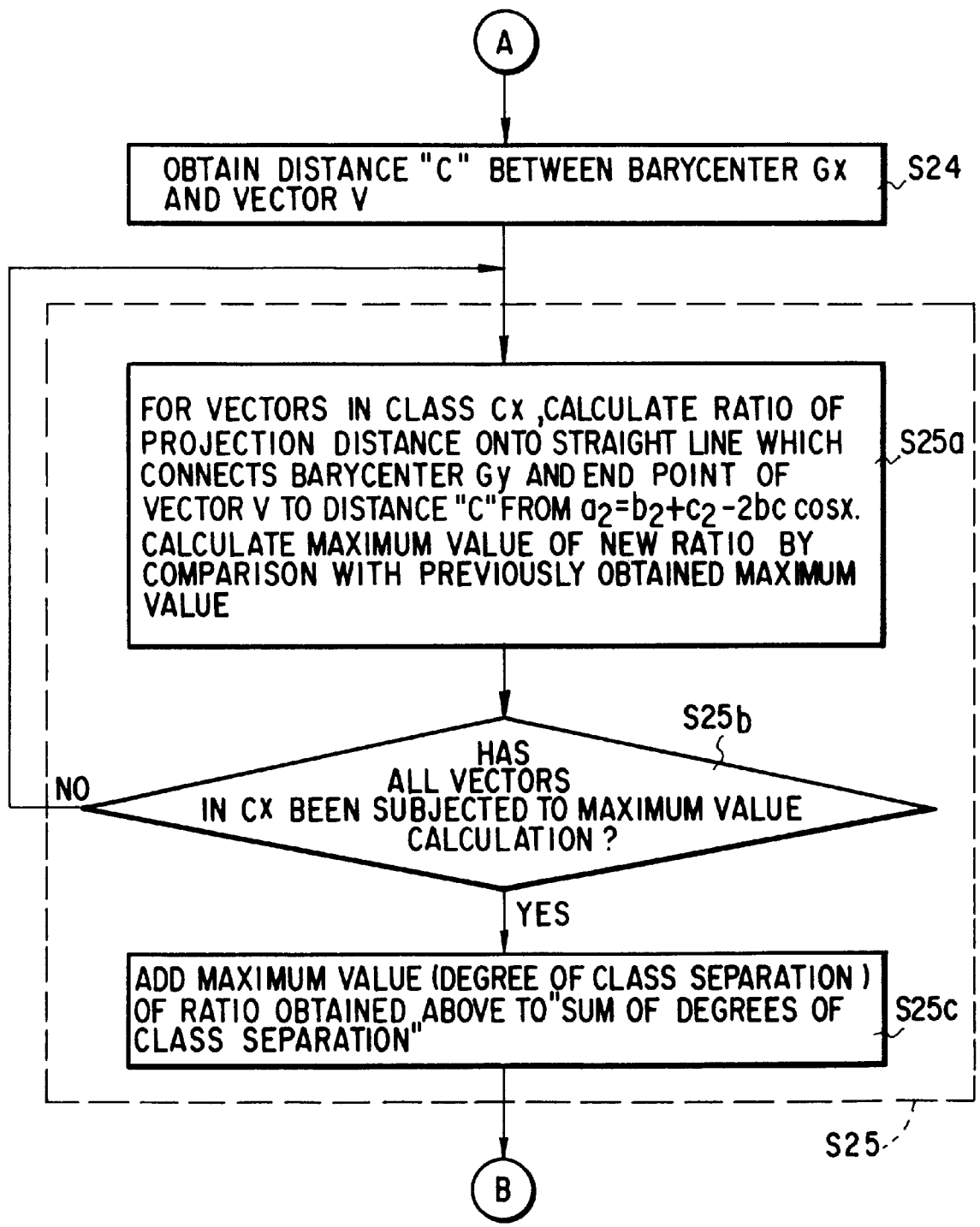

More specifically, in method 4, data of a certain wavelength is excluded from calculation targets in step S21, as shown in FIGS. 7A and 7B.

In step S22, the barycenter of each class is obtained.

In step S23, processing of searching for, on the basis of the barycenter of a class of interest, a vector closest to the barycenter is repeated for all classes other than the class of interest.

In step S24, a distance "c" between the barycenter and the vector obtained in the above manner is calculated.

In step S25, all maximum values of the ratios of projection distances to difference vectors between the barycenter of vectors in the class of interest and the adjacent vectors to the distances "c" are added.

Upon completion of processing of adding the obtained values for all classes, the flow returns to step S23.

In step S20 prior to step S21 in FIGS. 7A and 7B, it is determined whether all wavelengths are subjected to calculation.

If YES in step S20, a wavelength for giving the minimum value of the sum of the degrees of class separation is deleted (step S20a). If NO in step S20, the flow advances to step S21.

After step S22 and before step S23, the sum of the degrees of class separation is set to zero (step S22a), and it is determined whether all the classes are selected as Cx (step S22b).

If YES in step S22b, the new minimum value of the sum of the degrees of class separation is obtained from comparison with the previously obtained minimum value (step S22c), and the flow advances to step S20. If NO in step S22b, the flow advances to step S23.

In step S23, attention is paid to a class which has not been selected yet as Cx (step S23a), and it is determined whether all classes other than the class Cx are selected as Cy (step S23b).

If NO in step S23b, attention is paid to a class other than the class Cx, which has not been selected yet as Cy (step S23c), and the vector V closest to the barycenter Gx of the class Cx is searched for from vectors in the class Cy (step S23d).

If YES in step S23b, the flow returns to step S22b.

In step S25, for each vector in the class Cx, the ratio of the projection distance to a straight line which connects the barycenter Gx and the terminal point of the vector V to the distance "c" is calculated on the basis of an equation shown in FIGS. 7A and 7B.

A new maximum value of the ratio (degree of class separation) is obtained by comparing this ratio with the previously obtained minimum value of the ratio (step S25a). Thereafter, it is determined whether all vectors in the class Cx have been subjected to maximum value calculation (step S25b).

If NO in step S25b, the flow returns to step S25a.

If YES in step S25b, the new maximum value of the ratio (class separation value) obtained in step S25a is added to the sum of the degree of class separation (step S25c), and the flow returns to step S23b.

FIGS. 8A to 8E schematically show the processing contents of method 4.

Figure 8A:
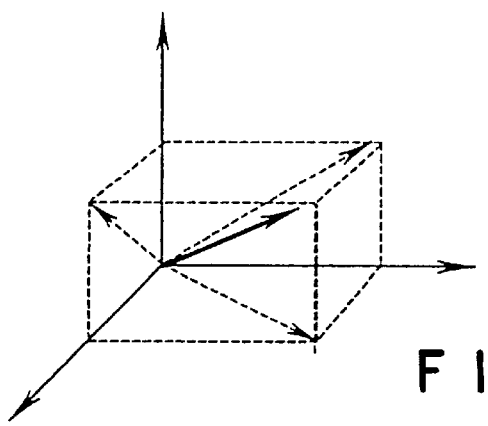
FIGS. 8A to 8E are schematic views showing the processing contents of method 4 in the first embodiment.

Referring to FIG. 8A, when data of a certain wavelength is to be excluded from calculation targets in step S21, i.e., when one of m vectors u(k) is to be deleted, and there are three wavelengths, the three-dimensional vectors are projected onto a two-dimensional plane by three methods.

Figure 8B:
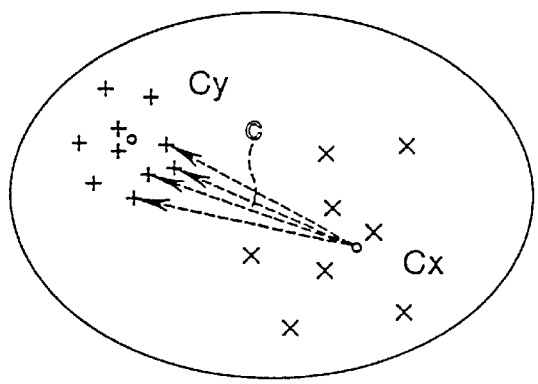

Referring to FIG. 8B, in step S23, on the basis of the barycenter of a class of interest, a vector closest to the barycenter is searched for from vectors in each of (all) classes other than the class of interest. That is, a vector c (adjacent vector) which belongs to a class other than the class of interest and is closest to the barycenter of the class of interest is selected.

Figure 8C:
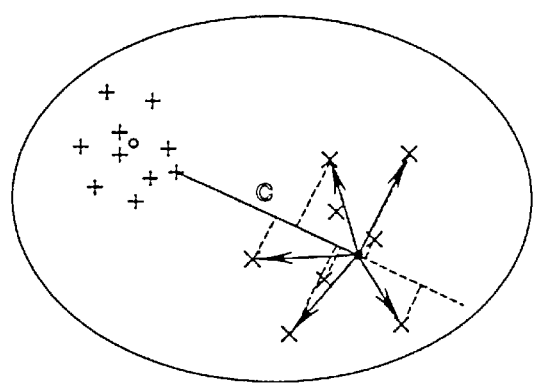
Figure 8D:
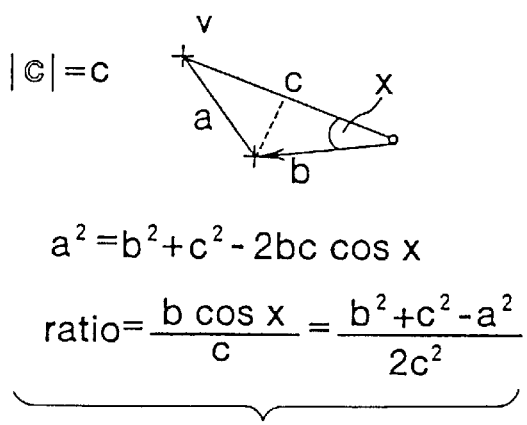
Figure 8E:
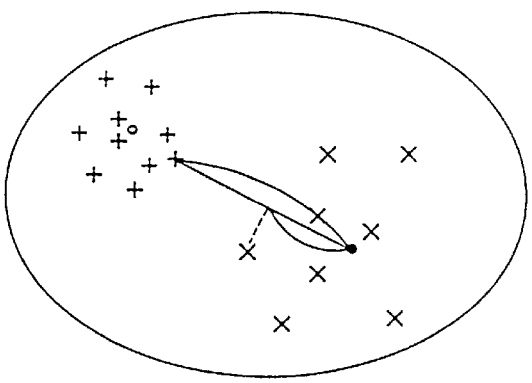

Referring to FIGS. 8C to 8E, in step S25, for all vectors in the class of interest, all maximum values of the ratios of projection distance to the difference vectors c between the barycenter and adjacent vectors to the distance "c" are added. That is, for all vectors in the class of interest, projections to the vector c selected in FIG. 8B are obtained, and the maximum values of the ratios of the projections to the magnitude of the vector c are obtained.

For all classes, the maximum values of the ratios (degrees of class separation) are calculated and added.

FIGS. 8B to 8E show that the process is executed while deleting all wavelengths one by one. In FIG. 8A, the sum of the degrees of class separation is calculated three times.

As the sum value of the degrees of class separation is large, the degree of class proximity is high, and the separation performance degrades.

Therefore, for data of a wavelength for giving the minimum value of the sum of the degrees of class separation, it is determined that the degree of degradation in separation performance is low even in case of deletion, and the wavelength is deleted.

In method 4, calculation after exclusion of each wavelength can be perfectly parallelly realized. At the same time, calculation of the sum of the degrees of class separation associated with a specific wavelength can also be perfectly parallelly performed in minimum unit of the above-described ratio calculation.

Note that method x is a method other than methods 1 to 4, which is used in the second embodiment to be described later.

By methods 1 to 4, data left in preprocessing are further sampled so that only data of wavelengths which exhibit unique behaviors are left. Overall determination for this data is performed, as shown in FIG. 4.

More specifically, this overall determination is made on the basis of human determination, an AI method, evaluation by a fuzzy function, or a value of an evaluation function in consideration of restriction conditions including employment of calorimetric filters and cost (days of manufacturing) of spectrum filters.

A specific method of overall determination will be described below.

Values k of the wavelength indices, i.e., u(k) are listed in descending order of probabilities of deletion by methods 1 to 4. At the same time, a score and weighting coefficient are added to each index in correspondence with the order, thereby preparing a table as shown in FIG. 9.

In this case, the score has the same value as the order although the values may be appropriately weighted.

For method 2a or 3a shown in FIG. 9, the order is assigned to pairs of vectors.

Values each obtained by multiplying the score by a weighting coefficient are accumulated in units of indices.

More specifically, in FIG. 10, method 1 is executed by setting index=1 in step S31, sum (index)=0 in step S32, and method=1 in step S33.

In step S34, sum (index)=sum (index)+score (method)× weighting coefficient (method) is calculated.

In step S35, method 2a and subsequent methods are sequentially executed by setting method=method+1.

In step S36, it is determined whether the values for all methods are added. If NO in step S36, the flow returns to step S34. If YES in step S36, the flow advances to step S37 to set index=index+1.

In step S38, it is determined whether sums for all wavelengths (indices) are calculated. If NO in step S38, the flow returns to step S32. If YES in step S38, the flow advances to step S39 to perform processing on which restriction conditions are reflected.

If a restriction condition exists, an appropriate value is added/subtracted to/from the evaluation value for each wavelength obtained in the above manner in accordance with the degree of the restriction condition.

If the restriction condition is given to preferentially use a filter of a certain wavelength, a large value is added.

Evaluation values for all wavelengths are arranged in ascending order. Data of a wavelength for giving the minimum value is deleted because it has the highest probability of deletion.

To further reduce the wavelengths, the above processing may be repeated from the beginning.

Evaluation values are obtained by linearly adding values of all the methods. When the methods have a correlation therebetween, or when a certain method assumes a result obtained by another method, the evaluation values obtained by these methods may be effectively multiplied in some cases, and such an evaluation function can also be set.

Second Embodiment

The second embodiment is applied to a colorimetric apparatus for automatically selecting a filter suitable for colorimetry in accordance with a light source.

Arrangement

Figure 11:
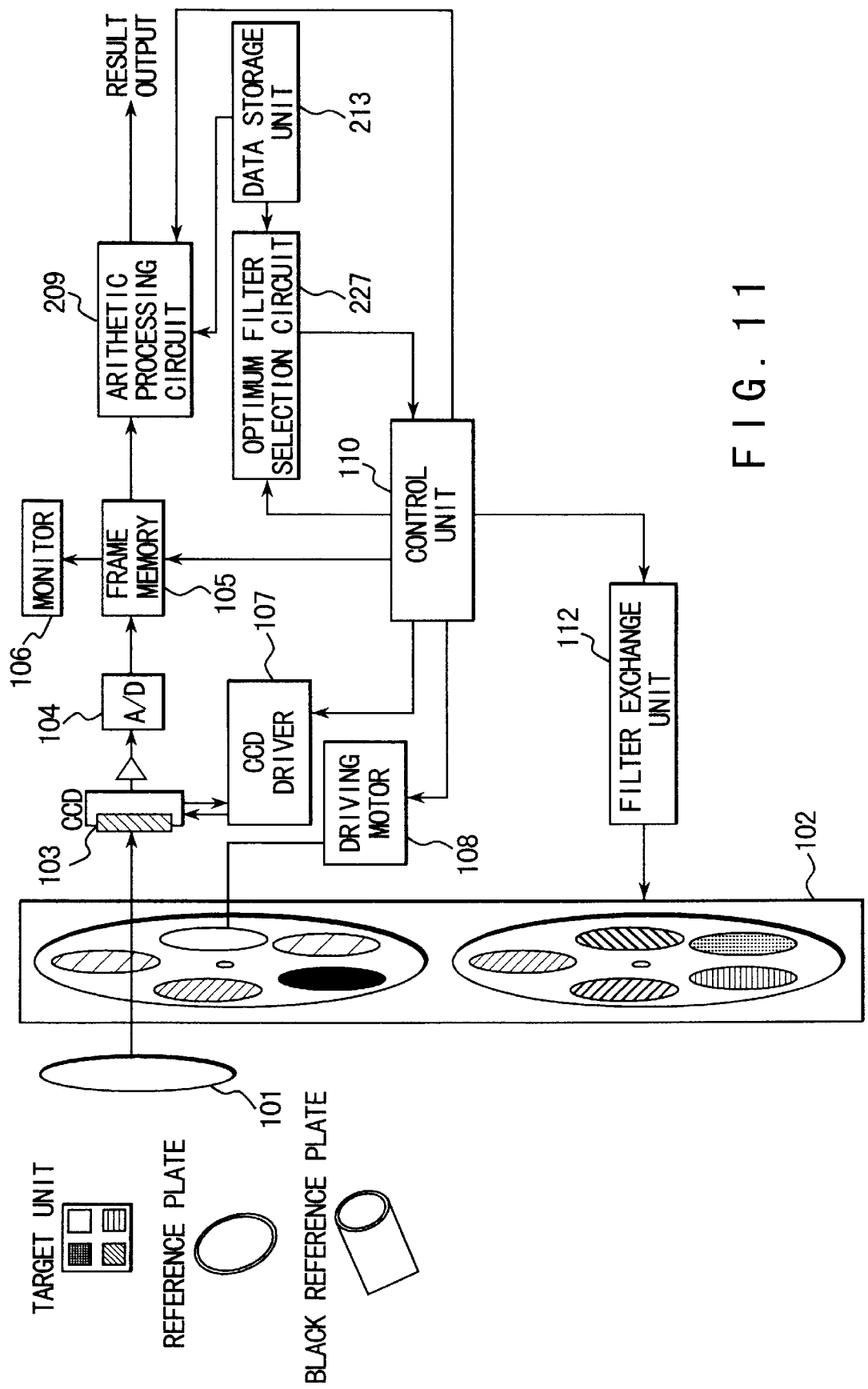
FIG. 11 is a view showing the arrangement of a calorimetric apparatus according to the second embodiment of the present invention.

As shown in FIG. 11, this colorimetric apparatus comprises an optical system 101 including a stop and a lens, a rotary color filter 102 constituted by a plurality of bandpass filters, a CCD 103 for picking up an image, an A/D converter 104, a frame memory 105, a monitor 106 for displaying a photographed image, a CCD driver 107, a driving motor 108, a color value arithmetic circuit 209 for calculating color values from a plurality of image signals, an optimum filter selection circuit 227 for determining a filter set suitable for colorimetry, a filter exchange unit 112 for exchanging filters to set an optimum filter, a data storage unit 213 which stores data necessary for color value calculation, i.e., a color matching function and spectrum data of a light source, and a control unit 110 for controlling the frame memory 105, the CCD driver 107, the driving motor 108, the color value arithmetic circuit 209, and the optimum filter selection circuit 227.

The optimum filter selection circuit 227 automatically selects a filter set optimum for colorimetry in accordance with the light source and comprises a feature amount extraction unit 225 and a filter selection unit 226, as shown in FIG. 13B.

Figure 42:
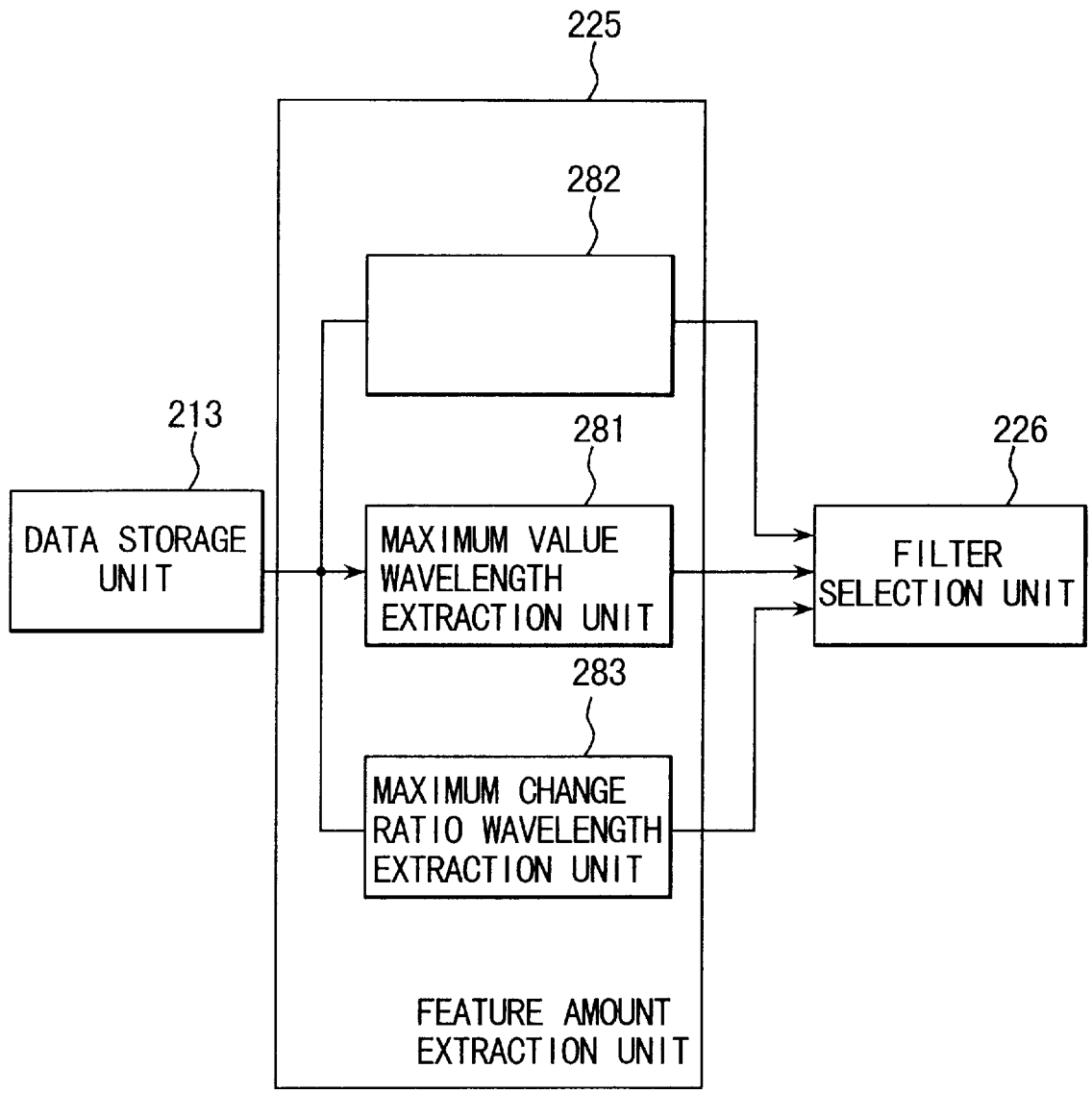
FIG. 42 is a block diagram showing the arrangement of a feature amount extraction unit in the second embodiment.

The feature amount extraction unit 225 comprises a maximum value wavelength extraction unit 281, an intersection wavelength extraction unit 282, and a maximum change ratio wavelength extraction unit 283, as shown in FIG. 42 and extracts three feature amounts below as method x described above.

(1) Calculation of Sx(l), Sy(l), and Sz(l), i.e., products of spectrum data S(l) of the light source and a color matching function.

(2) Calculation of the intersection of Sx(l), Sy(l), and Sz(l).

(3) Calculation of change rates (differential values) of Sx(l), Sy(l), and Sz(l) to a wavelength.

The filter selection unit 226 determines a filter in the following manner on the basis of the feature amounts obtained by the feature amount extraction unit 225.

Figure 20A:
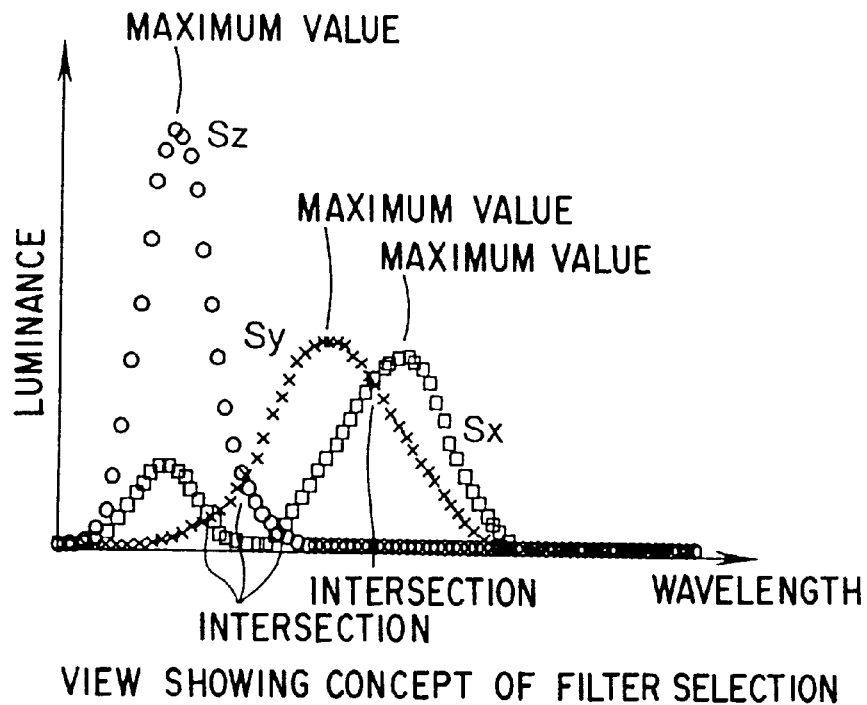
FIGS. 20A and 20B are views showing the operation principle of the second embodiment of the present invention.
Figure 20B:
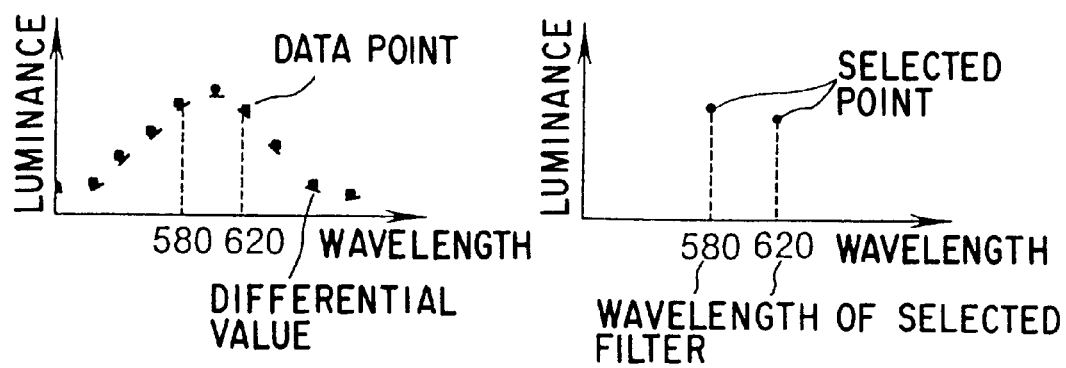
Figure 21:
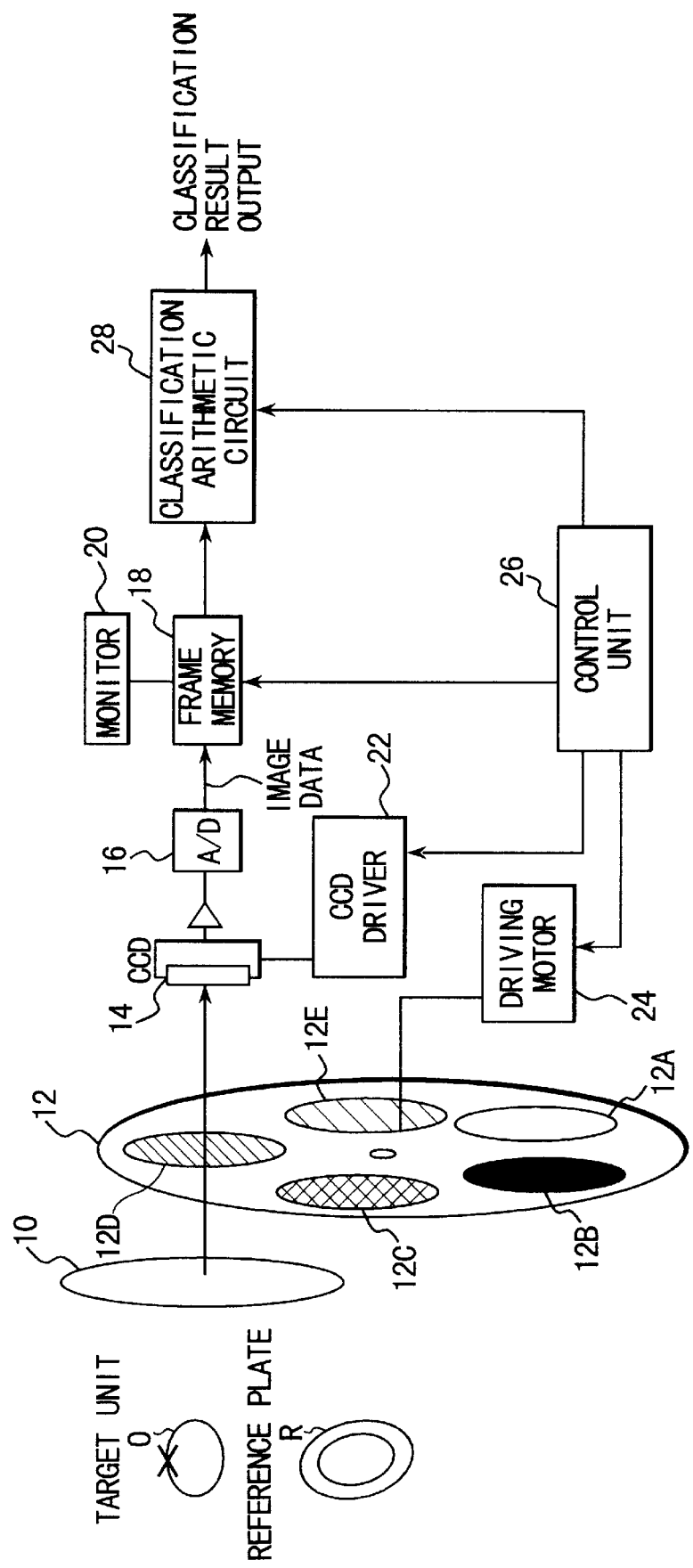
FIG. 21 is a view showing the arrangement of a calorimetric apparatus according to a prior application of the present invention.
Figure 26:
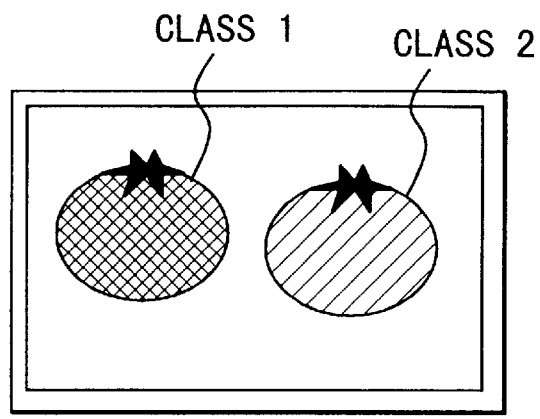
FIG. 26 is a view showing target objects of two classes.
Figure 27:
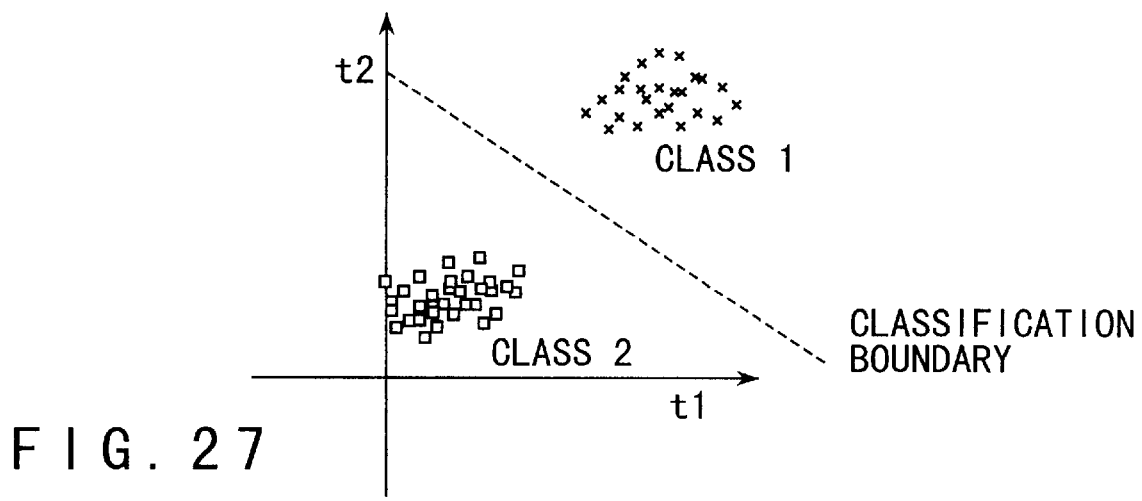
FIG. 27 is a view showing a classification boundary determined by the calorimetric apparatus according to the prior application of the present invention in a learning mode.
Figure 28:
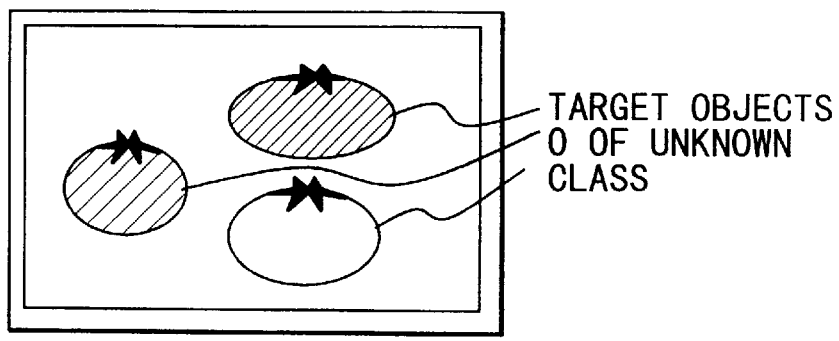
FIG. 28 is a view showing target objects of an unknown class to be classified.
Figure 29:
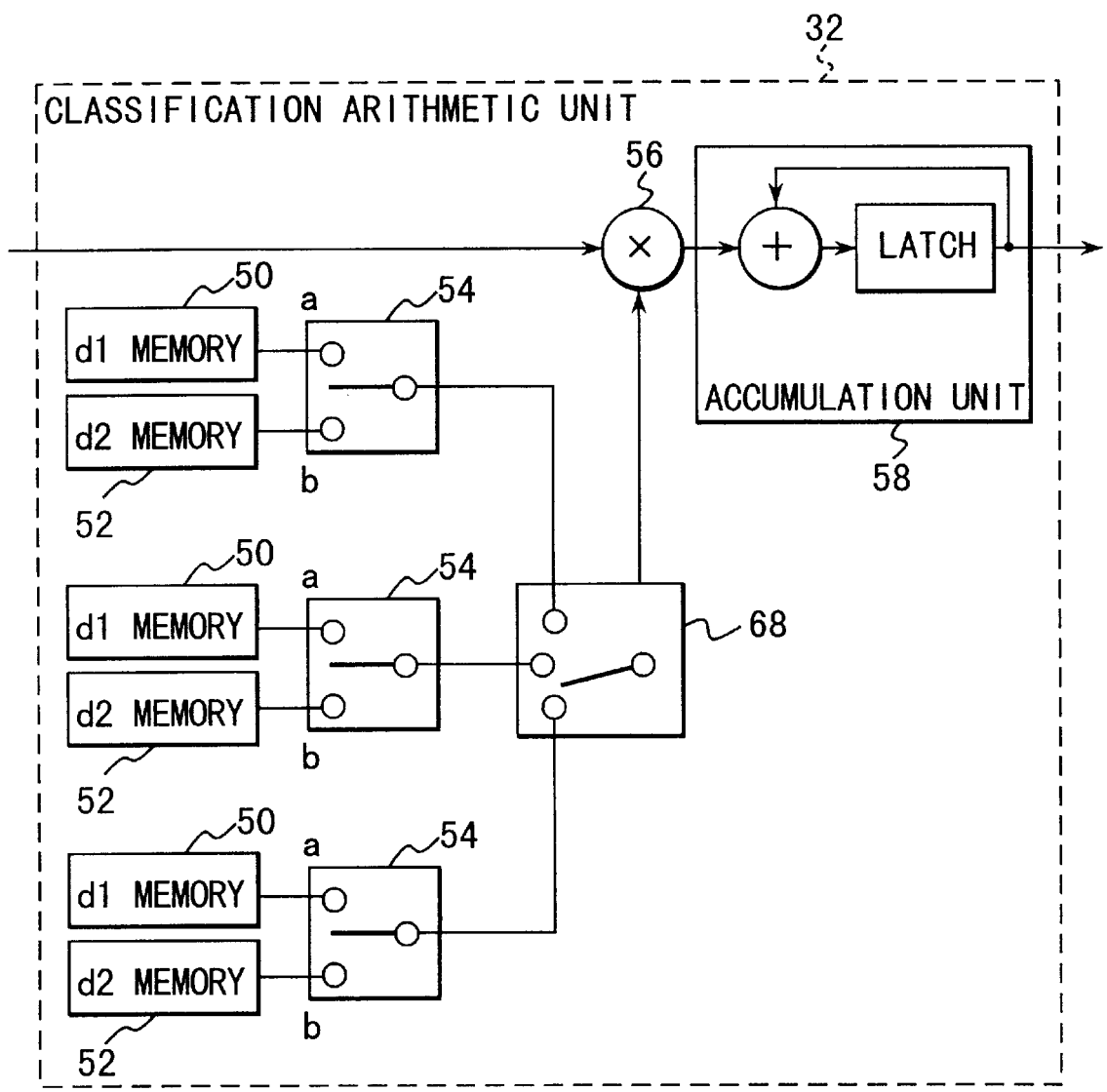
FIG. 29 is a block diagram showing another arrangement of the classification arithmetic unit in the prior application for the present invention.

FIGS. 20A and 20B are views showing the concept of filter selection.

As shown in FIGS. 20A and 20B, three filter selection references below are used.

(1) A filter whose transmittance is maximized at a wavelength corresponding to the maximum value of each of Sx(l), Sy(l), and Sz(l).

(2) A filter whose transmittance is maximized at a wavelength corresponding to the intersection of Sx(l), Sy(l), and Sz(l).

(3) A filter whose transmittance is maximized at a wavelength for giving a large change rate.

The priority of these references is determined according to restriction conditions associated with the number of filters which is determined depending on the application purpose, measurement time, and measurement precision.

For high-speed filter selection, only processing for (3) is performed. To perform precise color value calculation, processing is performed in the order of (1), (2), and (3).

Predetermined processing is performed in accordance with the priority until the filter count reaches the number determined by the restriction conditions.

Only when the difference in center wavelength between selected filters adjacent to each other is equal to or larger than a predetermined threshold value, these filter are selected.

Data (luminance value) obtained from a filter is used as data of the center wavelength (wavelength for giving the maximum transmittance) of the filter.

The filter exchange unit 112 exchanges filters under the control of the control unit 110 to obtain the filter set determined by the optimum filter selection circuit 227.

As shown in FIG. 13A, the color value arithmetic circuit 209 comprises a luminance component extraction unit 214 and a color value calculation unit 215.

Figure 14:
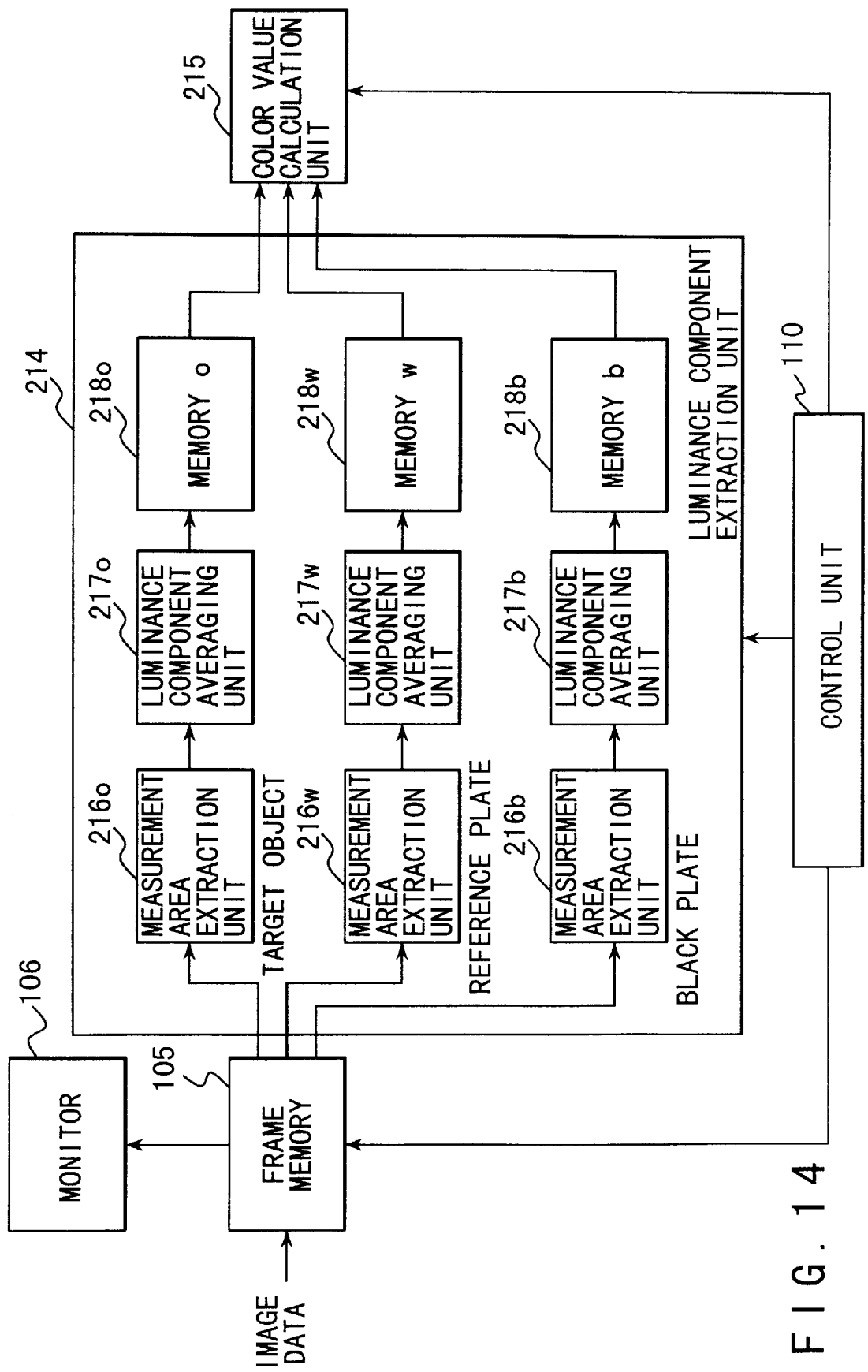
FIG. 14 is a block diagram showing the arrangement of a luminance component extraction unit in the second embodiment.

The luminance component extraction unit 214 calculates luminance values in a plurality of measurement areas of targets (a target object O, a reference plate W, and a black plate B) which have been photographed through all the selected filters. The luminance component extraction unit 214 comprises measurement area extraction units 216o, 216w, and 216b, luminance component averaging units 217o, 217w, and 217b, and memories 218o, 218w, and 218b, as shown in FIG. 14.

The measurement area extraction units 216o, 216w, and 216b extract a plurality of measurement areas of picked-up images (the target object O, the reference plate W, and the black plate B).

As the measurement areas, a plurality of portions are designated by a template, a mouse, or a keyboard to extract the areas.

The luminance component averaging units 217o, 217w, and 217b calculate the average values (Iobj, Iref, Iblack) of luminance values in the areas extracted by the measurement area extraction units 216o, 216w, and 216b, respectively.

The memories 218o, 218w, and 218b store the average luminance values of the plurality of measurement areas of the targets.

Figures 15A, 15B:
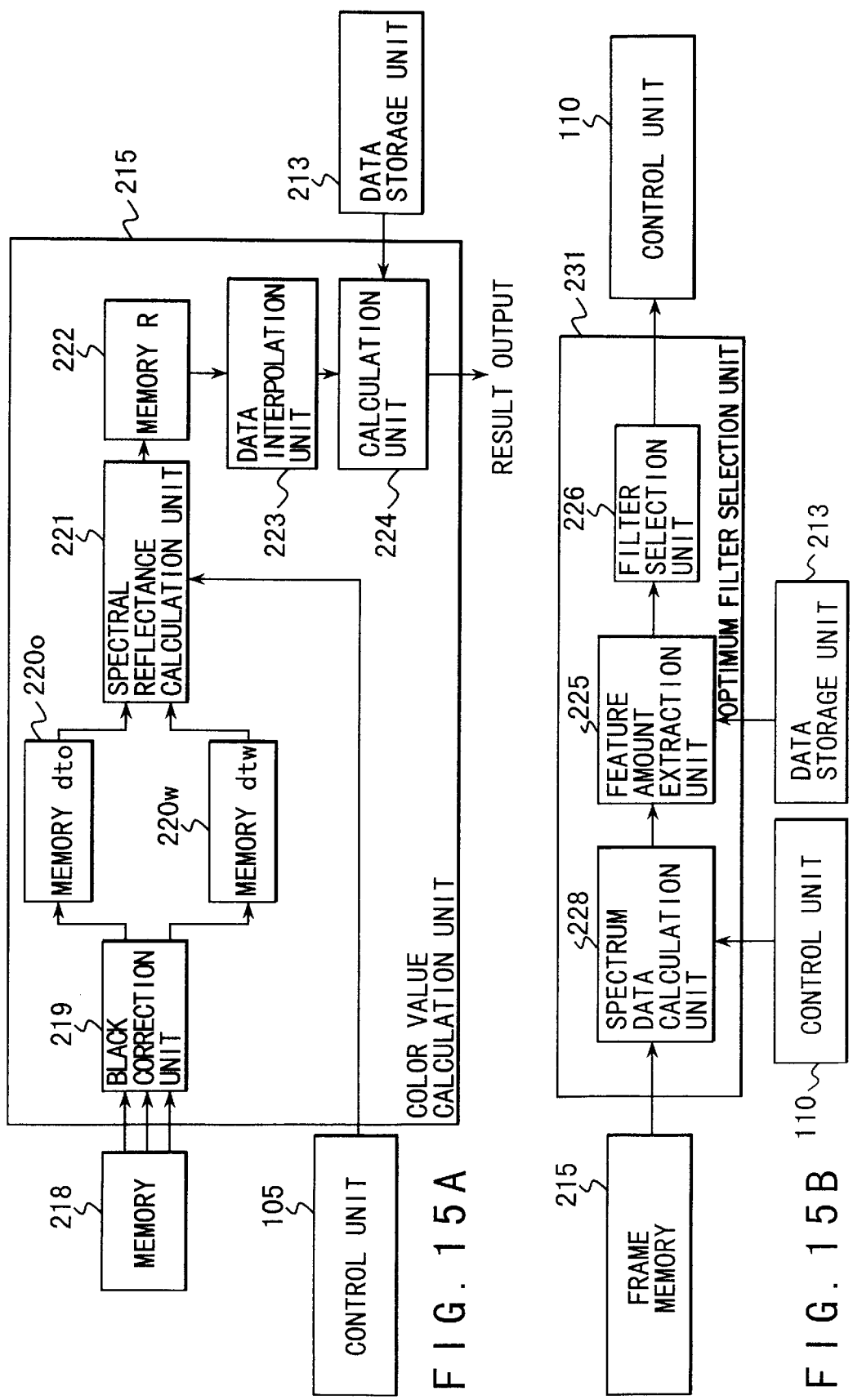
FIGS. 15A and 15B are block diagrams showing the arrangement of a color value calculation unit and another arrangement of the optimum filter selection circuit in the second embodiment.

The color value calculation unit 215 calculates a color value from the average luminance value of the measurement area and comprises a black correction unit 219, memories 220o and 220w, a spectral reflectance calculation unit 221, a memory R 222, a data interpolation unit 223, and a calculation unit 224, as shown in FIG. 15A.

Using the luminance value of the black plate the black correction unit 219 corrects the luminance values of the target object and reference plate, which are calculated by the luminance component extraction unit 214, on the basis of the formula below:

(correction luminance value of target object or reference plate)=(luminance value of target object or reference plate)−(luminance value of black plate)

The memories 220o and 220w store the corrected luminance values of the target objects and the reference plate, respectively.

The spectral reflectance calculation unit 221 calculates a spectral reflectance ρ(λ) of the target object. The spectral reflectance ρ(λ) is calculated in correspondence with the number of filters on the basis of equation (9) below:

$$\rho(\lambda)=100\{Iobj(\rho)/Iref(\rho)\} \quad (9)$$

where Iobj(λ) and Iref(λ) are the luminance values of the target object and the reference plate, which are corrected by the black plate, i.e., stored in the memories 220o and 220w.

The memory R 222 stores the calculated spectral reflectance.

The data interpolation unit 223 estimates the spectral reflectance and interpolates the discrete spectral reflectances calculated according to equation (9) in correspondence with the number of filters, thereby obtaining spectral reflectances having a specific interval.

The data interpolation unit 223 estimates spectral reflectances within the wavelength range of 380 to 780 nm at an interval of 5 or 10 nm by linear interpolation or spline interpolation.

For example, the end point is interpolated by the following formula:

$$\rho(380)=0, \rho(780)=\rho(\text{filter having the maximum wavelength})/2$$

The calculation unit 224 calculates the color value using the interpolated spectral reflectances of the target object, and the color matching function and spectrum data of the light source, which are stored in the data storage unit 213.

In this case, the X, Y, and Z stimulus values and L*a*b* values are calculated on the basis of equations (10) to (12) below:

X, Y, and Z stimulus values of the light source $$Xo = k \int_{380}^{780} S\lambda \bar{x}(\lambda)d\lambda \quad (10)$$

$$Yo = k \int_{380}^{780} S\lambda \bar{y}(\lambda)d\lambda$$

$$Zo = k \int_{380}^{780} S\lambda \bar{z}(\lambda)d\lambda$$

$$k = \frac{1}{\int_{380}^{780} S\lambda y(\lambda)d\lambda}$$

X, Y, and Z stimulus values of the target object $$X = K \int_{380}^{780} S\lambda \rho(\lambda)\bar{x}(\lambda)d\lambda \quad (11)$$

$$Y = K \int_{380}^{780} S\lambda \rho(\lambda)\bar{y}(\lambda)d\lambda$$

$$Z = K \int_{380}^{780} S\lambda \rho(\lambda)\bar{z}(\lambda)d\lambda$$

$$K = \frac{1}{\int_{380}^{780} S\lambda \rho(\lambda)y(\lambda)d\lambda}$$

L*a*b* values (12)

$$L^* = 116(Y/Yo)^{1/3} - 16$$
$$a^* = 500\{(X/Xo)^{1/3} - (Y/Yo)^{1/3}\}$$
$$b^* = 200\{(Y/Yo)^{1/3} - (Z/Zo)^{1/3}\}$$

where ρ(λ) is the spectral reflectance, S(λ) is the spectrum data of the light source, and $\bar{x}(\lambda)$, $\bar{y}(\lambda)$, $\bar{z}(\lambda)$ are color matching functions.

A case in which the spectrum data of the light source to be measured is known has been described above.

A case in which the spectrum data of the light source to be measured is unknown will be described below.

Figure 12:
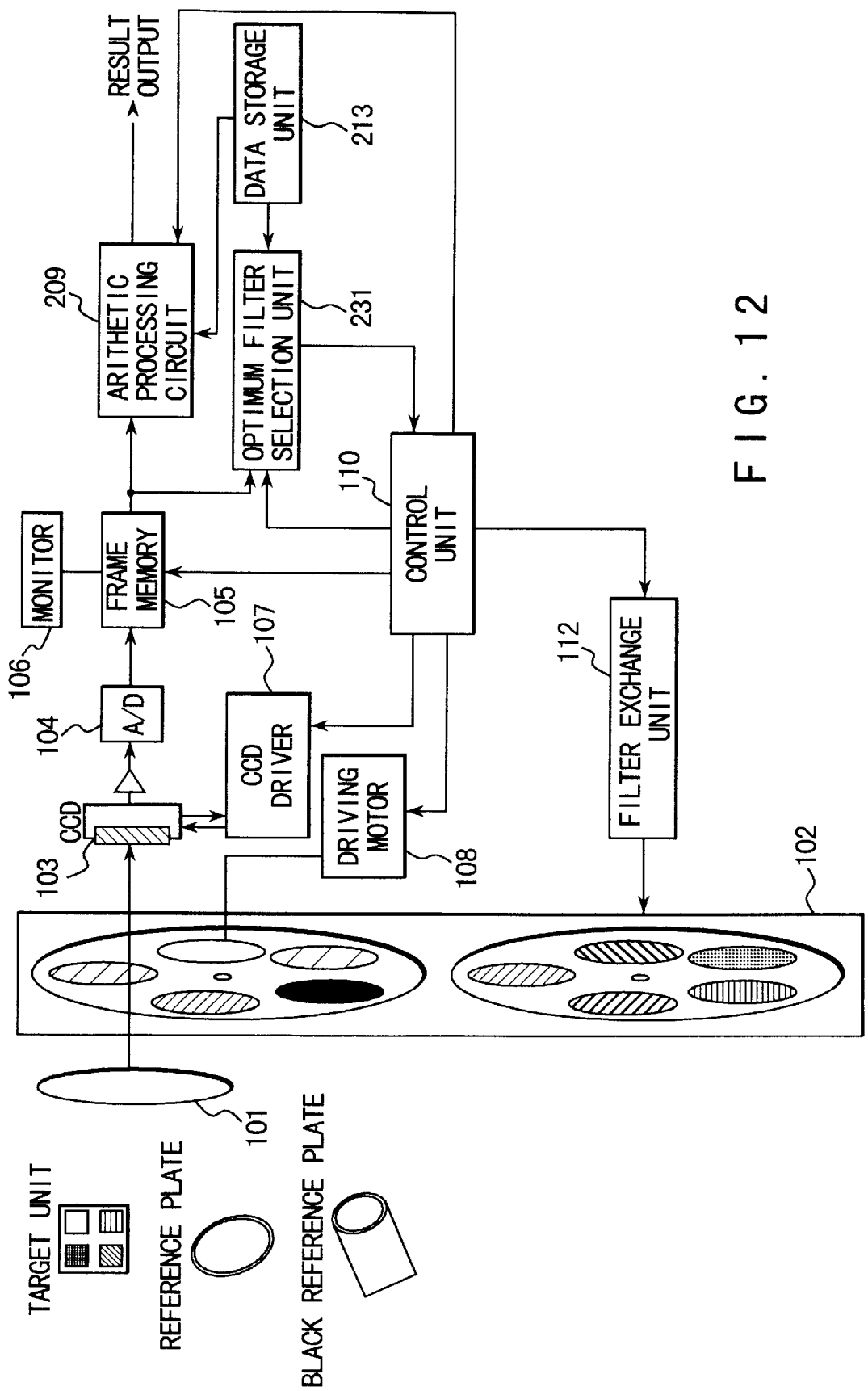
FIG. 12 is a view showing another arrangement of the colorimetric apparatus according to the second embodiment of the present invention.

When the spectrum data of the light source to be measured is unknown, the colorimetric apparatus has an arrangement shown in FIG. 12.

As shown in FIG. 15B, an optimum filter selection unit 231 comprises a spectrum data calculation unit 228 for calculating the spectrum data of the light source for colorimetry, the feature amount extraction unit 225, and the filter selection unit 226 described above.

In this case, the spectrum data calculation unit 228 in the optimum filter selection unit 231 comprises a luminance component extraction unit 229, a correction circuit 230, and the data interpolation unit 223, as shown in FIG. 16A.

As shown in FIG. 15A, the data interpolation unit 223 interpolates the discrete spectral reflectances to obtain a specific reflectance. The spectrum data calculation unit 228 calculates the spectrum data of the light source for colorimetry, as described above.

The luminance component extraction unit 229 basically performs the same processing as that of the luminance component extraction unit 214 and comprises a measurement area extraction unit 216, a luminance component averaging unit 217, and a memory 218, as shown in FIG. 16B.

The measurement area extraction unit 216 extracts measurement areas of the reference plate which is photographed under the light source for colorimetry.

Figure 18:
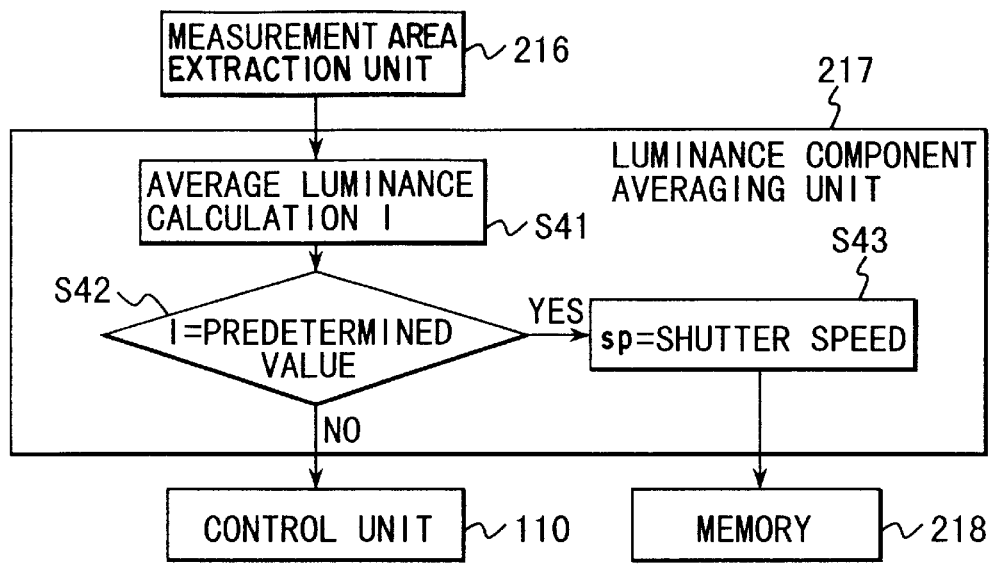
FIG. 18 is a flow chart showing the operation of a luminance component averaging unit in the second embodiment.

The luminance component averaging unit 217 may calculate the average luminance value by a method schematically shown in the flow chart of FIG. 18.

An average value (I) of the luminance components of the areas extracted by the measurement area extraction unit 216 is calculated (step S41).

If the average luminance value (I) is not a predetermined value, the shutter speed is adjusted in a direction of approaching the predetermined value by the control unit 110 and the CCD driver 107, and the target object is photographed again, thereby calculating the average luminance value (I) of the measurement areas (step S42).

When the average luminance value reaches the predetermined value, the shutter speed and the average luminance value are stored in the memory 218 (step S43).

Figure 19:
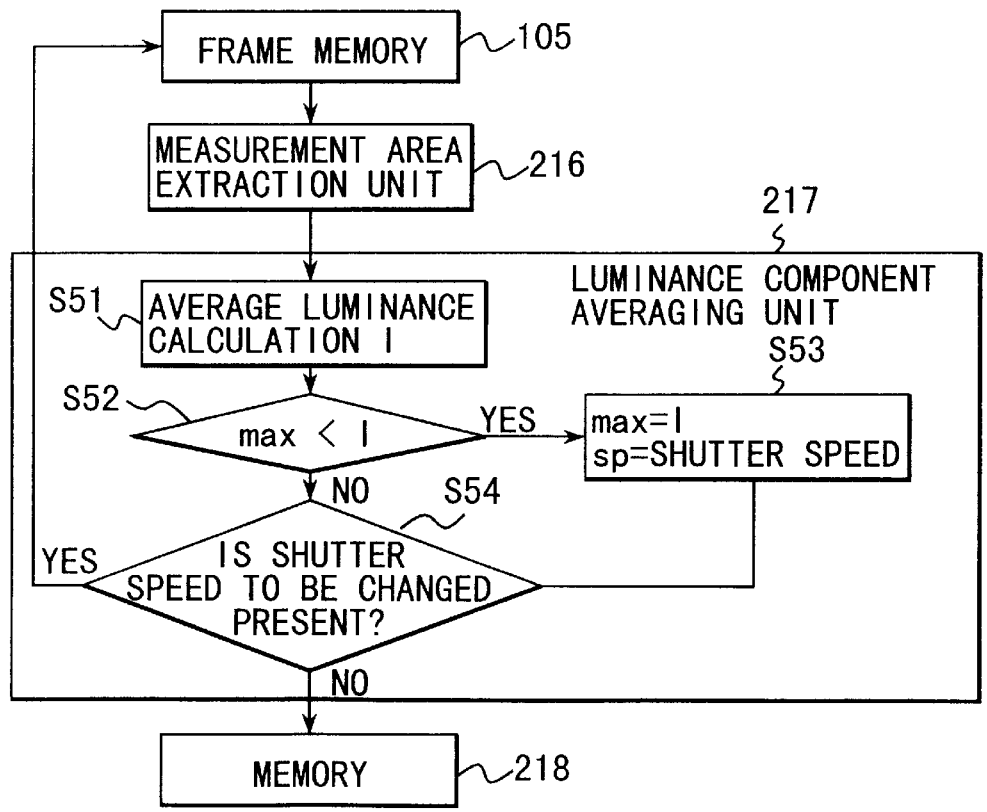
FIG. 19 is another flow chart showing the operation of the luminance component averaging unit in the second embodiment.

As schematically shown in the flow chart of FIG. 19, the average luminance value may be calculated for each shutter speed on the basis of a plurality of images which are picked up at different shutter speeds in advance, and a shutter speeds for giving the maximum luminance value may be used as the average luminance value I (steps S51 to S54).

The memory 218 stores the average luminance value.

The correction circuit 230 comprises a luminance value calibration unit 231, the black correction unit 219, and a sensitivity correction unit 232, as shown in FIG. 17.

The black correction unit 219 performs the same processing as that of the black correction unit 219 shown in FIG.

15A and corrects the luminance values of the target object and the reference plate calculated by the luminance component extraction unit 229 with the luminance value of the black plate.

The sensitivity correction unit 232 corrects the sensitivity of the camera in correspondence with the black-corrected luminance values.

The luminance value calibration unit 231 calibrates the luminance value to integrate the changed shutter speed.

A liquid crystal variable filter can be used in place of the rotary color filter 102.

Third Embodiment

In a method employed by this embodiment, when the color of a target object to be subjected to colorimetry is limited, an optimum filter combination is determined by using data obtained by photographing the target object.

Arrangement

This embodiment basically has the same arrangement as that of the second embodiment except a switch 241 and an optimum filter selection circuit 242. The same reference numerals as in the second embodiment denote the same constituent elements in the third embodiment, and only different portions will be described below.

Figure 30:
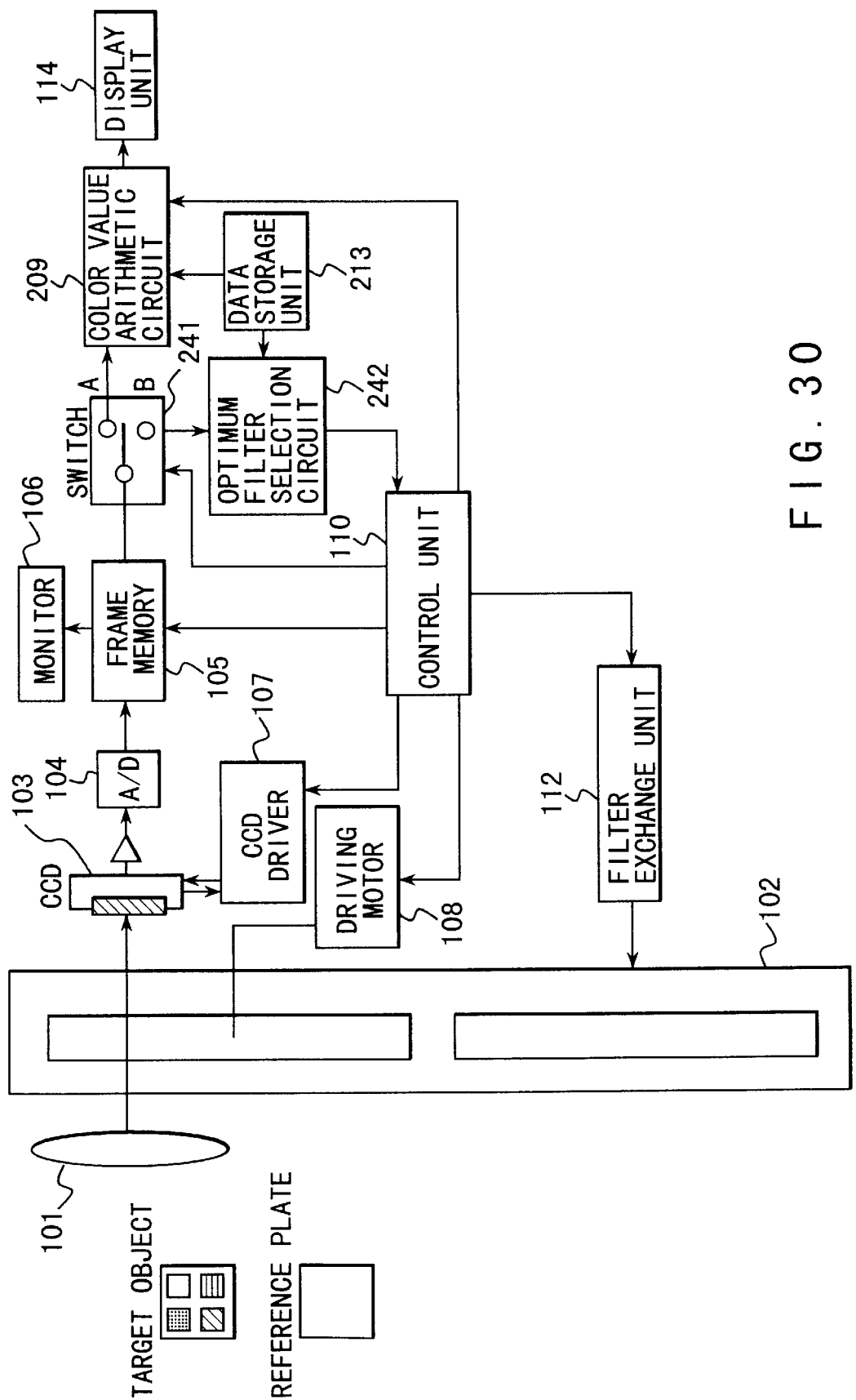
FIG. 30 is a view showing the arrangement of a calorimetric apparatus according to the third embodiment of the present invention.

FIG. 30 is a schematic view showing the overall arrangement of a calorimetric apparatus according to the third embodiment of the present invention.

This calorimetric apparatus comprises an optical system 101 including a stop and a lens, a rotary color filter 102 constituted by a plurality of bandpass filters, a CCD 103 for picking up the images of a target object and a reference plate, an A/D converter 104, a frame memory 105, a monitor 106 for displaying a photographed image, a CCD driver 107, a driving motor 108 for the rotary color filter 102, the switch 241 for transferring the image in the frame memory 105 to a color value arithmetic circuit 209 or the optimum filter selection circuit 242 as needed, the color value arithmetic circuit 209 for calculating color values from a plurality of image signals, a display unit 114 for displaying the color value or the like, the optimum filter selection circuit 242 for calculating an optimum filter combination for colorimetry, a filter exchange unit 112 for selecting the filter determined by the optimum filter selection circuit 242 from the plurality of filters of the rotary color filter 102 and adjusting the position of the filter to locate the selected filter behind the optical system 101, a data storage unit 213 which stores data including a color matching function, and a control unit 110 for controlling the CCD driver 107, the driving motor 108, and the like and sending commands to the color value arithmetic circuit 209, and the filter exchange unit 112, and the like.

Figure 31:
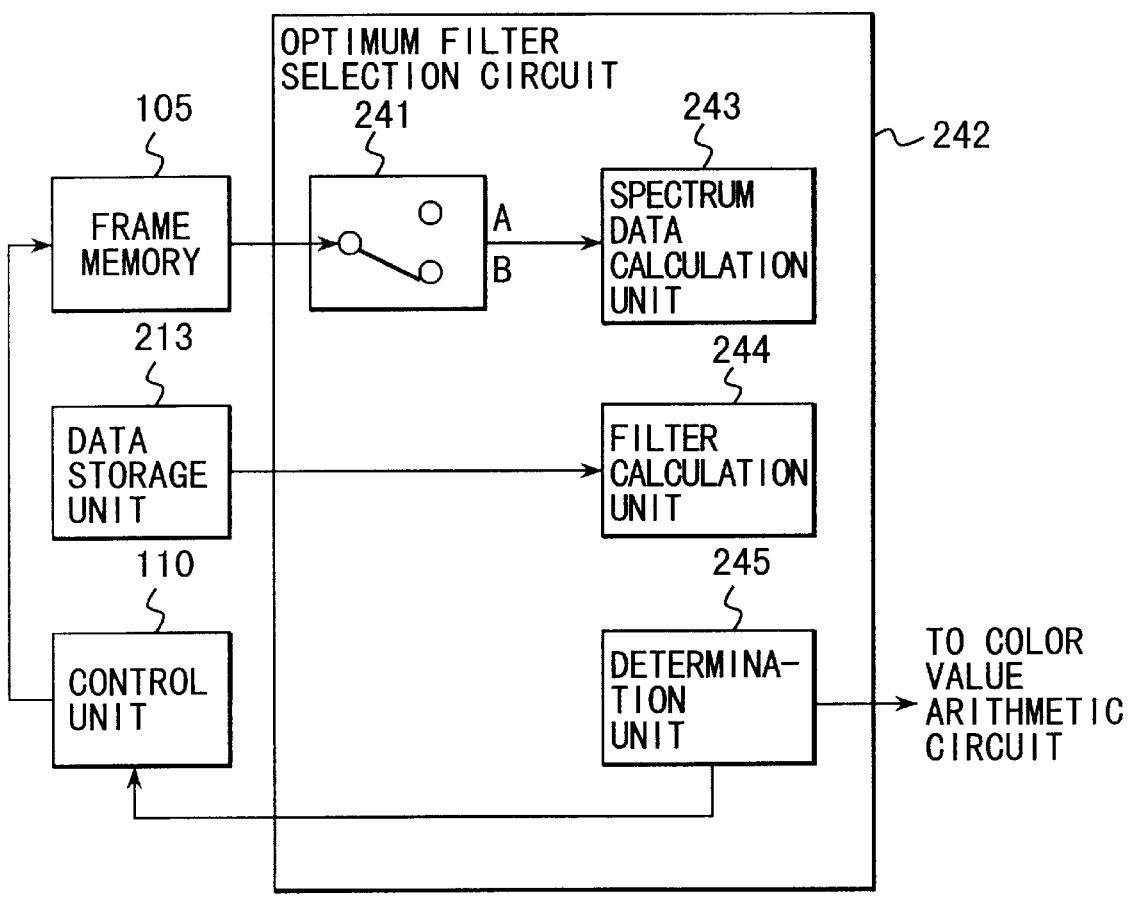
FIG. 31 is a block diagram showing the arrangement of an optimum filter selection circuit in the third embodiment.

FIG. 31 is a block diagram of the internal structure of the optimum filter selection circuit 242.

The optimum filter selection circuit 242 performs Fourier transform of the products of color matching functions and data on which the filter spectral characteristics and CCD spectral characteristics stored in the frame memory 105 are reflected, and determines, on the basis of the result of Fourier transform, optimum filters arranged at an equal interval.

Figure 32:
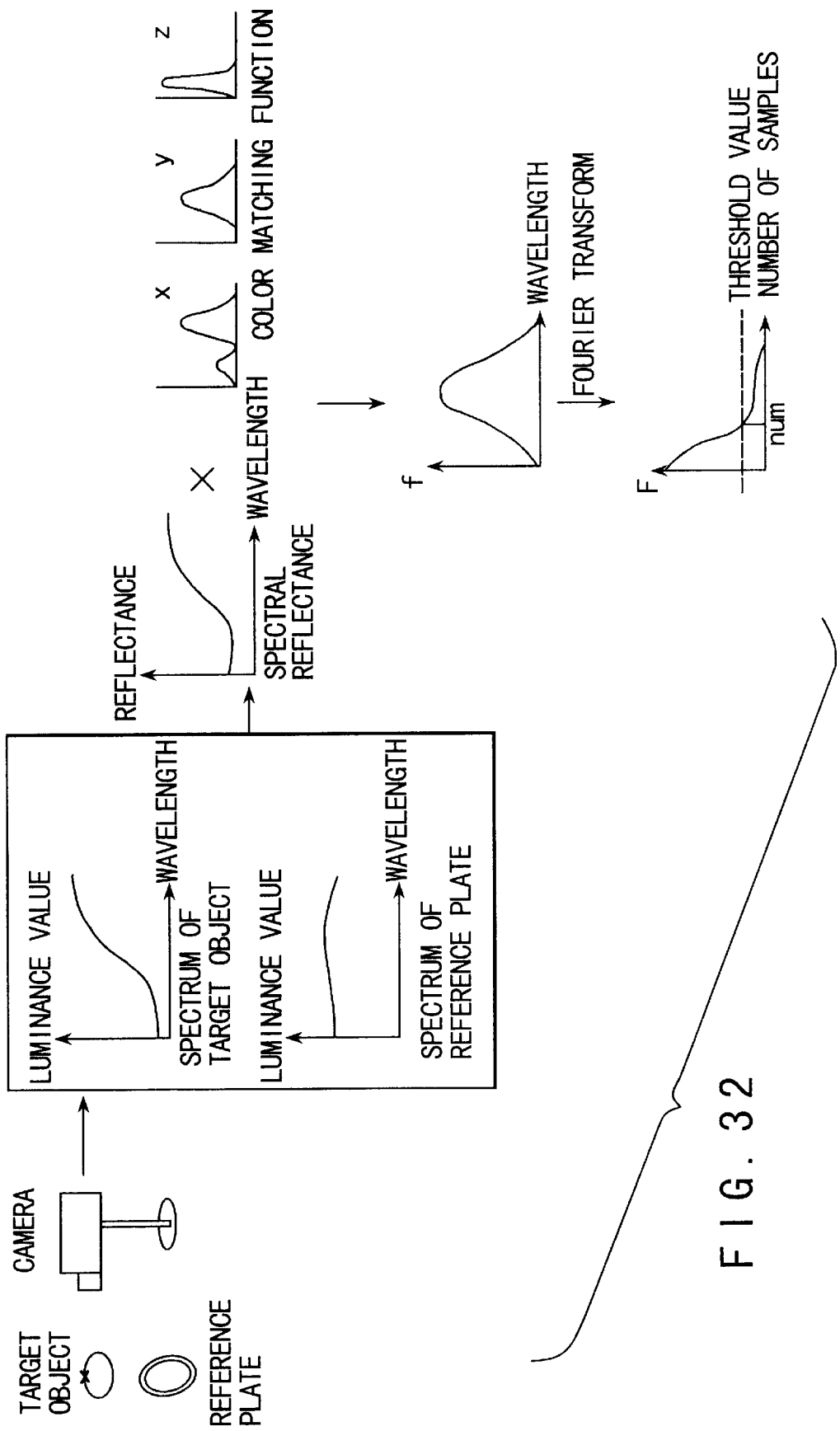
FIG. 32 is a view showing the concept of processing in the third embodiment.

FIG. 32 is a view showing the concept of this processing.

In FIG. 30, when colorimetry is to be performed, the switch 241 is connected to a terminal A so that the target object image group stored in the frame memory 105 is transferred to the color value arithmetic circuit 209.

In FIG. 31, when filters are to be optimized, the switch 241 is switched to a terminal B so that the target object image group is transferred to a spectrum data calculation unit 243.

The spectrum data calculation unit 243 calculates spectrum data of the target object, like, e.g., the spectrum data calculation unit 228.

The spectrum data calculation unit 243 can also calculate spectrum data of two target objects.

The spectrum data calculated by the spectrum data calculation unit 243 and the color matching functions stored in the data storage unit 213 are transferred to a filter calculation unit 244.

The filter calculation unit 244 performs Fourier transform of the products of the color matching functions and the spectrum data calculated by the spectrum data calculation unit 243. The calculation result is transferred to a determination unit 245.

The determination unit 245 calculates the number of filters necessary for colorimetry on the basis of a value determined from the measurement precision and measurement time, thereby obtaining a combination of filters arranged at an equal interval.

Figure 33:
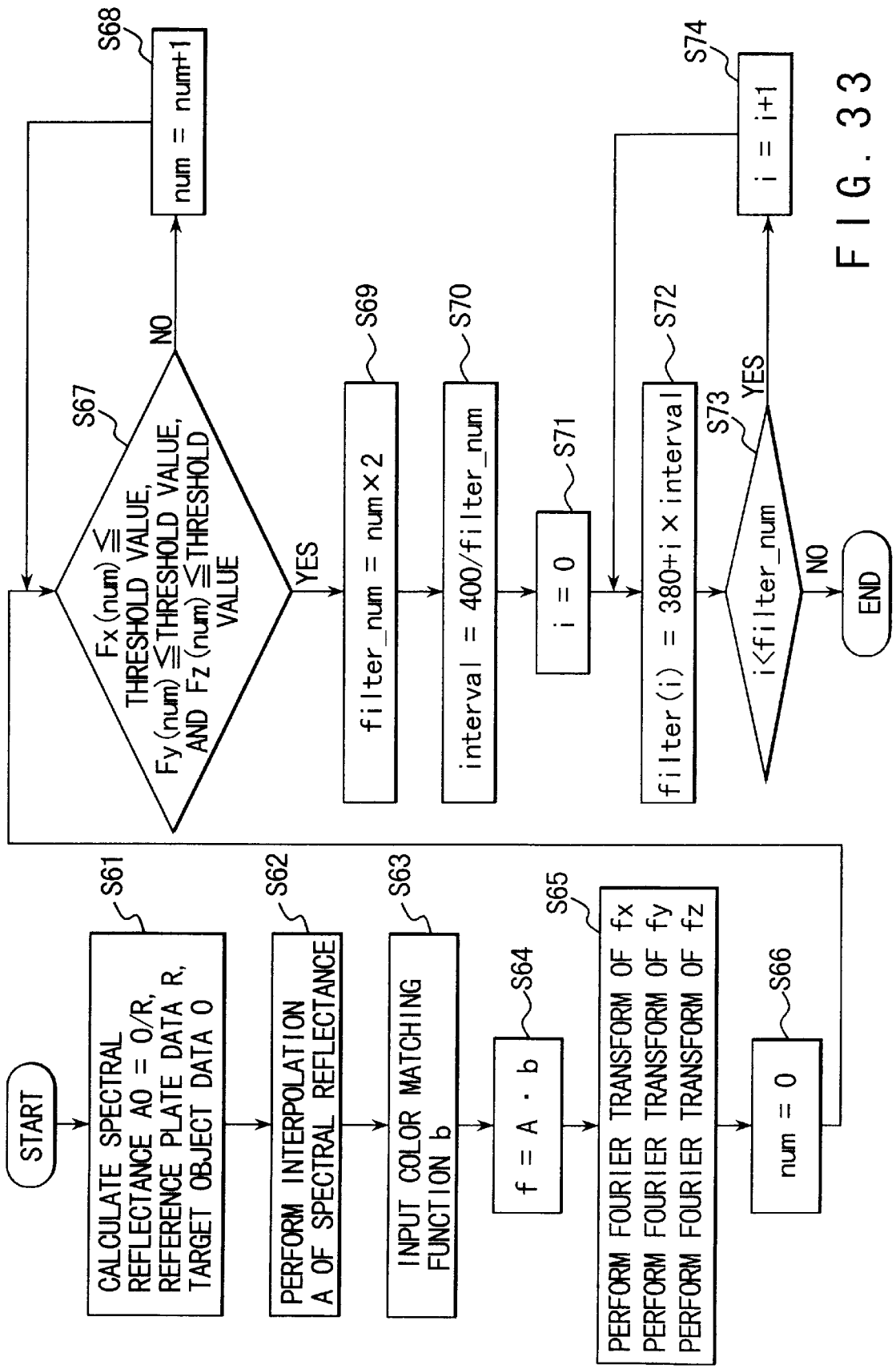
FIG. 33 is a flow chart showing the operation of the optimum filter selection circuit in the third embodiment.

For processing in the optimum filter selection circuit 242, a detailed example in case in which the spectrum data is a spectral reflectance will be described below with reference to the flow chart shown in FIG. 33.

In step S61, target object data O and reference plate data R are loaded from the frame memory 105 to the spectrum data calculation unit 243. Spectral reflectances A0 corresponding to the number of filters mounted in the rotary color filter 102 are calculated.

In step S62, the discrete spectral reflectances A0 corresponding to the number of filters are interpolated by linear or spline interpolation within the wavelength range of, e.g., 380 to 780 nm at an interval of 5 or 10 nm, thereby obtaining spectral reflectances A.

The flow of processing executed when interpolation has been performed within the range of 380 to 780 nm at an interval of 5 nm (the number of data is 81) will be described below.

In step S63, a color matching function b is loaded from the data storage unit 213.

In step S64, the products of the interpolated spectral reflectances A (matrix of 81×1) and the color matching functions b (matrix of 81×3) for x, y and z are calculated. The result is represented by f (matrix of 81×3).

In step S65, the product of the color matching function of x and the spectral reflectance is represented by fx, and f is divided into fx, fy, and fz. Fourier transform (Fx, Fy, Fz) is performed for each product.

In steps S66 to S68, a sampling count num for which each Fourier transform result becomes smaller than the threshold value determined on the basis of the measurement precision and measurement time is searched for.

In step S66, the sampling count num is initialized.

In step S67, if each of Fx, Fy, and Fz is equal to or smaller than the threshold value (YES in step S67), the flow advances to step S69. If NO in step S67, the flow advances to step S68 to increment the sampling count num by one.

In step S69, a value corresponding to a value twice the sampling count num (based on the sampling theorem) is substituted into filter_num as the necessary number of filters.

In steps S70 to S74, an optimum filter combination is calculated in correspondence with the necessary number of filters.

For example, center wavelengths of filters are determined such that filters corresponding to filter_num are obtained within the wavelength range of 380 to 780 nm at an equal interval.

In step S70, the interval of the center wavelengths of filters is calculated.

In step S71, i is initialized.

In step S72, the center wavelength of the ith filter (i) is calculated.

In step S73, it is determined whether i exceeds the filter count filter_num. If NO in step S73, the processing is ended. If YES in step S73, the flow advances to step S74 to increment i by one.

In this processing, the threshold value determined on the basis of the measurement precision and measurement time may be different for Fx, Fy, and Fz.

The spectral reflectances AO obtained in step S62 may be the target object data, the reference plate data, or 1 on the basis of the measurement precision and measurement time.

A liquid crystal variable filter can be used in place of the rotary color filter 102.

Fourth Embodiment

In a method employed by this embodiment, a coefficient to be multiplied by each filter (center wavelength) is calculated such that the spectrum sensitivity characteristic of a light-receiving portion, which is obtained from the sensitivity characteristic of a CCD or rotary color filter, equals the color matching function, and an optimum filter combination for approximating the color matching function with the set number of filters is determined by evaluating the coefficient.

Arrangement

This embodiment basically has the same arrangement as that of the second embodiment except an optimum filter selection circuit 251. The same reference numerals as in the second embodiment denote the same constituent elements in the fourth embodiment, and only different portions will be described below.

Figure 34:
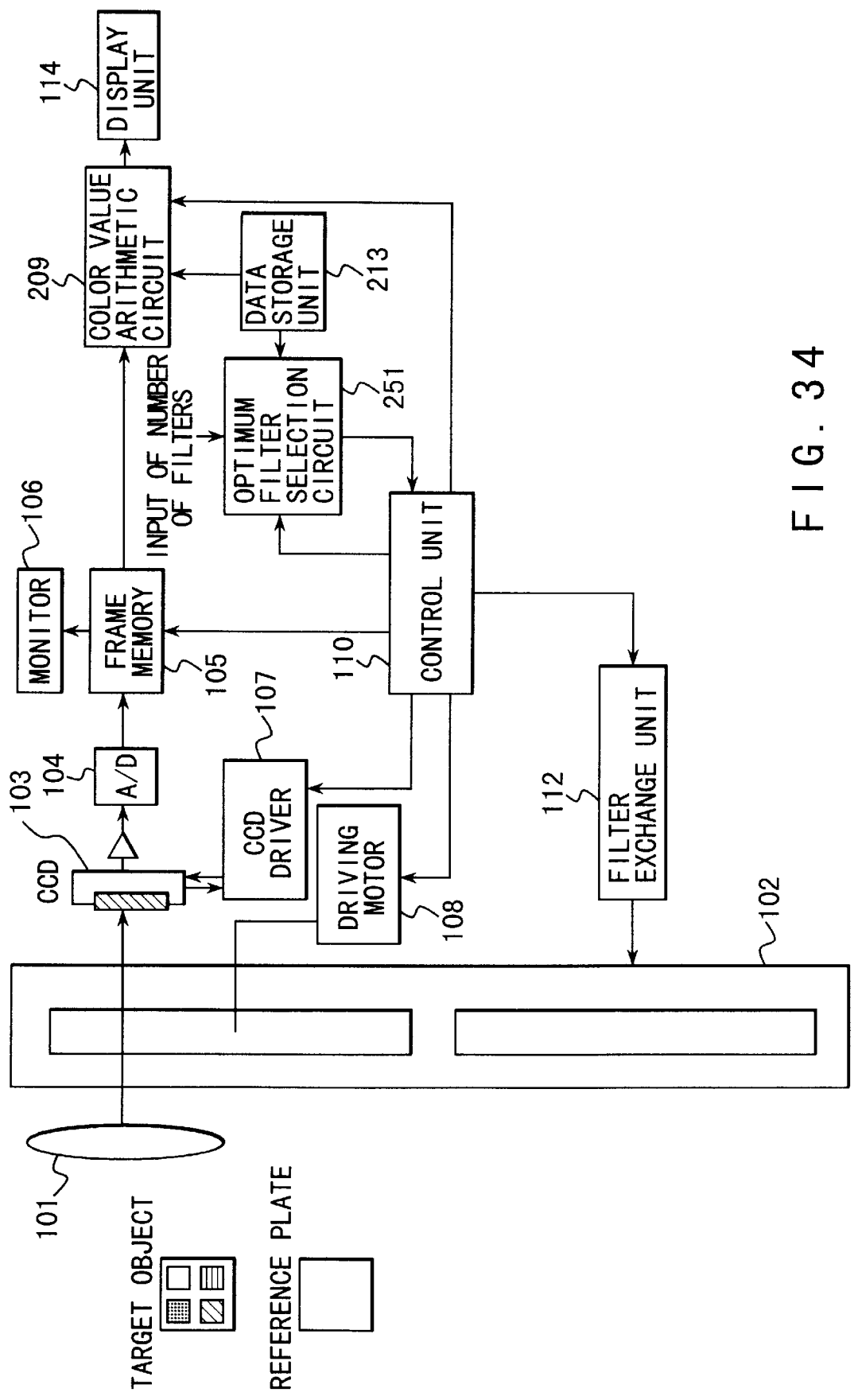
FIG. 34 is a view showing the arrangement of a colorimetric apparatus according to the fourth embodiment of the present invention.

FIG. 34 is a schematic view showing the overall arrangement of a calorimetric apparatus according to the fourth embodiment of the present invention.

This calorimetric apparatus comprises an optical system 101 including a stop and a lens, a rotary color filter 102 constituted by a plurality of bandpass filters, a CCD 103 for picking up the images of a target object and a reference plate, an A/D converter 104, a frame memory 105, a monitor 106 for displaying a photographed image, a CCD driver 107, a driving motor 108 for the rotary color filter 102, a color value arithmetic circuit 209 for calculating color values from a plurality of image signals, a display unit 114 for displaying the color value or the like, the optimum filter selection circuit 251 for calculating an optimum filter combination for approximating a color matching function, a filter exchange unit 112 for selecting the filter determined by the optimum filter selection circuit 242 from the plurality of filters of the rotary color filter 102 and exchanging the filter, a data storage unit 213 which stores data necessary for color value calculation and optimum filter calculation, and a control unit 110 for controlling the CCD driver 107 and the driving motor 108 and sending commands to the color value arithmetic circuit 209 and the filter exchange unit 112.

Figure 36:
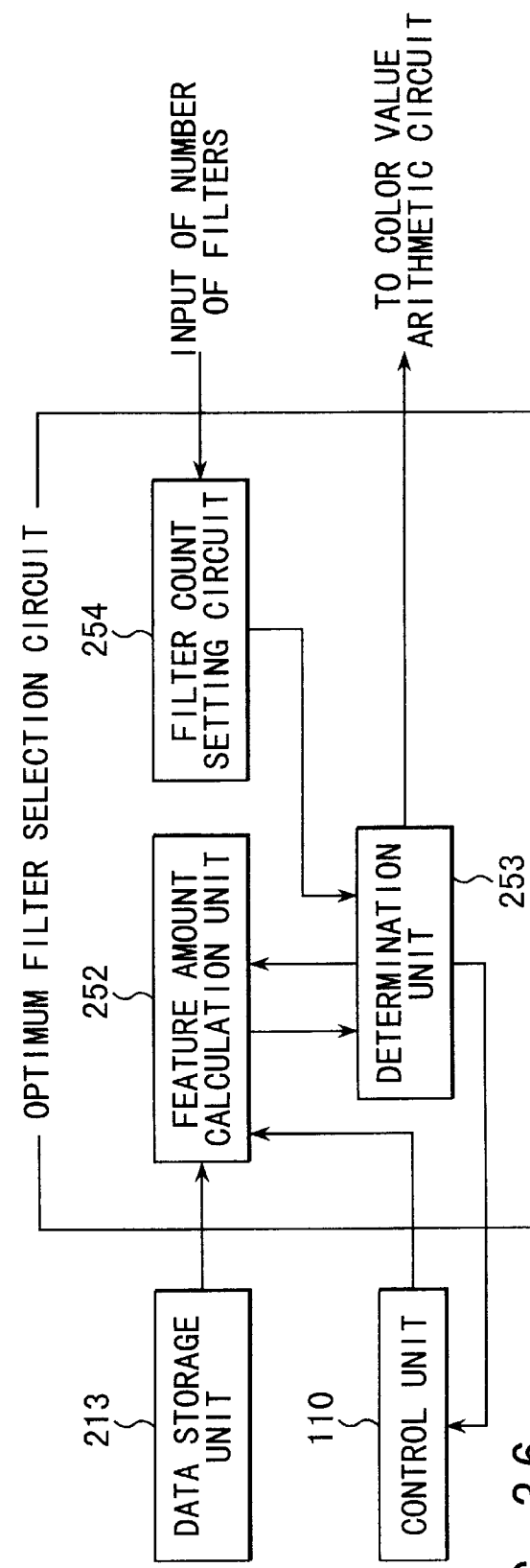
FIG. 36 is a block diagram showing the arrangement of an optimum filter selection circuit in the fourth embodiment.

FIG. 36 is a block diagram of processing of the optimum filter selection circuit 251.

In the optimum filter selection circuit 251, a coefficient to be multiplied by each filter (center wavelength) having the spectrum sensitivity characteristic of the light-receiving portion is calculated such that a curve representing the spectral characteristic of the filter and the spectrum sensitivity characteristic of the CCD (spectrum sensitivity characteristic of the light-receiving portion) coincides with or is similar to a curve representing a color matching function, and the optimum filter is selected by evaluating the coefficient.

Figure 35:
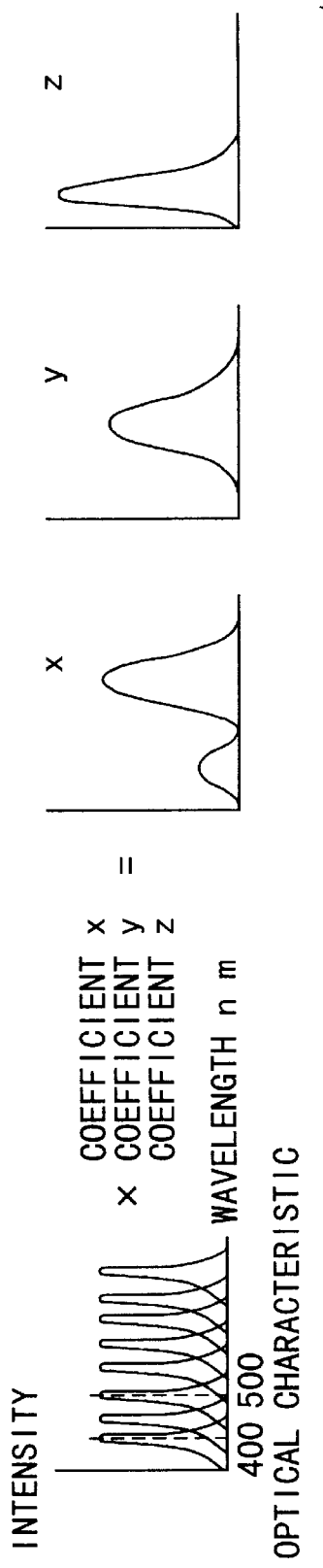
FIG. 35 is a block diagram showing the concept of processing in the fourth embodiment.

FIG. 35 is a view showing the concept of processing of the optimum filter selection circuit 251.

When the spectrum sensitivity characteristic of the light-receiving portion, which is calculated on the basis of the spectral characteristics of the filters and the spectrum sensitivity characteristic of the CCD, is represented by A; the color matching function, b; and the coefficient, y the coefficient y can be calculated according to equations (13) below:

$$A \cdot y = b,$$
$$y = A^{-1} \cdot b \qquad (13)$$

The color matching function stored in the data storage unit 213, the spectral characteristics of the filters mounted in the rotary color filter 102, and the sensitivity characteristic of the CCD mounted in the apparatus are transferred to a feature amount calculation unit 252.

As the spectral characteristics of the filters or the sensitivity characteristic of the CCD, transmittance data within the range of, e.g., 380 to 780 nm at an interval of 5 nm are used while the maximum transmittance is set to be 100. For the sensitivity characteristic of the CCD, 81 data are stored. For the spectral characteristics of the filters, 81 data per filter of the rotary color filter (i.e., data corresponding to the number of mounted filters×81) are stored.

The spectral sensitivity characteristics A of the light-receiving portion are represented by, e.g., the product of the spectral characteristic of the filter and the sensitivity characteristic of the CCD.

That is, the product of the spectral characteristic of the filter and the sensitivity characteristic of the CCD is calculated and set as the spectral sensitivity characteristics A of the light-receiving portion.

As the color matching functions, 81 data within the range of, e.g., 380 to 780 nm at an interval of 5 nm are stored.

The feature amount calculation unit 252 calculates, for each filter, a coefficient for obtaining a value of the spectral sensitivity characteristic of the light-receiving portion which is similar to or coincide with the color matching function value, and the sum of the absolute values of three coefficients corresponding to the color matching functions (x, y, z) is used as a feature amount.

Instead of the sum of the absolute values, an equation for obtaining a positive value as a result, e.g., a squared sum may be used.

The calculated feature amount is transferred to the determination unit 253. When the feature amount is minimum, the characteristics of the filter does not contribute approximation of the color matching function. Therefore, the characteristics of the filter are deleted from the spectral sensitivity characteristics of the light-receiving portion.

This processing is repeated until the filter count reaches the number stored in a filter count setting unit 254.

The number of filters determined on the basis of the measurement precision and measurement time of colorimetry is input to the filter count setting unit 254.

Determination of the number of filters to be used can be made by various methods: for example, from the viewpoint of measurement time, "since 10 filters can be mounted on one rotary turret, 10 filters are used."

Filters left in the above processing are selected as optimum filters.

Information of the center wavelength and half-width of the filter determined by the determination unit 253 is transferred to the color value arithmetic circuit 209 and the control unit 110.

Figure 37:
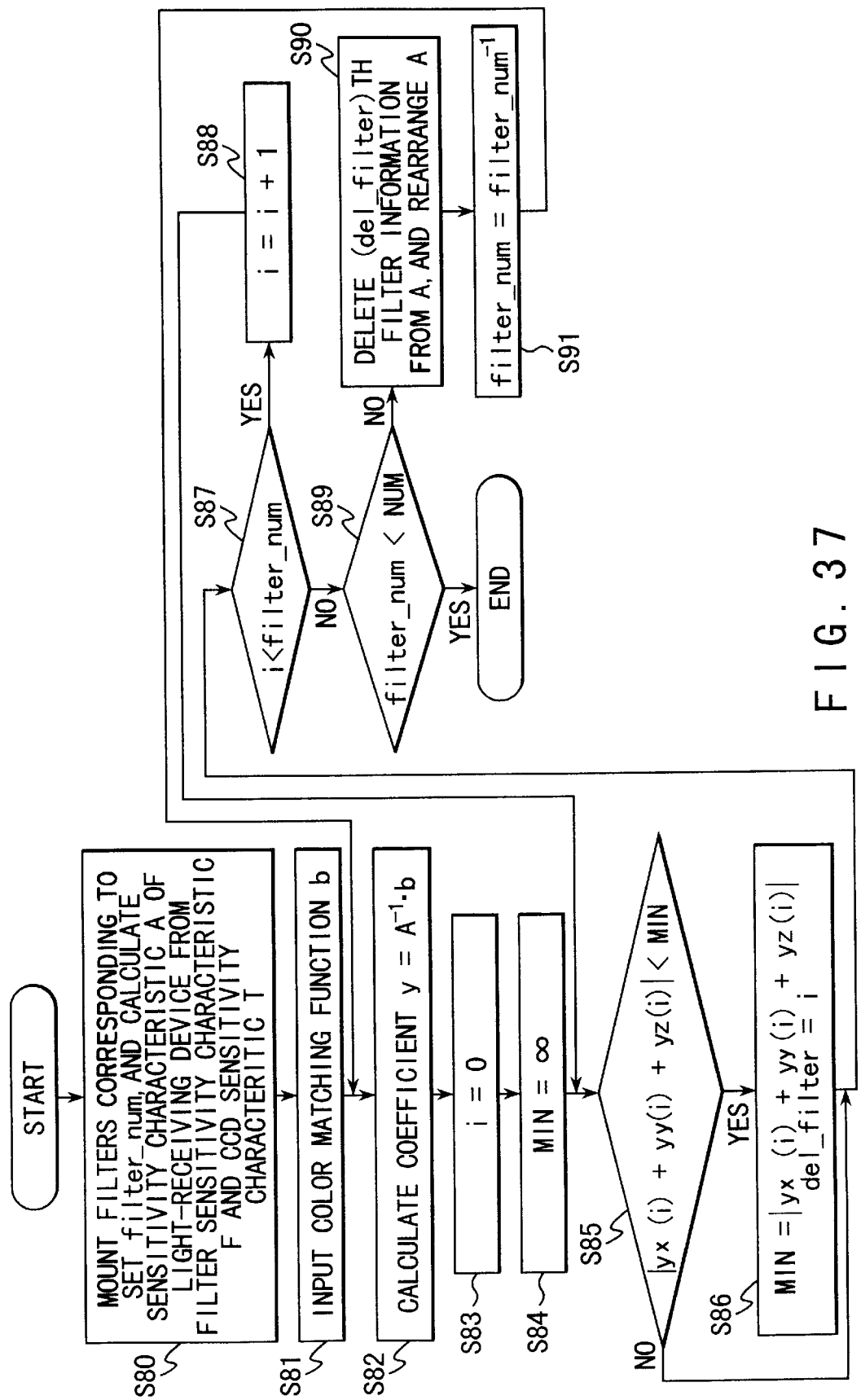
FIG. 37 is a flow chart showing processing of a filter calculation unit and a determination unit in the fourth embodiment.

For processing of the feature amount calculation unit 252 and the determination unit 253, a detailed example for deletion of filter information for which the feature amount is minimum will be described below with reference to the flow chart shown in FIG. 37.

In step S80, the number of filters mounted on the rotary color filter 102 is substituted into filter_num. Spectral characteristics F of the filters and a spectral sensitivity characteristic T of the CCD are read out from the data storage unit 213 to calculate the spectral sensitivity characteristics of the light-receiving portion. This result is represented by A.

When an optimum number of filters are to be selected from 60 filters, 60 is substituted into filter_num. The spectral characteristics F of the filters are represented by a matrix of 60×81, and the spectral sensitivity characteristic T of the CCD is represented by a matrix of 81×1. As a result, the spectral characteristics A of the light-receiving portion are represented by a matrix of 60×81.

In step S81, the color matching function b is loaded on from the data storage unit 213.

In step S82, the coefficients y (81×3) for approximating the spectral sensitivity characteristics A (60×81) of the light-receiving portion to the x, y and z components of the color matching function b (81×3) are calculated.

In steps S83 to S88, a filter for which the sum of the absolute values of the coefficients y of the x, y and z components is minimum is calculated.

In steps S83 and S84, a counter i and a minimum value MIN of the sum of the absolute values of the coefficients are set to initial values.

In step S85, it is determined whether the sum of the absolute values of the ith coefficients y is equal to or larger than MIN. If NO in step S85, the flow advances to step S87. If YES in step S85, the flow advances to step S86.

In step S86, the sum of the coefficients y is substituted into MIN, and i is stored in del_filter.

In step S87, it is determined whether i is smaller than filter_num. If YES in step S87, the flow advances to step S88 to increment i by one. Until i exceeds filter_num, steps S85 to S87 are repeated.

If NO in step S87, the flow advances to step S89.

In step S89, when filter_num is equal to or larger than a filter count NUM which is input by the filter count setting unit 254 (NO in step S89), the flow advances to step S90. If YES in step S89, the processing is ended.

In step S90, the (del_filter)th filter information is deleted from the spectral sensitivity characteristics A of the light-receiving portion, and the spectral sensitivity characteristics A are rearranged.

In step S91, filter_num is decremented by one to reduce the number of filters to be mounted on the rotary color filter 102, and the flow returns to step S82.

Filters corresponding to the filter count NUM which are left in this processing are selected as optimum filters.

When the spectral sensitivity characteristics of the light-receiving portion are approximated to the color matching function by the above method, an optimum filter combination for approximating the color matching function can be calculated from the designated number of filters.

Processing in this embodiment may be performed by the following method.

In this method, a coefficient to be multiplied by each filter (center wavelength) is calculated such that the spectral sensitivity characteristic of the light-receiving portion obtained on the basis of the sensitivity characteristic of the CCD or rotary color filter equals the color matching function. A pseudo color matching function is obtained from the product of the coefficient and the spectral sensitivity characteristic of the light-receiving portion. An optimum filter combination for approximating the color matching function is determined by evaluating the ratio (error ratio) of a shift between the color matching function and the pseudo color matching function.

The color matching function and the spectral sensitivity characteristic of the light-receiving portion, which are stored in the data storage unit 213, are transferred to the feature amount calculation unit 252.

The feature amount used in this processing is the error ratio between the color matching function and a pseudo color matching function which is calculated using a coefficient for approximating the spectral sensitivity characteristic of the light-receiving portion to the color matching function.

When the spectral sensitivity characteristics of the light-receiving portion are represented by A, and the coefficient calculated according to equation (13) is represented by y a pseudo color matching function b' is calculated on the basis of equation (14) below:

$$b' = A \cdot y \quad (14)$$

That is, the x component of the pseudo color matching function is calculated according to equation (15):

$$x'(\lambda) = \sum_n \{\text{spectral sensitivity characteristic } A(n) \times \text{coefficient } yx(n)\} \quad (15)$$

An error ratio err is calculated according to equation (16) below:

$$\text{err} = \sum_j \frac{\{b(j) - b'(j)\}}{b(j)} \quad (16)$$

The feature amount calculation unit 252 calculates a feature amount when the information of mounted filters are deleted one by one.

The determination unit 253 calculates a filter wavelength for which the feature amount is minimum.

When the feature amount of a filter is minimum, it is determined that the filter less contributes to approximation of the color matching function. The spectral characteristic of the calculated filter is deleted from the spectral sensitivity characteristics of the light-receiving portion. The above processing is repeated until the filter count (e.g., 10) reaches the number stored in the filter count setting unit 254.

The filter count setting unit 254 inputs the filter count determined on the basis of the measurement precision and measurement time of colorimetry.

Filters left in the above processing are selected as optimum filters.

The information of the center wavelength and half width of the filter determined by the determination unit 253 is transferred to the color value arithmetic circuit 209 and the control unit 110.

Figure 38:
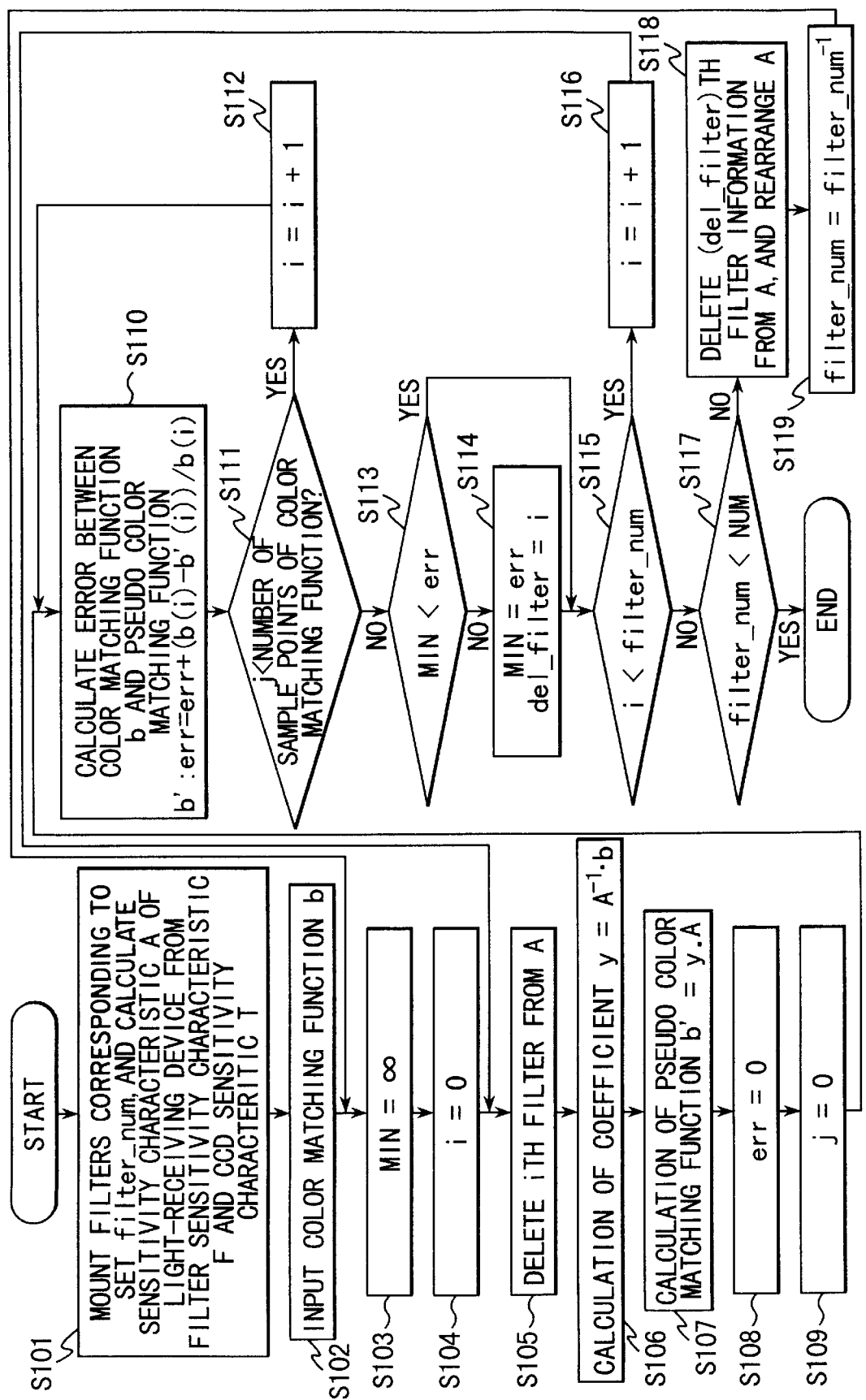
FIG. 38 is another flow chart showing another processing of the filter calculation unit and the determination unit in the fourth embodiment.

For processing of the feature amount calculation unit 252 and the determination unit 253, a detailed example of a method of deleting a filter when the error ratio is used as the feature amount will be described below with reference to the flow chart shown in FIG. 38.

In step S101, the number of filters mounted on the rotary color filter 102 is stored in filter_num. The spectral characteristics F of the filters and the spectral sensitivity characteristic T of the CCD are loaded from the data storage unit 213 to calculate the spectral sensitivity characteristics of the light-receiving portion. The result is represented by A.

In step S102, the color matching function b is loaded from the data storage unit 213.

In steps S103 and S104, the minimum error ratio MIN and the counter i are set to initial values.

In step S105, the spectral characteristic of the ith filter data is deleted from the spectral sensitivity characteristics A.

In step S106, the coefficient y for approximating the spectral sensitivity characteristics A of the light-receiving portion to the color matching function b is calculated.

In step S107, the pseudo color matching function b' is calculated on the basis of the calculated coefficient y.

In steps S108 to S116, the error ratio err for giving the minimum value is calculated, and the corresponding filter is searched for.

In step S108, the error ratio err between the color matching function b and the pseudo color matching function b' is initialized.

In steps S109 to S112, the error ratio err is calculated.

In step S109, a counter j corresponding to the number of sample points of the color matching function is initialized.

In step S110, the error ratio between the color matching function and the pseudo color matching function at the counter j is calculated.

In step S111, if the counter j is smaller than the number of sample points (e.g., 81 sample points at an interval of 5 nm) of the color matching function (YES in step S111), the flow advances to step S112 to increment the counter j by one.

In step S113, if err is larger than MIN (YES in step S113), the flow advances to step S115. If NO in step S114, err is substituted into MIN, and i is stored in del_filter.

In step S115, if i is smaller than the filter count filter_num (YES in step S115), the flow advances to step S116 to increment i by one. If NO in step S115, the flow advances to step S117.

In step S117, if filter_num is equal to or larger than the filter count NUM input by the filter count setting unit 254 (NO in step S115), the flow advances to step S118. If YES in step S117, the processing is ended.

In step S118, the (del_filter)th filter information is deleted from the spectral sensitivity characteristics A of the light-receiving portion, and the spectral sensitivity characteristics A are rearranged.

In step S119, filter_num is decremented by one to reduce the number of filters to be mounted on the rotary color filter 102, and the flow returns to step S105.

Filters corresponding to the filter count NUM which are left in this processing are selected as optimum filters.

When the spectral sensitivity characteristics of the light-receiving portion are approximated to the color matching function by the above method, an optimum filter combination approximated to a curve representing the color matching function can be calculated in the filter count set by the filter count setting unit 254.

Since the error ratio represents the degree of approximation between the color matching function and the pseudo color matching function, the filters can be deleted until the error ratio reaches a predetermined value.

The above filter deletion is executed for all filters until the filter count reaches the number determined on the basis of the measurement precision and measurement time. However, e.g., R, G, and B filters essential for colorimetry can be excluded from deletion targets (i.e., unconditionally included), and remaining filters can be calculated by the above method.

Not only the R, G, and B filters but also X, Y, and Z filters or R, G, B, X, Y, and Z filters may be excluded from deletion targets.

Figure 39A:
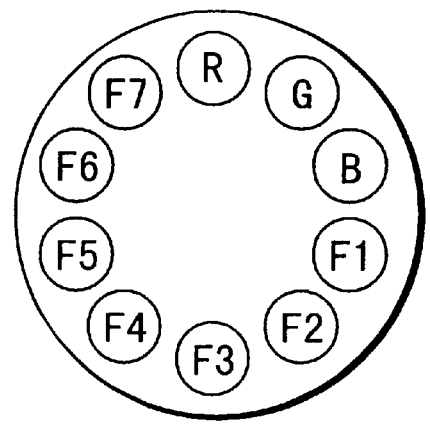
FIGS. 39A to 39C are views showing the concept of filter selection in the fourth embodiment.
Figure 39B:
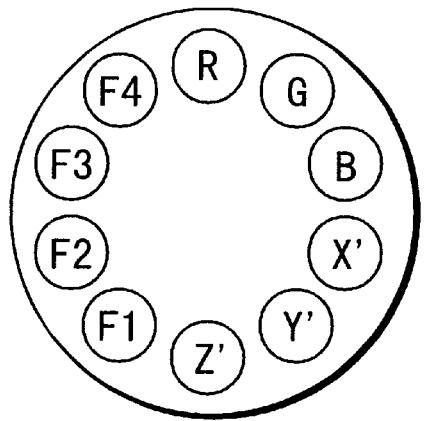
Figure 39C:
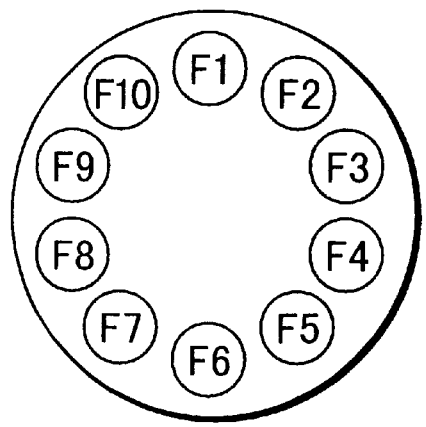

FIG. 39 is a view showing the concept of filter selection.

This method can also be applied to the following case.

Today, it is difficult to prepare X, Y, and Z filters which satisfy the Luther-Bedingung (condition for realizing color reproduction depending on colorimetry; the spectral sensitivity distribution corresponds to the linear combination of CIE color matching functions).

Therefore, while excluding, from the deletion targets, X, Y, and Z filters which can be prepared, X, Y, and Z filters which satisfy the Luther-Bedingung are prepared using the method of the fourth embodiment.

By combining pseudo X, Y, and Z filters with several narrow-band filters, X, Y, and Z filters which satisfy the Luther-Bedingung can be prepared so that a precise calorimetric value can be obtained by a few filters.

As the error ratio, not the difference between the pseudo color matching function and the color matching function but a color difference may be used.

More specifically, a filter for minimizing the color difference between the L*a*b* values in use of the pseudo color matching function and that in use of the color matching function can be deleted.

A liquid crystal variable filter can be used in place of the rotary color filter 102.

Fifth Embodiment

In this embodiment, an optimum filter combination is determined using a liquid crystal variable filter which enables smoother filter exchange than a rotary color filter.

Arrangement

This embodiment basically has the same arrangement as that of the fourth embodiment except a liquid crystal variable filter 261 and a filter exchange unit 262. The same reference numerals as in the fourth embodiment denote the same constituent elements in the fifth embodiment, and only different portions will be described below.

Figure 40:
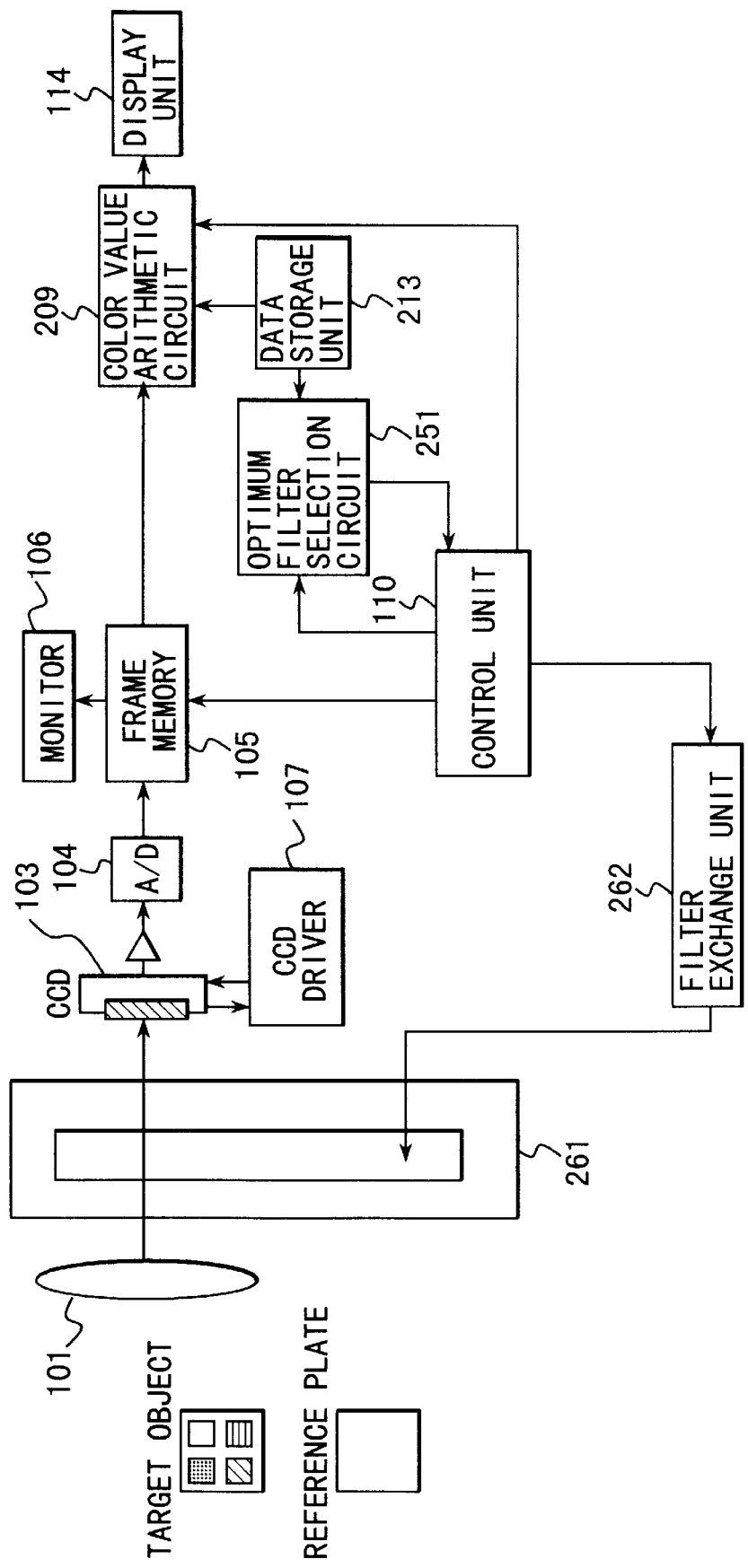
FIG. 40 is a view showing the arrangement of a calorimetric apparatus according to the fifth embodiment of the present invention.

FIG. 40 is a schematic view showing the overall arrangement of a colorimetric apparatus according to the fifth embodiment of the present invention.

This colorimetric apparatus comprises an optical system 101 including a stop and a lens, the liquid crystal variable filter 261 capable of realizing the characteristics of a plurality of bandpass filters, a CCD 103 for picking up the images of a target object and a reference plate, an A/D converter 104, a frame memory 105, a monitor 106 for displaying a photographed image, a CCD driver 107, a color value arithmetic circuit 209 for calculating color values from a plurality of image signals, a display unit 114 for displaying the color value or the like, an optimum filter selection circuit 251 for calculating an optimum filter combination for colorimetry, the filter exchange unit 262 for selecting the filter characteristic determined by the optimum filter selection circuit 251 from a plurality of filter characteristics obtained by the liquid crystal variable filters 261 and adjusting a voltage to be applied to the liquid crystal variable filter 261 to obtain the filter characteristic, a data storage unit 213 which stores data including a color matching function, and a control unit 110 for controlling the CCD driver 107 and the like and sending commands to the color value arithmetic circuit 209, the filter exchange unit 262, and the like.

Light reflected by the object forms an image by the optical system 101, and the image of light transmitted through the liquid crystal variable filter 261 is picked up by the CCD 103.

At this time, the liquid crystal variable filter 261 is set by the filter exchange unit 262 so that the liquid crystal variable filter 261 has a transmittance equivalent to the optimum filter characteristic calculated by the optimum filter selection circuit 251.

The picked-up image is converted into a digital signal by the A/D converter 104 and transferred to the frame memory 105.

The image data input to the frame memory 105 is displayed on the monitor 106.

The image data stored in the frame memory 105 is used by the color value arithmetic circuit 209 to calculate the color value of an arbitrary area.

The value calculated by the color value arithmetic circuit 209 is converted into a numerical value or image by the display unit 114 and displayed.

When a plurality of liquid crystal variable filters having different half widths are used, variable filter combinations are available, and a more precise filter can be calculated.

The optimum filter selection circuit 251 can be replaced with the filter calculation unit 244 in the third embodiment.

Sixth Embodiment

In this embodiment, colorimetry is performed using data of an optimum filter combination for colorimetry which is obtained in advance.

Arrangement

This embodiment basically has the same arrangement as that of the second embodiment except a filter data storage unit 271 and a filter exchange unit 272. The same reference numerals as in the second embodiment denote the same constituent elements in the sixth embodiment, and only different portions will be described below.

Figure 41:
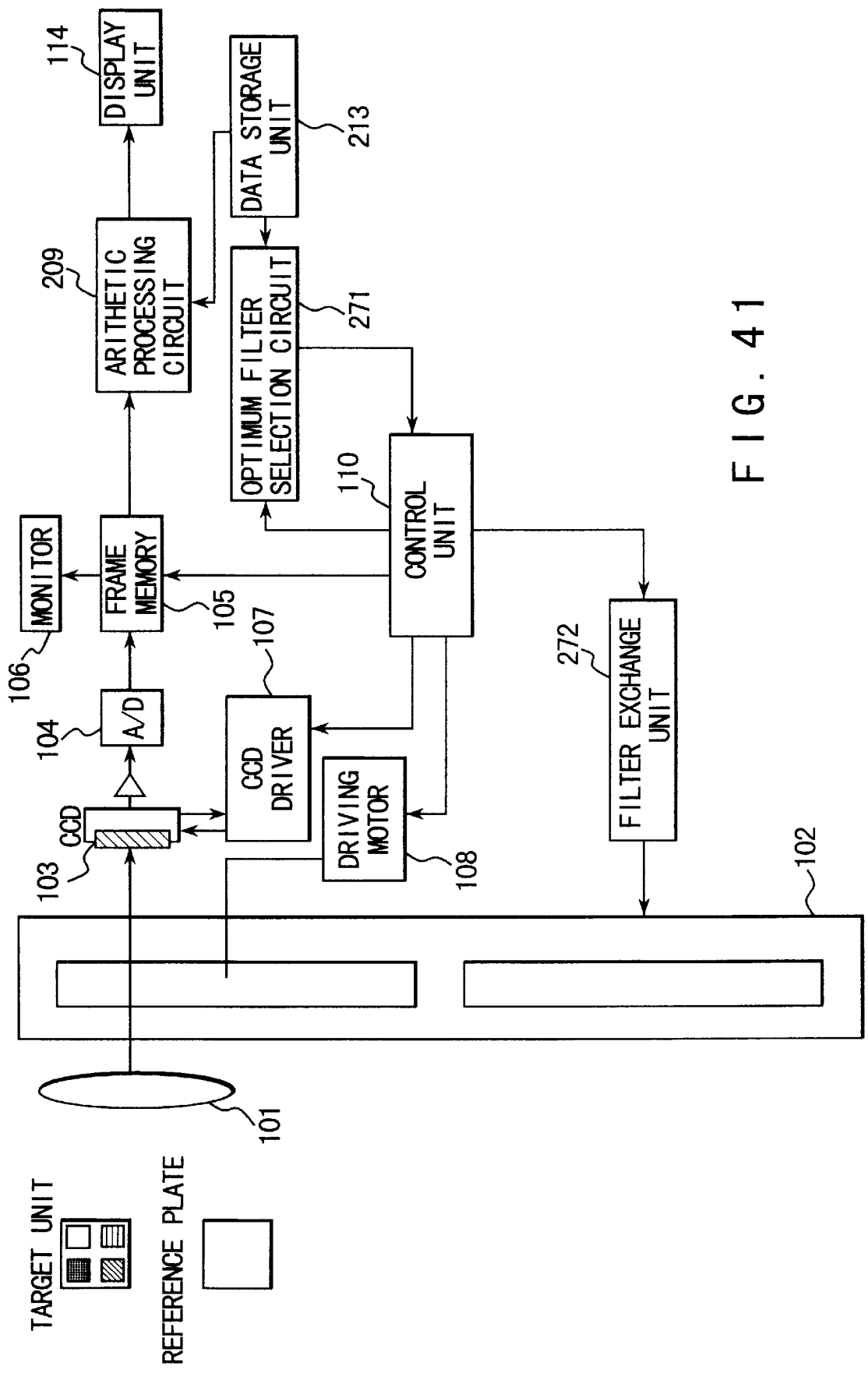
FIG. 41 is a view showing the arrangement of a colorimetric apparatus according to the sixth embodiment of the present invention.

FIG. 41 is a schematic view showing the overall arrangement of a calorimetric apparatus according to the sixth embodiment of the present invention.

This colorimetric apparatus comprises an optical system 101 including a stop and a lens, a rotary color filter 102 constituted by a plurality of bandpass filters, a CCD 103 for picking up the images of a target object and a reference plate, an A/D converter 104, a frame memory 105, a monitor 106 for displaying a photographed image, a CCD driver 107, a driving motor 108 for the rotary color filter 102, a color value arithmetic circuit 209 for calculating color values from a plurality of images, a display unit 114 for displaying the color value or the like, the filter data storage unit 271 which stores information of an optimum filter combination for colorimetry, the filter exchange unit 272 for exchanging the filters of the rotary color filter 102 on the basis of the filter data stored in the filter data storage unit 271, a data storage unit 213 which stores data including a color matching function, and a control unit 110 for controlling the CCD driver 107, the driving motor 108, and the like and sending commands to the color value arithmetic circuit 209, the filter exchange unit 272, and the like.

The information of the optimum filter combination stored in the filter data storage unit 271 is transferred to the filter exchange unit 272 in accordance with a command from the control unit 110.

The filter exchange unit 272 selects an optimum filter from the plurality of filters of the rotary color filter 102 and adjusts the position of the rotary color filter 102 to locate the filter behind the optical system 101.

Light reflected by the target object and transmitted through the optical system 101 and the exchanged rotary color filter 102 forms an image on the CCD 103 and is transferred to the A/D converter 104 as a video signal.

The A/D converter 104 converts an image signal from the CCD 103 into a digital signal and transfers the digital signal to the frame memory 105.

The image signal transferred to the frame memory 105 can be transferred to on the monitor 106.

The image signal stored in the frame memory 105 and data stored in the filter data storage unit 271 and the data storage unit 213 are transferred to the color value arithmetic circuit 209 so that three, i.e., X, Y, and Z stimulus values and the L*a*b* value are calculated.

The calculation result from the color value arithmetic circuit 209 is displayed by the display unit 114 as an RGB image.

The present invention has been described above on the basis of the first to sixth embodiments. The specification of the present invention incorporates inventions having the following arrangements and functions/effects.

(1) A calorimetric apparatus is characterized by comprising:
   an image pickup means for picking up an image of light from a target object;
   an optical means for allowing the light from the target object to form an image on the image pickup means;
   a plurality of optical bandpass filters arranged between the target object and the image pickup means and having different pass bands;
   a switching means for switching the plurality of optical bandpass filters; and
   an optimum filter selection means for selecting, from the plurality of optical bandpass filters, a filter suitable for colorimetry of the target object.

According to this arrangement, the following function/effect can be obtained.

(Function) A set of a few of filters optimum for colorimetry is selected from the plurality of optical bandpass filters which have different pass bands to pick up the image of the light from the target object.

(Effect) Since data of limited filters which are actually effective for colorimetry can be used, precise colorimetry can be performed without being affected by unnecessary noise.

In addition, since colorimetry can be realized with a small number of filters, a compact apparatus can be manufactured at a low cost.

Furthermore, since colorimetry can be realized with a smaller number of times of photographing processing and data processing, the processing result can be obtained at a high speed.

(2) An apparatus according to (1) is characterized by further comprising an arithmetic processing means for performing colorimetry (color classification or color determination) of the target object by using a statistical method on the basis of a spectral characteristic of the target object whose image is picked up.

According to this arrangement, the following function/effect can be obtained.

(Function) Colorimetry (color classification or color determination) is performed using the statistical method on the basis of the spectral characteristic of the target object whose image is picked up using the optimum filter.

(Effect) Since colorimetry (color classification or color determination) is performed by the statistical method using data of effective filters, precise colorimetry (color classification or color determination) can be performed.

(3) An apparatus according to (2) is characterized in that the image pickup means picks up images of portions (q) of a plurality of target objects (p) at a plurality of (m) wavelengths, the optimum filter selection means comprises a vector preparation means for preparing first vectors [V(i)] associated with all the wavelengths in units of portions (i) from the images picked up by the image pickup means and second vectors [U(k)] associated with all the portions in units of wavelengths (k) from the images picked up by the image pickup means, a target portion extraction means for classifying the first vectors [V(i)] prepared by the vector preparation means into a plurality of classes, removing target portions associated with vectors unsuitable for classification into the classes, and extracting target portions suitable for classification into the classes, and a vector extraction means for selecting the second vectors [U(k)] associated with the target portions which are extracted by the target portion extraction means, deleting vectors associated with wavelengths which less contribute to classification from the second vectors [U(k)], and extracting vectors associated with wavelengths which more contribute to classification, and the switching means is controlled to select only an optical bandpass filter corresponding to the vector extracted by the vector extraction means for image pickup processing.

According to this arrangement, the following function/effect can be obtained.

(Function) If one of the first vectors [V(i)] is determined unsuitable for classification into a class to which the vector should originally belong, data corresponding to the vector is not used for optimum filter preparation, and only data effective for optimum filter preparation are extracted from data obtained by picking up the images of the target objects.

The second vectors [U(k)] are formed from the extracted data, and vectors associated with the wavelengths which less contribute to class classification are deleted. With this processing, only vectors associated with the wavelengths which more contribute to class classification are extracted.

(Effect) Even in use of all filters, data for which erroneous class classification likely occurs can be removed prior to optimum filter design, the adverse effect on filter design for realizing desired classification can be eliminated.

When the data is constituted as the second vectors, the wavelengths can be deleted on the basis of a method which is generally known as a vector clustering algorithm.

(4) An apparatus according to (3) is characterized in that the vector extraction means comprises a vector order setting means for setting an order of the vectors by a plurality of methods, and an overall determination means for performing overall determination whether the vectors associated with the wavelengths which less contributes are removed on the basis of the order set by the vector order setting means in units of the plurality of methods.

According to this arrangement, the following function/effect can be obtained.

(Function) The sequence is set in the order of vectors to be removed from the viewpoints of the plurality of predetermined methods.

Other restriction conditions are converted into orders by predetermined conversion processing.

These orders are subjected to overall determination in accordance with a predetermined reference to select wavelengths to be removed.

(Effect) While, for each wavelength, evaluating the degree of contribution to classification from various viewpoints and simultaneously considering various restriction conditions, wavelengths to be removed can be subjected to overall selection. For this reason, erroneous determination affected by the result of a specific method can be prevented, and determination can be performed in consideration of the restriction conditions.

Since the various evaluation references can be handled at once, high-speed selection can be realized.

(5) An apparatus according to (4) is characterized in that the vector order setting means includes at least means for setting the sequence on the basis of magnitudes of vectors.

According to this arrangement, the following function/effect can be obtained.

(Function) For pairs of vectors, i.e., signal intensity lines at a certain wavelength, the order is set in accordance with the magnitudes of the vectors.

(Effect) For a wavelength at which the magnitude of a vector is small, the S/N ratio can be determined to be low. When the order is set in accordance with the magnitudes of the vectors, a wavelength at which the S/N ratio and data reliability are low can be selected.

(6) An apparatus according to (4) is characterized in that the vector order setting means includes at least means for setting the order on the basis of a distance between a pair of vectors.

According to this arrangement, the following function/effect can be obtained.

(Function) A pair of vectors, i.e., signal intensity lines at a certain wavelength is considered, and the distance therebetween is obtained.

The order of vectors constituting the pairs of vectors is determined in accordance with the magnitudes of the distances.

(Effect) It can be determined, for two vectors having a small distance therebetween, one can be left as a representative, and the other can be removed. For this reason, when the order of vectors constituting the pairs is determined in accordance with the magnitudes of distances between pairs of vectors, a characteristic and unique wavelength can be selected.

(7) An apparatus according to (4) is characterized in that the vector order setting means includes at least a means for setting the sequence on the basis of a distance between a normalized pair of vectors.

According to this arrangement, the following function/effect can be obtained.

(Function) After vectors, i.e., signal intensity lines at a certain wavelengths are normalized, a pair of vectors is considered, and the distance therebetween is obtained.

The order of vectors constituting the pairs of vectors is determined in accordance with the magnitudes of the distances.

(Effect) It can be determined, for two vectors having a small distance therebetween, one can be left as a representative, and the other can be removed. For this reason, when the order of vectors constituting the pairs is determined in accordance with the magnitudes of distances between pairs of vectors, a characteristic and unique wavelength can be selected.

Since the vectors are normalized, the behaviors of vectors themselves can be reflected regardless of the difference between signal intensities.

(8) An apparatus according to (4) is characterized in that the vector order setting means includes at least a means for setting the order on the basis of a sum of degrees of class separation obtained when wavelengths are removed one by one for the first vectors.

According to this arrangement, the following effect/function can be obtained.

(Function) Element values associated with a specific wavelength are sequentially removed one by one from the first vectors, thereby obtaining the sum of the degrees of class separation.

The order associated with the respective wavelengths is determined in accordance with the magnitudes of the sums.

According to this arrangement, the following function/effect can be obtained.

(Effect) If the degree of class separation can be kept large even when a specific wavelength is removed, it can be determined that the removal of the wavelength does not adversely affect classification.

In addition, when, instead of obtaining the sums of the degrees of class separation for all wavelengths, calculation is performed for only wavelengths which are candidates for deletion based on other methods, the influence of deletion of wavelengths can be evaluated with a small calculation amount.

(9) An apparatus according to (1) is characterized by further comprising a color value comprising a color value arithmetic means for calculating a color value on the basis of an image signal output from the image pickup means.

According to this arrangement, the following effect/function can be obtained.

(Function) On the basis of the output image signal, the color value is calculated in consideration of the data (e.g., data obtained using a reference plate) of light in the colorimetric area.

(Effect) Since the color value of the target object can be calculated using the image signal of the target object and the light in the calorimetric area, the apparatus can be used as a calorimetric apparatus.

(10) An apparatus according to (9) is characterized in that the color value arithmetic means comprises a storage means for storing data associated with light in a colorimetric area of the target object.

According to this arrangement, the following function/effect can be obtained.

(Function) On the basis of the output image signal, the color value is calculated in consideration of the data (e.g., data obtained using a reference plate) of light in the calorimetric area.

(Effect) Since the color value of the target object can be calculated using the image signal of the target object and the light in the calorimetric area, the apparatus can be used as a calorimetric apparatus.

(11) An apparatus according to (10) is characterized in that the optimum filter selection means comprises a maximum value wavelength extraction means for multiplying data (S) associated with the light in the colorimetric area of the target object with color matching functions (X, Y, Z), which are stored in the storage means, to calculate three functions Sx, Sy, and Sz and obtaining a wavelength for giving a maximum value, an intersection wavelength extraction means for extracting a wavelength corresponding to an intersection of the three functions Sz, Sy, and Sz, a maximum change rate wavelength extraction means for obtaining a wavelength for giving a large change rate of the three functions Sx, Sy, and Sz, and a control means for controlling the switching means to switch, in accordance with a predetermined priority, the optical bandpass filters for image pickup processing which correspond to the wavelengths extracted by the maximum value wavelength extraction means, the intersection wavelength extraction means, and the maximum change rate wavelength extraction means.

According to this arrangement, the following function/effect can be obtained.

(Function) On the basis of the three functions Sx, Sy, and Sz obtained on the basis of the products of the spectrum data of a light source in the measurement area and color matching functions, filters having a center wavelength corresponding to the wavelength for giving the maximum value of each function, the wavelength corresponding to an intersection of the functions, and the wavelength for giving a large change ratio are selected as optimum filters in accordance with predetermined priority, and the color value is calculated on the basis of image signals obtained at these extracted wavelengths.

(Effect) Since sufficient data necessary for color value calculation can be acquired in accordance with the spectrum data of the light source in the measurement area, a compact apparatus can be manufactured at a low cost.

In addition, the color value can be obtained with a smaller number of times of photographing processing in a short time.

(12) An apparatus according to (10) is characterized in that the optimum filter selection means comprises
  a feature amount calculation means for calculating a feature amount from an optical characteristic based on the image pickup means, the optical means, and the optical bandpass filters and a color matching function, and
  a filter count setting means for setting the number of the plurality of optical bandpass filters, and
  selects an optimum filter in accordance with the feature amount and the number of filters.

According to this arrangement, the following function/effect can be obtained.

(Function) The feature amount obtained from the optical characteristic and color matching function is evaluated, and an optimum filter combination for colorimetry is selected in accordance with the number of filters which is set on the basis of the evaluation value.

(Effect) By using the optical characteristic, the instrumental error can be minimized.

(13) An apparatus according to (12) is characterized in that the optical characteristic based on the image pickup means, the optical means, and the optical bandpass filters is calculated from at least spectrum characteristics of the optical bandpass filters and a sensitivity characteristic of the image pickup means (CCD).

According to this arrangement, the following function/effect can be obtained.

(Function/effect) By calculating the feature amount using at least, as the optical characteristic, the spectral characteristic of a bandpass filter which more contributes to the feature amount and the sensitivity characteristic of the CCD, a substantially optimum filter combination can be selected with a small calculation amount.

(14) An apparatus according to (12) is characterized in that the feature amount calculation means sets a coefficient to be multiplied by the optical characteristic such that a curve of the optical characteristic is approximated to a curve of the color matching function.

According to this arrangement, the following function/effect can be obtained.

(Function) By multiplying the optical characteristic of the filter by the coefficient, a spectral characteristic approximated to the color matching function is realized.

(Effect) The filter having the spectral characteristic approximated to the color matching function, which can hardly be manufactured as a single device, can be realized by the given filters.

(15) An apparatus according to (14) is characterized in that the optimum filter selection means comprises
  a feature amount calculation means for calculating the feature amount on the basis of the coefficient, and a determination means for obtaining filter information for which the feature amount is minimum, deleting a filter having the filter information from optimum filter selection targets, and repeating the operation until the filter count reaches the number set by the filter count setting means.

According to this arrangement, the following function/effect can be obtained.

(Function) The optimum filter is obtained by selectively deleting filter information for which the feature amount calculated using the coefficient is minimum, and repeating this filter deletion operation until the filter count reaches the set number.

(Effect) A filter necessary for colorimetry can be obtained in advance.

Therefore, since sufficient data necessary for calculation of a precise color value can be acquired with a small number of filters, a compact apparatus can be manufactured at a low cost.

In addition, the color value can be obtained with a smaller number of times of photographing processing in a short time.

(16) An apparatus according to (14) is characterized in that the optimum filter selection means comprises a feature amount calculation means for calculating an error ratio between a pseudo color matching function and the color matching function, which is given by a product of the coefficient and the optical characteristic, and a determination means for obtaining filter information for which the error ratio is minimum, deleting a filter having the filter information from optimum filter selection targets, and repeating the operation until the filter count reaches the number set by the filter count setting means.

(Function) The optimum filter is obtained by selectively deleting filter information for which the feature amount calculated using the coefficient is minimum, and repeating this filter deletion operation until the filter count reaches the set number.

(Effect) A filter necessary for colorimetry can be obtained in advance.

Therefore, since sufficient data necessary for calculation of a precise color value can be acquired with a small number of filters, a compact apparatus can be manufactured at a low cost.

In addition, the color value can be obtained with a smaller number of times of photographing processing in a short time.

Particularly, by evaluating the error ratio between the pseudo color matching function and the color matching function and considering the relative influence of each filter information on the degree of matching between the shapes of two function curves, it can be determined whether the filter information is deleted. For this reason, the optimum filter can be more precisely selected.

(17) An apparatus according to (12) is characterized in that the filter count setting means sets the number of filters on the basis of desired measurement precision and measurement time.

According to this arrangement, the same function/effect as that of (12) can be obtained.

(18) An apparatus according to (9) is characterized in that the optimum filter selection means comprises a means for performing Fourier transform of a product of an optical characteristic (spectrum data of the target object or reference plate) in a colorimetric area of the target object and a color matching function, and selects the optimum filter on the basis of a result of Fourier transform.

According to this arrangement, the following function/effect can be obtained.

(Function) The feature amount is calculated by Fourier transform of the product of the spectrum data of the target object or reference plate and the color matching function. Optimum filters for colorimetry, which are arranged at an equal interval, are selected on the basis of the number of filters obtained from the feature amount.

(Effect) Since the filter corresponding to the target object can be calculated, and sufficient data necessary for calculation of the precise color value can be acquired with a small number of filters, a compact apparatus can be manufactured at a low cost.

(19) An apparatus according to (18) is characterized in that the optical characteristic in the colorimetric area of the target object is calculated from spectrum data of the target object or reference plate.

According to this arrangement, the same function/effect as that of (18) can be obtained.

(20) An apparatus according to (18) is characterized in that the optimum filter selection means selects the optimum filter on the basis of the result of Fourier transform by the Fourier transform means and the number of filters which is set by filter count setting means.

According to this arrangement, the same function/effect as that of (18) can be obtained.

(21) A colorimetric method of performing colorimetry of target object whose image is picked up by passing light from the target object through an optical system while switching a plurality of optical bandpass filters having pass bands different from each other, comprising the optimum filter selection step of selecting, from the plurality of optical bandpass filters, a filter suitable for colorimetry of the target object.

According to this arrangement, the following function/effect can be obtained.

(Effect) Since data of limited filters which are actually effective for colorimetry can be used, precise colorimetry can be performed without being affected by unnecessary noise.

In addition, since colorimetry can be realized with a small number of filters, a compact apparatus can be manufactured at a low cost.

Furthermore, since colorimetry can be realized with a smaller number of times of photographing processing and data processing, the processing result can be obtained at a high speed.

(22) A method according to (21) is characterized in that the optimum filter selection step comprises the arithmetic processing step of performing colorimetry of the target object by a statistical method on the basis of a spectral characteristic of the target object whose image is picked up.

According to this arrangement, the same function/effect as that of (2) is obtained.

(23) A method according to (22) is characterized in that the optimum filter selection means comprises the target object image pickup step of selecting at least one portion (q) for each of a plurality of target objects (p) and picking up an image of the portion of each of the target objects (p) at a plurality of (m) wavelengths, the vector preparation step of preparing first vectors [V(i)] associated with all the wavelengths in units of portions (i) from the images picked up in the target object image pickup step and second vectors [U(k)] associated with all the portions in units of wavelengths (k) from the images picked up in the target object image pickup step, the target portion extraction step of classifying the first vectors [V(i)] prepared in the vector preparation step into a plurality of classes, removing target portions associated with vectors unsuitable for classification into the classes, and extracting target portions suitable for classification into the classes, the vector extraction step of selecting the second vectors [U(k)] associated with the target portions which are extracted in the target portion extraction step, deleting vectors associated with wavelengths which less contribute to classification from the second vectors [U(k)], and extracting vectors associated with wavelengths which more contribute to classification, and the control step of controlling switching means to select only an optical bandpass filter corresponding to the vector extracted in the vector extraction step for image pickup processing.

According to this arrangement, the same function/effect as that of (3) is obtained.

(24) A method according to (21) is characterized in that the optimum filter selection step comprises the feature amount calculation step of calculating a feature amount obtained from an optical characteristic based on image pickup means, optical means, and the optical bandpass filters and a color matching function, and the filter count setting step of setting the number of the plurality of optical bandpass filters, and includes selecting an optimum filter in accordance with the feature amount and the number of filters.

According to this arrangement, the same function/effect as that of (12) is obtained.

(25) A method according to (24) is characterized in that the optimum filter selection step comprises the step of setting a coefficient to be multiplied by the optical characteristic such that a curve of the optical characteristic is approximated to a curve of a color matching function, the minimum value calculation step of obtaining information of a filter for giving a minimum value of the coefficient, and the deletion step of deleting the filter for giving the minimum value of the coefficient from optimum filter selection targets, and includes repeating the minimum value calculation step and the deletion step until a filter count reaches the number of filters set in the filter count setting means, thereby selecting the optimum filter.

According to this arrangement, the same function/effect as that of (15) is obtained.

(26) A method according to (24) is characterized in that the optimum filter selection step comprises the step of setting a coefficient to be multiplied by the optical characteristic such that a curve of the optical characteristic is approximated to a curve of a color matching function, the error ratio calculation step of calculating an error ratio between a curve (pseudo color matching function curve) represented by a product of the coefficient and the optical characteristic and the color matching function, and the deletion step of deleting a filter for giving a minimum value of the error ratio from optimum filter selection targets, and includes repeating the error ratio calculation step and the deletion step until a filter count reaches the number of filters set in the filter count setting means, thereby selecting the optimum filter.

According to this arrangement, the same function/effect as that of (16) is obtained.

(27) A method according to (21) is characterized in that the optimum filter selection step comprises the step of performing Fourier transform of a product of an optical characteristic (spectrum data of the target object or reference plate) in a calorimetric area of the target object and a color matching function, and includes selecting the optimum filter on the basis of a result of Fourier transform.

According to this arrangement, the same function/effect as that of (21) is obtained.

As has been described above in detail, according to the present invention, by optimizing the plurality of measurement filters themselves, which must be prepared in advance, effective colorimetry can be immediately performed. With this arrangement, a colorimetric apparatus and method which enable more precise and proper colorimetry can be provided.

Additional embodiments of the present invention will be apparent to those skilled in the art from consideration of the specification and practice of the presence invention disclosed herein. It is intended that the specification and examples be considered as exemplary only, with the true scope of the present invention being indicated by the following claims.

We claim:

1. A colorimetric apparatus comprising:

image pickup means for picking up light from a target object;

optical means for allowing the light from said target object to form an image on said image pickup means;

a plurality of optical bandpass filters arranged between said target object and said image pickup means and having different pass bands;

switching means for switching said plurality of optical bandpass filters; and optimum filter selection means for selecting, from said plurality of optical bandpass filters, an optimum filter suitable for colorimetry of said target object, based on light image data of said target object which has been picked up by said image pickup means using a plurality of said optical bandpass filters.

2. An apparatus according to claim 1, further comprising arithmetic processing means for performing colorimetry of said target object using a statistical method based on a spectral characteristic of said target object.

3. An apparatus according to claim 2, wherein:

said image pickup means picks up images of portions (g) of a plurality of target objects (p) at a plurality of (m) wavelengths, said optimum filter selection means comprises:

(i) vector preparation means for preparing first vectors associated with all the wavelengths in units of portions (i) from the images picked up by said image pickup means and second vectors associated with all the portions in units of wavelengths (k) from the images picked up by said image pickup means, (ii) target portion extraction means for classifying the first vectors prepared by said vector preparation means into a plurality of classes, removing target portions associated with vectors unsuitable for classification into the classes, and extracting target portions suitable for classification into the classes, and (iii) vector extraction means for selecting the second vectors associated with the target portions which are extracted by said target portion extraction means, deleting vectors associated with wavelengths which contribute less to classification from the second vectors, and extracting vectors associated with wavelengths which contribute more to classification, and said switching means is controlled to select only an optical bandpass filter corresponding to the vector extracted by said vector extraction means for image pickup processing.

4. An apparatus according to claim 3, wherein said vector extraction means comprises vector order setting means for setting an order of the vectors using a plurality of methods, and overall determination means for performing overall determination whether the vectors associated with the wavelengths which contribute less to classification are removed based on the order set by said vector order setting means in units of the plurality of methods.

5. An apparatus according to claim 4, wherein said vector order setting means includes at least means for setting the order based on magnitudes of the vectors.

6. An apparatus according to claim 4, wherein said vector order setting means includes at least means for setting the order based on a distance between a pair of the vectors.

7. An apparatus according to claim 4, wherein said vector order setting means includes at least means for setting the order based on a distance between a normalized pair of the vectors.

8. An apparatus according to claim 4, wherein said vector order setting means includes at least means for setting the order based on a sum of degrees of class separation obtained when wavelengths are removed one by one for the first vectors.

9. An apparatus according to claim 1, further comprising color value arithmetic means for calculating a color value based on of an image signal output from said image pickup means.

10. An apparatus according to claim 9, wherein said color value arithmetic means comprises a memory for storing data associated with light in a calorimetric area of said target object.

11. An apparatus according to claim 10, wherein said optimum filter selection means comprises:

maximum value wavelength extraction means for multiplying data (S) associated with the light in said calorimetric area of said target object with color matching functions (X, Y, Z), which are stored in said memory, to calculate three functions Sx, Sy, and Sz and obtaining a wavelength for giving a maximum value, intersection wavelength extraction means for extracting a wavelength corresponding to an intersection of the three functions Sz, Sy, and Sz, maximum change rate wavelength extraction means for obtaining a wavelength for giving a large change rate of the three functions Sx, Sy, and Sz, and control means for controlling said switching means to switch, in accordance with predetermined priority, said optical bandpass filters for image pickup processing which correspond to the wavelengths extracted by said maximum value wavelength extraction means, said intersection wavelength extraction means, and said maximum change rate wavelength extraction means.

12. An apparatus according to claim 10, wherein said optimum filter selection means comprises:

feature amount calculation means for calculating a feature amount from an optical characteristic based on said image pickup means, said optical means, said optical bandpass filters and a color matching function, and filter count setting means for setting the number of said plurality of optical bandpass filters, and wherein said optimum filter selection means selects the optimum filter in accordance with the calculated feature amount and the set number of filters.

13. An apparatus according to claim 12, wherein the optical characteristic based on said image pickup means, said optical means, and said optical bandpass filters is calculated from at least spectrum characteristics of said optical bandpass filters and a sensitivity characteristic of said image pickup means.

14. An apparatus according to claim 12, wherein said filter count setting means sets the number of filters based on a desired measurement precision and measurement time.

15. An apparatus according to claim 12, wherein said feature amount calculation means includes means for setting a coefficient to be multiplied by the optical characteristic such that a curve of said optical characteristic is approximated to a curve of the color matching function.

16. An apparatus according to claim 15, wherein said optimum filter selection means comprises:

feature amount calculation means for calculating the feature amount based on the set coefficient, and determination means for obtaining filter information for which the feature amount is minimized, deleting a filter having the filter information from optimum filter selection targets, and repeating the deletion operation until the filter count reaches the number set by the filter count setting means.

17. An apparatus according to claim 15, wherein said optimum filter selection means comprises:

feature amount calculation means for calculating an error ratio between a pseudo color matching function and the color matching function, which is given by a product of the set coefficient and the optical characteristic, and determination means for obtaining filter information for which the error ratio is minimized, deleting a filter having the filter information from optimum filter selection targets, and repeating the deletion operation until the filter count reaches the number set by the filter count setting means.

18. An apparatus according to claim 9, wherein said optimum filter selection means comprises means for performing Fourier transform of a product of an optical characteristic in a calorimetric area of said target object and a color matching function, and wherein said optimum filter selection means selects said optimum filter based on a result of the Fourier transform.

19. An apparatus according to claim 18, wherein the optical characteristic in said calorimetric area of said target object is calculated from one of spectrum data of said target object and a reference plate.

20. An apparatus according to claim 18, wherein said optimum filter selection means selects said optimum filter based on the result of the Fourier transform performed by said Fourier transform means and a set number of said plurality of optical bandpass filters.

21. A calorimetric method of performing colorimetry of a target object by passing light from said target object through an optical system while switching a plurality of optical bandpass filters having different pass bands, said method comprising:

picking up light image data of said target object and obtaining calorimetric data of said target object using said plurality of optical bandpass filters;

selecting, from said plurality of optical bandpass filters, an optimum filter suitable for colorimetry of said target object based on the calorimetric data; and performing colorimetry of said target object with high precision using the optimum filter.

22. A method according to claim 21, wherein selecting the optimum filter comprises performing colorimetry of said target object using a statistical method based on a spectral characteristic of said target object.

23. A method according to claim 22, wherein selecting the optimum filter comprises:

selecting at least one portion (q) for each of a plurality of target objects (p) and picking up an image of the portion of each of said target objects (p) at a plurality of (m) wavelengths, preparing first vectors associated with all the wavelengths in units of portions (i) from the picked up images and second vectors associated with all the portions in units of wavelengths (k) from the picked up images, classifying the first vectors into a plurality of classes, removing target portions associated with vectors unsuitable for classification into the classes, and extracting target portions suitable for classification into the classes, selecting the second vectors associated with the extracted target portions, deleting vectors associated with wavelengths which contribute less to classification from the second vectors, and extracting vectors associated with wavelengths which contribute more to classification, and selecting only an optical bandpass filter corresponding to one of the extracted vectors for image pickup processing.

24. A method according to claim 21, wherein selecting the optimum filter comprises:

calculating a feature amount obtained from an optical characteristic based on at least said optical bandpass filters and a color matching function, and setting the number of said plurality of optical bandpass filters, and selecting the optimum filter in accordance with the calculated feature amount and the set number of filters.

25. A method according to claim 24, wherein selecting the optimum filter comprises:

setting a coefficient to be multiplied by the optical characteristic such that a curve of the optical characteristic is approximated to a curve of the color matching function, obtaining information of a filter for giving a minimum value of the coefficient, deleting said filter for giving the minimum value of the coefficient from optimum filter selection targets, and repeating deletion until a filter count reaches the set number of filters, thereby selecting said optimum filter.

26. A method according to claim 24, wherein selecting the optimum filter comprises:

setting a coefficient to be multiplied by the optical characteristic such that a curve of the optical characteristic is approximated to a curve of a color matching function, calculating an error ratio between a curve represented by a product of the coefficient and the optical characteristic and the color matching function, deleting a filter for giving a minimum value of the error ratio from optimum filter selection targets, and repeating deletion until a filter count reaches the set number of filters, thereby selecting said optimum filter.

27. A method according to claim 21, wherein selecting the optimum filter comprises performing Fourier transform of a product of an optical characteristic in a calorimetric area of said target object and a color matching function, and selecting said optimum filter based on a result of the Fourier transform.

* * * * *